United States Patent
Ando et al.

(10) Patent No.: US 6,580,869 B1
(45) Date of Patent: *Jun. 17, 2003

(54) RECORDING MEDIUM OF STREAM DATA INCLUDING MANAGEMENT INFORMATION USED TO ACCESS THE STREAM DATA, AND RECORDING METHOD AND PLAYBACK METHOD OF THE SAME

(75) Inventors: Hideo Ando, Hino (JP); Kazuyuki Uyama, Kumagaya (JP); Yuuji Ito, Tokyo (JP); Shinichi Kikuchi, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 46 days.

This patent is subject to a terminal disclaimer.

(21) Appl. No.: 09/662,584

(22) Filed: Sep. 15, 2000

(65) Prior Publication Data
(65)

Related U.S. Application Data

(63) Continuation of application No. PCT/JP00/00944, filed on Feb. 18, 2000.

(30) Foreign Application Priority Data

Feb. 18, 1999 (JP) .......................................... 11-039461

(51) Int. Cl.⁷ ................................................. H04N 5/91
(52) U.S. Cl. ........................... 386/68; 386/70; 386/125; 386/126
(58) Field of Search ..................... 386/68, 70, 125–126, 386/109, 111, 95; H04N 5/91

(56) References Cited

U.S. PATENT DOCUMENTS

| 5,479,303 A | * | 12/1995 | Suzuki et al. ............... 386/70 |
| 5,535,008 A | * | 7/1996 | Yamagishi et al. .......... 386/109 |
| 5,596,564 A | * | 1/1997 | Fukushima et al. ........... 386/70 |
| 5,771,335 A | * | 6/1998 | Lee ............................. 386/111 |
| 5,881,203 A | * | 3/1999 | Fujinami et al. .............. 386/96 |
| 6,009,237 A | * | 12/1999 | Hirabayashi et al. ....... 386/111 |
| 6,282,320 B1 | * | 8/2001 | Hasegawa et al. .......... 386/109 |

FOREIGN PATENT DOCUMENTS

| EP | 0 668 700 | 8/1995 |
| EP | 0 712 123 | 5/1996 |
| EP | 0 924 934 | 6/1999 |
| JP | 56-48771 | 5/1981 |
| JP | 10-32789 | 2/1998 |

* cited by examiner

Primary Examiner—Vincent Boccio
(74) Attorney, Agent, or Firm—Oblon, Spivak, McClelland, & Neustadt, P.C.

(57) ABSTRACT

Upon playback of stream data which is recorded while being appended with time stamp information in units of packets, time management is made using the time stamp information. A video playback time viewed from the user, which may be indicated by I-, B-, and P-picture display times, is different from the time of the time stamp information. For this reason, when time management for the stream data recorded on an information storage medium is made using only the time stamp information, display time control (video playback time control) for the user cannot be accurately done. In this invention, a time relationship table indicating the relationship between the time stamp information recorded in stream data at each I-picture start time position and display time information (PTS or field information) for the user is provided to a portion of management information.

8 Claims, 26 Drawing Sheets

| | FIRST STREAM BLOCK | SECOND STREAM BLOCK |
|---|---|---|
| STREAM BLOCK SIZE | FIRST STREAM BLOCK SIZE 262 | SECOND STREAM BLOCK SIZE 264 |
| STREAM BLOCK TIME DIFFERENCE | FIRST STREAM BLOCK TIME DIFFERENCE 263 | SECOND STREAM BLOCK TIME DIFFERENCE 265 |
| NUMBER OF PACKETS (AP_Ns) | 335 | 328 |

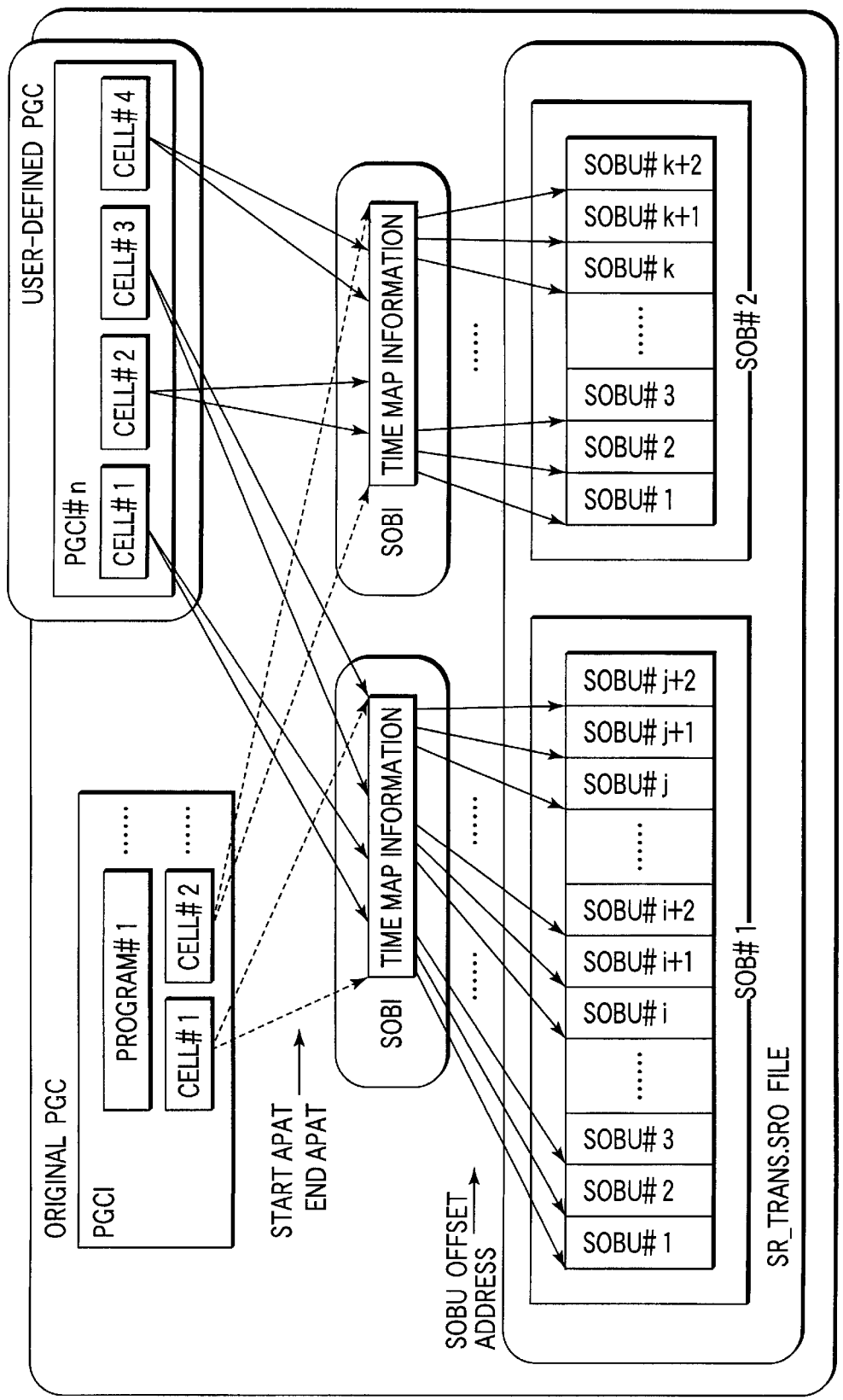
F I G. 18

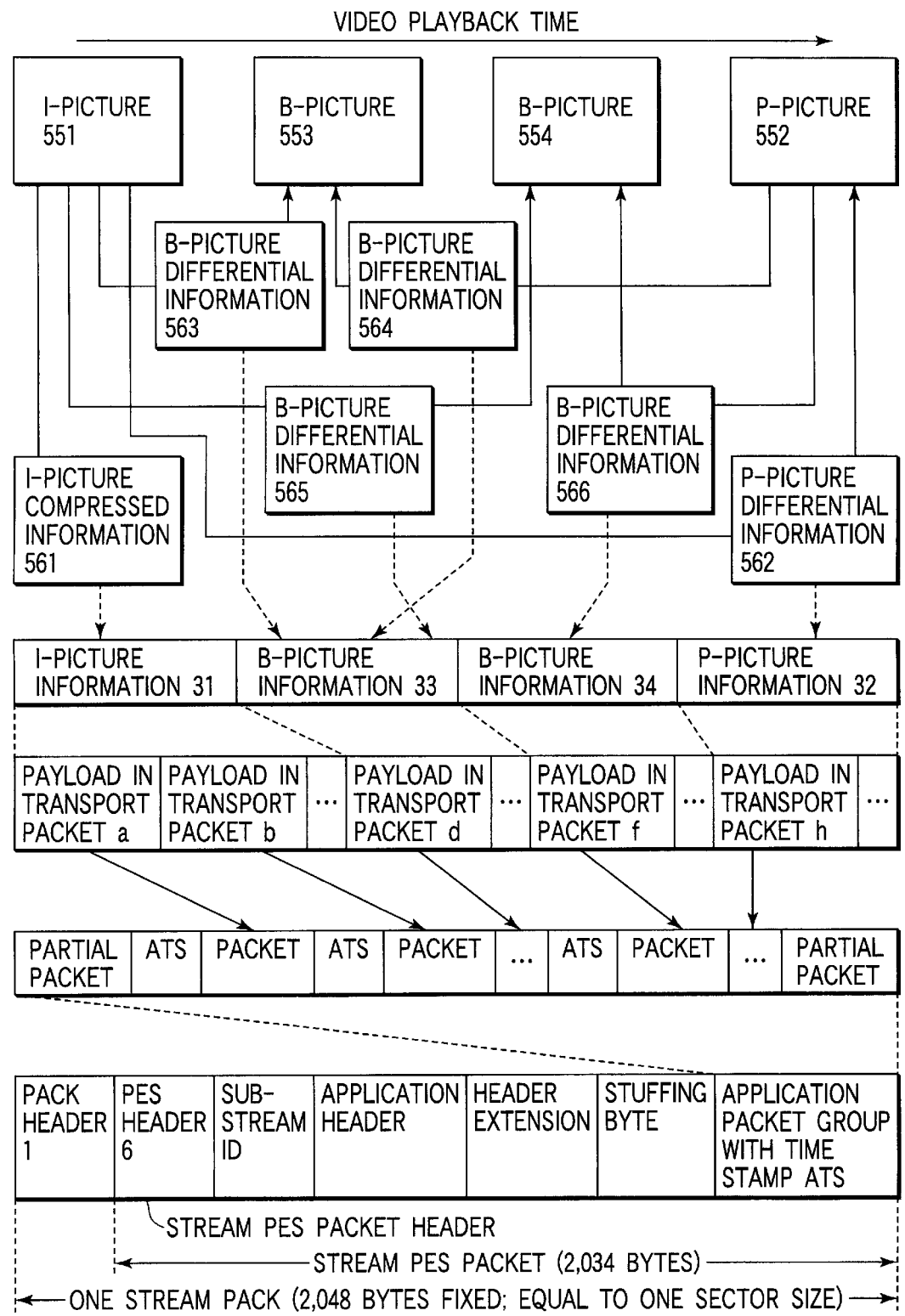
F I G. 22

```
                    ┌─ START ─┐
                    └────┬────┘
┌─────────────────────────────────────────────────────────────────────┐
│ RECEIVE PLAYBACK START TIME INFORMATION AND PLAYBACK END TIME       │
│ INFORMATION S21                                                     │
├─────────────────────────────────────────────────────────────────────┤
│ READ TIME RELATIONSHIP TABLE 2 OF ORIGINAL CELL INFORMATION 272     │
│ CORRESPONDING TO PLAYBACK START POSITION OF INTEREST FROM           │
│ MANAGEMENT INFORMATION RECORDING AREA (STREAM. IFO 105) IN          │
│ INFORMATION STORAGE MEDIUM, AND TEMPORARILY STORE READ TABLE IN     │
│ WORK MEMORY IN STB CONTROLLER S22                                   │
├─────────────────────────────────────────────────────────────────────┤
│ READ TIME MAP INFORMATION 252 OF STREAM OBJECT INFORMATION (SOBI)   │
│ 242 CORRESPONDING TO PLAYBACK START POSITION OF INTEREST, AND       │
│ TEMPORARILY STORE READ INFORMATION IN WORK MEMORY IN STB            │
│ CONTROLLER S23                                                      │
├─────────────────────────────────────────────────────────────────────┤
│ CHECK DEFFERENCE BETWEEN DISPLAY START TIME OF ORIGINAL CELL OF     │
│ INTEREST AND DISPLAY TIME OF IMMEDIATELY PRECEDING I-PICUTURE a     │
│ FROM VALUE OF PTS OFFSET 9 S24                                      │
├─────────────────────────────────────────────────────────────────────┤
│ CHECK POSITION OF I-PICTURE WHICH IS LOCATED IMMEDIATELY BEFORE     │
│ PLAYBACK START TIME DESIGNATED FROM TIME RELATIONSHIP TABLE 2 S25   │
├─────────────────────────────────────────────────────────────────────┤
│ CHECK VALUE OF TIME STAMP #2 OF I-PICTURE i OF INTEREST FROM TIME   │
│ RELATIONSHIP TABLE 2 S26                                            │
├─────────────────────────────────────────────────────────────────────┤
│ CHECK STREAM BLOCK (SOBU) #A THAT INCLUDES TIME STAMP #2 OF I-      │
│ PICTURE i OF INTEREST FROM TIME MAP INFORMATION 252, AND THEN CHECK │
│ ADDRESS OF FIRST SECTOR #α OF THAT STREAM BLOCK S27                 │
├─────────────────────────────────────────────────────────────────────┤
│ INFORM OPTICAL DISC DEVICE OF ADDRESS OF SECTOR #α OF INTEREST TO   │
│ MAKE OPTICAL DISC DEVICE ACCESS PREDETERMINED LOCATION OF           │
│ INFORMATION STORAGE MEDIUM, AND START PLAYBACK S28                  │
├─────────────────────────────────────────────────────────────────────┤
│ STB CONTROLLER INFORMS DECODER UNIT OF INFORMATION OF PTS NO. 6     │
│ INDICATING DISPLAY START TIME S29                                   │
├─────────────────────────────────────────────────────────────────────┤
│ OPTICAL DISC DEVICE PLAYS BACK INFORMATION FROM HEAD OF STREAM      │
│ BLOCK (SOBU) #A AND TRANSFERS IT TO MEMORY IN DECODER UNIT S30      │
├─────────────────────────────────────────────────────────────────────┤
│ READ PICTURE IDENTIFICATION INFORMATION 52 FROM MEMORY IN DECODER   │
│ UNIT, AND DISCARD (OR IGNORE) DATA BEFORE INPUT I-PICTURE S31       │
├─────────────────────────────────────────────────────────────────────┤
│ START DECODING FROM HEAD POSITION OF I-PICTURE i, AND START DISPLAY │
│ FROM POSITION OF DESIGNATED PTS NO. 6 S32                           │
├─────────────────────────────────────────────────────────────────────┤
│ REPEAT SAME PROCESSES AS IN STEPS S24 TO S28 TO CHECK ADDRESS ON    │
│ INFORMATION STORAGE MEDIUM CORRESPONDING TO PLAYBACK END TIME,      │
│ AND PROCEED WITH PLAYBACK UNTIL END ADDRESS CORRESPONDING TO        │
│ PLAYBACK END TIME S33                                               │
└─────────────────────────────────────────────────────────────────────┘
                              ┌─ END ─┐
                              └───────┘
```

FIG. 26

RECORDING MEDIUM OF STREAM DATA INCLUDING MANAGEMENT INFORMATION USED TO ACCESS THE STREAM DATA, AND RECORDING METHOD AND PLAYBACK METHOD OF THE SAME

CROSS-REFERENCE TO RELATED APPLICATIONS

This is a continuation of Application No. PCT/JP00/00944, filed Feb. 18, 2000.

This application is based upon and claims the benefit of priority from the prior Japanese Patent Application No. 11-039461, filed Feb. 18, 1999, the entire contents of which are incorporated herein by reference.

BACKGROUND OF THE INVENTION

The present invention relates to an information storage medium which records video data sent in, e.g., digital broadcast, or stream data sent with a packet structure. Further, the present invention relates to a data structure of management information that pertains to stream data recorded on the medium. Still further, the present invention relates to a recording method and playback method of the management information.

In recent years, TV broadcast has come into the era of digital broadcast. Accordingly, an apparatus for saving digital data of digital TV broadcast as it is irrespective of their contents, i.e., a so-called streamer, has been demanded.

The current digital TV broadcast uses an MPEG transport stream. In the future, an MPEG transport stream will be used as a standard one in the field of digital broadcast using moving picture.

In such digital broadcast, the contents (mainly, video information) to be broadcasted are time-divided into groups of data each having a predetermined size (e.g., 188 bytes) called transport packets, and broadcast data is sent in units of transport packets.

As a streamer for recording digital broadcast data, a home digital VCR such as D-VHS (digital VHS) or the like is currently commercially available. A streamer using D-VHS directly records a broadcasted bitstream on a tape. For this reason, a plurality of programs are multiplexed and recorded on a video tape.

Upon playback, all data are output from the VCR to a set-top box (digital TV reception apparatus; to be abbreviated as an STB hereinafter) either when they are played back from the beginning or the middle of the tape. In this STB, a desired program is selected from the output data by user operation or the like. The selected program information is transferred from the STB to a digital TV receiver, and is played back (playback of video plus audio, etc.).

Since this D-VHS streamer uses a tape as a recording medium, it cannot attain quick random access, and it is difficult to quickly jump to a desired position of a required program so as to play it back.

As a promising candidate that can combat such shortcoming (difficulty of random access) of the tape, a streamer that uses a large-size disc medium such as a DVD-RAM or the like has been proposed. In this case, management data must be inevitably recorded together with broadcast data in consideration of random access, special playback, and the like.

Note that a digital interface that complies with IEEE1394 or the like can be used in data transfer between the STB as a digital TV receiver and the stream that uses large-capacity disc media such as a DVD-RAM and the like, or between the streamer that uses large-capacity disc media and another streamer using a D-VHS or the like.

In this digital interface, video data/stream data are transferred in units of transport packets received in digital broadcast.

For example, in a digital interface using IEEE1394, time stamp data indicating the reception time is appended to each transport packet to guarantee real-time transfer of digital broadcast reception data, thus transferring the data.

Also, in order to guarantee real-time, seamless playback of the digital broadcast reception data recorded on an information storage medium such as a DVD-RAM or the like, the time stamp data is simultaneously recorded together with each transport packet data.

In the aforementioned case, as stream data to be recorded on an information storage medium that uses large-capacity disc media such as a DVD-RAM and the like, each transport packet is recorded while being appended with time stamp data. For this reason, time management is made using this time stamp data.

In digital TV, video data is broadcasted while its information is compressed using a digital compression scheme called MPEG2. In MPEG2, P-picture information has only differential information from I-picture, and B-picture information has only differential information from I- and P-pictures. Therefore, B- or P-picture cannot be solely played back, and playback from I-picture is required to playback these pictures.

Note that the video playback time viewed from the user, which is indicated by display times of I-, B-, and P-pictures, is different from the time stamp information. For this reason, when time management for stream data recorded on the information storage medium is made using only the time stamp data, control of the display time (video playback time) for the user cannot be accurately made.

The present invention has been made to solve the aforementioned problem, and has as its object to provide a data structure of management information, and a recording method and playback method of the same, which make time management of stream data using time stamp data recorded in the stream data, and can make accurate time display control for the user.

BRIEF SUMMARY OF THE INVENTION

In order to achieve the above object, according to the present invention, information (time relationship table; or playback time stamp list PTSL) that indicates the relationship between time stamp data (application time stamp ATS) recorded in stream data, and display time information (PTS or field information) for the user is provided to a portion of management information (stream file information table SFIT).

On the other hand, the relationship among the display time information (PTS or field information) for the user, the start time position of each I-picture (or access unit start map AUSM indicating stream object unit SOBU to which target access unit AU belongs), and time stamp data (ATS) can be indicated by the time relationship table (or PTSL).

An information medium according to the present invention has a data area (STREAM.VRO/SR_TRANS.SRO) where stream data (SOB or SOBU) can be recorded in a predetermined data recording unit (transport packet/application packet), and a management area (STREAM.IFO/SR_MANGR.IFO) where management information (STRI) that pertains to the stream data can be recorded. The management information (STRI) can record: first management information (ATS corresponding to I-picture transfer start time; or AUSM) used to access the stream data (access I-picture information or AU); and third management information (time relationship table; or PTSL) which is different from the first management information (AUSM), and indicates a relationship between the first management information and second management information (PTS; or cell start APAT=SC_S_APAT) used to access the stream data.

A recording method according to the present invention uses an information medium (201) which has a data area (STREAM.VRO) where stream data (SOB or SOBU) can be recorded in a predetermined data recording unit (packet), and a management area (STREAM.IFO) where management information (STRI) that pertains to the stream data can be recorded. The management information (STRI) can record: first management information (ATS corresponding to I-picture transfer start time; or AUSM) used to access the stream data (access I-picture information or AU); and third management information (time relationship table; or PTSL) which is different from the first management information (AUSM), and indicates a relationship between the first management information and second management information (PTS; or SC_S_APAT) used to access the stream data (AU).

Upon recording on such information medium, the first management information (ATS/AUSM) is extracted from stream data to be recorded (step S03); the second management information (PTS) is extracted from the stream data to be recorded (step S04); the stream data (packet data) is recorded on the information medium (201) (step S07); and the third management information (time relationship table/ PTSL) is recorded on the management area (STREAM.IFO/ SR_MANGR.IFO) (step S11).

Alternatively, upon recording on such information medium, a synchronization process of a predetermined reference clock (SCR) is executed between a stream data supply device (STB unit) and a stream data recording device (optical disc device or optical disc drive) (step S54); the third management information (time relationship table; or PTSL) is corrected or modified on the basis of a result of the synchronization process of the reference clock (SCR) (step S56); and the corrected or modified third management information (time relationship table; or PTSL) is recorded in the management area (STREAM.IFO/SR_MANGR.IFO) on the information medium (201) (step S57).

A playback method according to the present invention uses an information medium (201) which has a data area (STREAM.VRO/SR_TRANS.SRO) where stream data can be recorded in a second data unit (SOBU) including a first data recording unit (application packet AP), and a management area (STREAM.IFO/SR_MANGR.IFO) where management information (STRI) that pertains to the stream data can be recorded. The management information (STRI) can record: first management information (ATS corresponding to I-picture transfer start time; or AUSM) used to access the stream data (access I-picture information or AU); and third management information (time relationship table; or PTSL) which is different from the first management information (AUSM), and indicates a relationship between the first management information and second management information (PTS; or SC_S_APAT) used to access the stream data (AU).

Upon playing back the stream data from such information medium (201), when the stream data has a plurality of continuous second data units (for example, SOBU#1 and SOBU#2), a position difference (PTS offset or AP which is not played back in FIG. 29(g)) from a neighboring boundary position of the plurality of continuous second data units (SOBU#1 and SOBU#2) to a position (SC_S_APAT) of the first data recording unit (AP) indicated by the second management information (PTS; or SC_S_APAT) is checked (step S24); read of the stream data recorded on the information medium (201) starts from the neighboring boundary position (step S30) but read data until the position (SCS_S_APAT) of the first data recording unit (AP) indicated by the position difference are discarded or ignored (step S31); and playback (display of playback information) of the stream data recorded on the information medium (201) starts from the position (SC_S_APAT) of the first data recording unit (AP) indicated by the position difference (step S32).

Alternatively, upon playback from such information medium, a start address of the second data unit (SOBU) including the first management information (ATS corresponding to I-picture transfer start time; or AUSM) is checked (step S45); playback information other than an access position (access position of I-picture information or AU) of the stream data indicated as the first management information (AUSM) is discarded or ignored using the checked start address of the second data unit (step S47); and only playback information at the access position (I-picture information; or AU) of the stream data is sequentially played back or displayed (step S49).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a view for explaining the internal structure of a PES header shown in FIG. 1 and the like;

FIG. 18 is a view for explaining the relationship between cells designated by an original or user-defined PGC and SOBUs corresponding to these cells via time map information;

FIG. 22 is a view for explaining the relationship between the video information compression method in MPEG and transport packets, and the relationship between transport packets in MPEG and application packets in the streamer;

FIG. 26 is a flow chart for explaining the playback sequence of stream data according to an embodiment of the present invention;

DETAILED DESCRIPTION OF THE INVENTION

A stream data storage medium according to an embodiment of the present invention, the data structure of management data that pertains to stream data recorded on the medium, a recording method and playback method of the management information, and so on will be described hereinafter with reference to the accompanying drawings.

Figure 1:
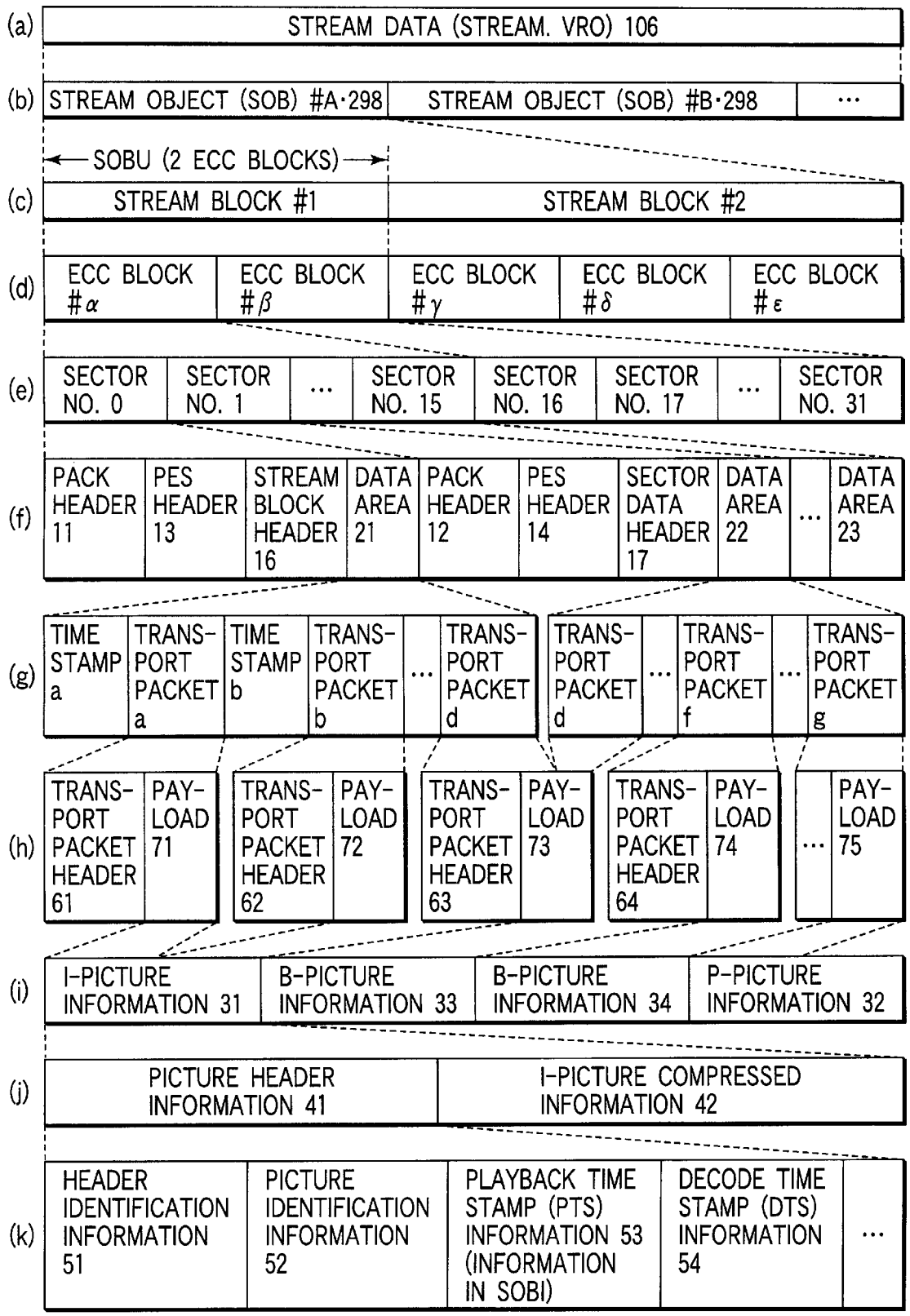
FIG. 1 is a view for explaining the data structure of stream data according to an embodiment of the present invention.

FIG. 1 is a view for explaining the data structure of stream data according to an embodiment of the present invention. The data structure of stream data recorded on an information storage medium will be described using FIG. 1.

Stream data (STREAM.VRO) 106 (FIG. 1(a)) recorded on an information storage medium (201 in FIG. 3 and the like) such as a DVD-RAM disc or the like are combined as stream objects (to be abbreviated as SOBs hereinafter as needed) in units of contents of video information in stream data. Each SOB is formed of stream data obtained by single real-time, continuous recording.

As shown in FIG. 1(b), stream data recorded on the information storage medium are recorded together as stream objects (SOB) #A-298 and #B-299 in units of contents of video information in the stream data.

FIGS. 1(b) to (k) show details of contents of one SOB#A-298 of a plurality of stream objects (SOB#A, #B, . . . ).

Upon recording stream data (STREAM.VRO) 106 on a DVD-RAM disc, each data is recorded using 2,048-byte sectors as minimum units. Furthermore, 16 sectors form one ECC block, and in one ECC block, data are interleaved (the order of data is re-arranged) and a correction code for error correction is appended.

In this embodiment, a stream block (or stream object unit SOBU) is formed by one or more (typically, 2) of ECC blocks as a unit, and stream information undergoes recording, partial erase, edit, and the like in units of stream blocks (or SOBUs).

In this embodiment, the number of ECC blocks that form a stream block can be determined in accordance with the transfer rate of stream data (STREAM.VRO) 106 to be transferred.

For example, in an example shown in FIGS. 1(c) and (d), stream block #1 is formed by two ECC blocks #α and #β, and stream block #2 is formed by three ECC blocks #γ, #δ, and #ε. A DVD streamer forms one stream block (or SOBU) using two ECC blocks (32 sectors).

Each ECC block is made up of 16 sectors, as shown in FIG. 1(e). Therefore, as can be seen from FIGS. 1(c) to (e), stream block (or SOBU) #1 made up of two ECC blocks corresponds to 32 sectors (sectors No. 0 to No. 31).

More specifically, if one sector=2 k bytes, a stream block (SOBU) has a fixed size of 64 k bytes (32 sectors) upon practicing the present invention.

Stream data (STREAM.VRO) 106 is recorded on the information storage medium as pairs of time stamps and transport time packets, as shown in FIG. 1(g).

In such case, pack headers 11 and 12 that record system clock information (system clock reference SCR) and the like and PES headers 13 and 14 are allocated at the head positions of the respective sectors, as shown in FIG. 1(f). Sector data header 17 is recorded immediately after PES header 14, but stream block header 16 is recorded in only the first sector of each stream block (or SOBU) in place of the sector data header.

Note that stream block header 16 or sector data header 17 can have contents corresponding to an application header (to be described later) (see FIG. 9 or FIG. 10).

Sector data header 17 in FIG. 1(*f*) indicates data layout information in data areas 22 and 23.

Data areas 21 and 22 (or 23) in FIG. 1(*f*) are stuffed in turn with time stamps (corresponding to ATS shown in FIG. 20, FIG. 29, etc.) and transport packets (corresponding to packets shown in FIG. 22 or FIG. 23 or application packets AP in FIG. 29), as shown in FIG. 1(*g*).

In the example shown in FIG. 1(*g*), single transport packet d is recorded across a plurality of sectors (No. 0 and No. 1). Such transport packet d corresponds to a partial packet in FIG. 22 or FIG. 23.

Digital broadcast adopts a multi-program compatible multiplexing/demultiplexing scheme called a transport stream, and one transport packet often normally has a size of 188 bytes (or 183 bytes).

On the other hand, one sector size is 2,048 bytes, as described above, and each of data areas 21, 22, and 23 (FIG. 1(*f*)) can record approximately 10 transport packets for digital broadcast even after various header sizes are subtracted.

Each transport packet is made up of a corresponding one of transport packet headers 61 to 64 (corresponding to 511 in FIG. 23(*b*) to be described later), and a corresponding one of payloads 71 to 75 (corresponding to 512 in FIG. 23(*b*) to be described later) that record data, as shown in FIG. 1(*h*).

Each of payloads 71 to 75 records MPEG-encoded I-picture information 31, B-picture information 33, B-picture information 34, and P-picture information 32, as shown in FIG. 1(*i*).

Figure 23:
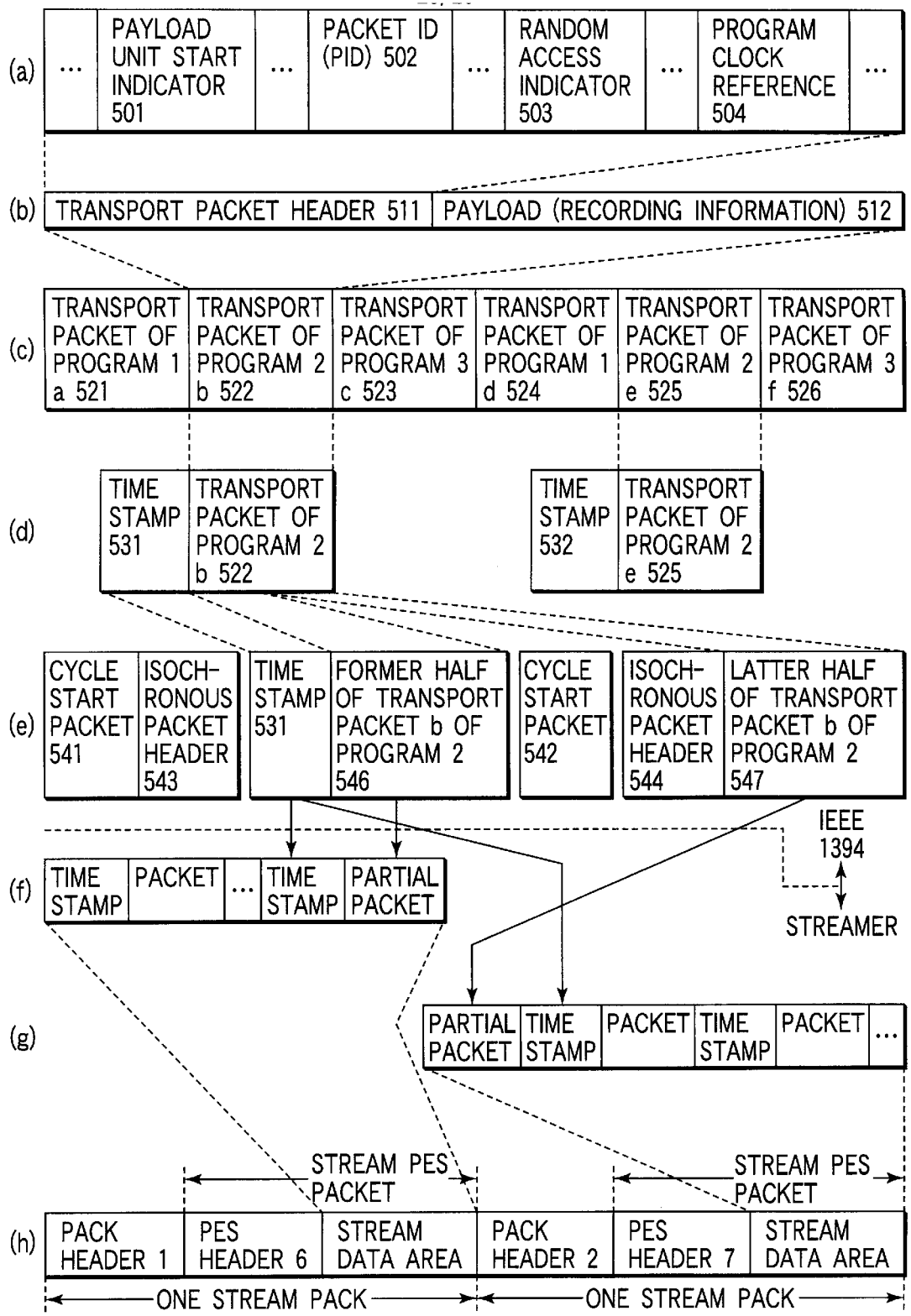
FIG. 23 is a view for explaining the correspondence among the digital broadcast contents, the video data transfer format in IEEE1394, and stream packs in the streamer.

In the first transport packet that records I-picture information 31, random access indicator 503 (see FIG. 23(*a*)) is set with flag="1". On the other hand, in the first transport packets of B-picture information and P-picture information (32 to 34), payload unit start indicator 501 (see FIG. 23(*a*)) is set with flag="1".

In each picture information (31 to 34) divisionally recorded in payloads 71 to 75, picture header information 41, picture compressed information 42 (I-picture compressed information 42 for I-picture information 31) as actual picture information are recorded, as shown in FIG. 1(*j*).

Each picture header information 41 records header identification information 51, picture identification information 52 that can identify I-, B-, or P-picture, PTS (presentation time stamp) information 53 indicating the display timing of a decoder output, and DTS (decode time stamp) information 54 indicating the timing at which a decoder begins to decode, as shown in FIG. 1(*k*). Such picture header information 41 is included in advance in broadcast reception information.

In stream data recorded on the information storage medium, a specific picture position can be identified using picture identification information 52 shown in FIG. 1(*k*).

Alternatively, since PTS information 53 is recorded in picture header information 41, as shown in FIGS. 1(*j*) and (*k*), the decoder can start display using this value.

Figure 2:
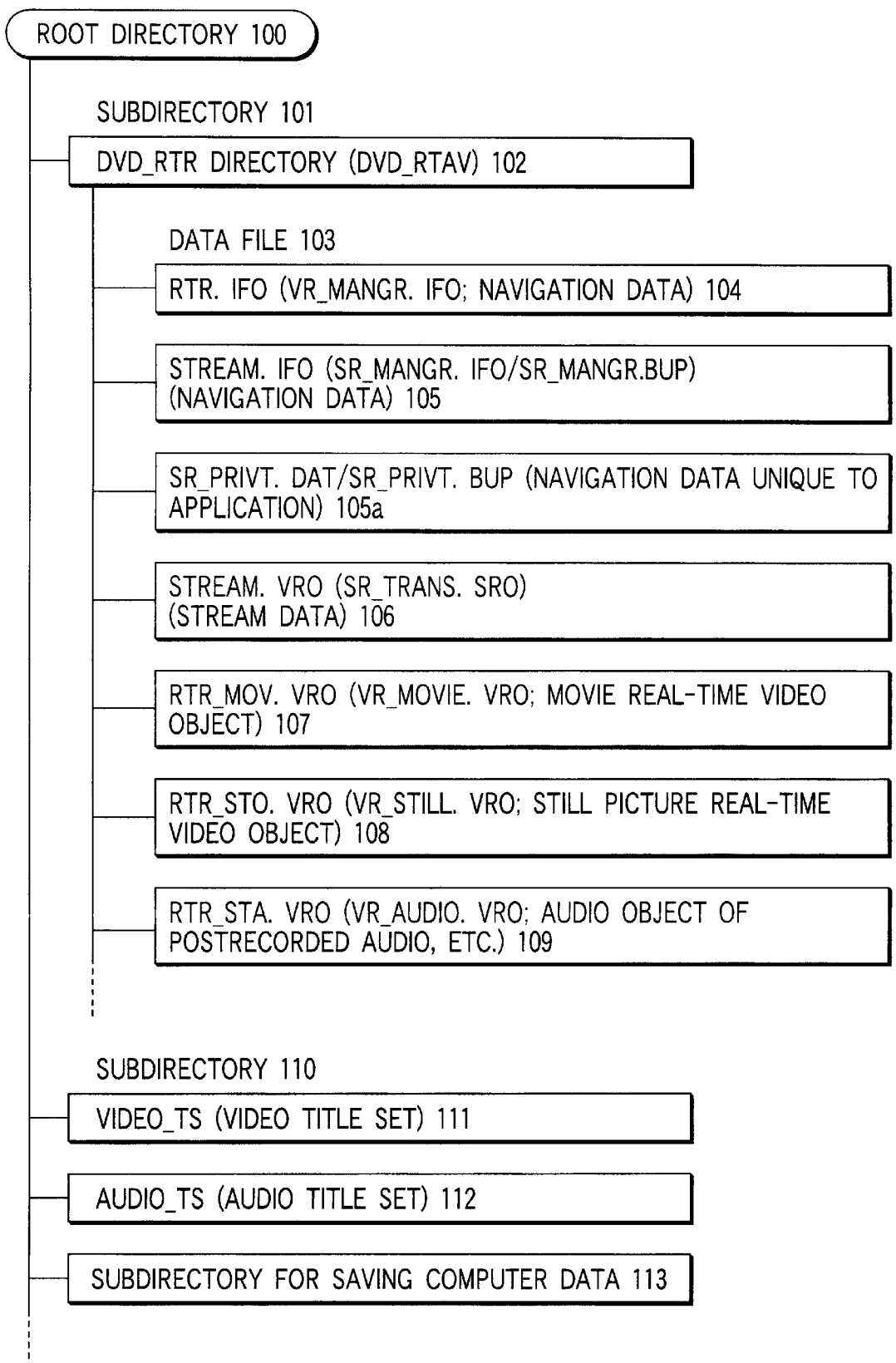
FIG. 2 is a view for explaining the directory structure of data files according to an embodiment of the present invention.

FIG. 2 is a view for explaining the directory structure of data files according to an embodiment of the present invention. The contents (file structure) of information recorded on the information storage medium according to an embodiment of the present invention will be explained below.

Each information recorded on an information storage medium such as a DVD-RAM disc or the like has a hierarchical file structure. Video information and stream data information to be explained in this embodiment are stored in subdirectory 101 named DVD_RTR directory (or DVD_RTAV) 102.

DVD_RTR (DVD_RTAV) directory 102 stores data file 103 having the following contents.

More specifically, as a group of management information (navigation data), RTR.IFO (VR_MANGR.IFO) 104, STREAM.IFO (SR_MANGR.IFO/SR_MANGR.BUP) 105, and SR_PRIVT.DAT/SR_PRIVT.BUP 105*a* are stored.

As a data main body (contents information), STREAM.VRO (SR_TRANS.SRO) 106, RTR_MOV.VRO (VR_MOVIE.VRO) 107, RTR_STO.VRO (or VR_STILL.VRO) 108, and RTR_STA.VRO (or VR_AUDIO.VRO) 109 are stored.

Root directory 100 as an upper layer of subdirectory 101 including data file 103 can be provided with subdirectory 110 for storing other kinds of information.

This subdirectory includes, as its contents, video title set VIDEO_TS 111 that stores video programs, audio title set AUDIO_TS 112 that stores audio programs, subdirectory 113 for saving computer data, etc.

Data which is transmitted on a wired or wireless data communication path in the form of a packet structure and is recorded on an information storage medium while holding the packet structure is called "stream data".

The stream data themselves are recorded together with file name STREAM.VRO (or SR_TRANS.SRO) 106. A file that records management information of the stream data is STREAM.IFO (or SR_MANGR.IFO and its backup file SR_MANGR.BUP) 105.

A file that records analog video information which is used in a VCR (VTR) or conventional TV and is digitally compressed based on MPEG2 is RTR_MOV.VRO (or VR_MOVIE.VRO) 107, a file that collects still picture information including postrecorded audio, background audio, or the like is RTR_STO.VRO (or VR_STILL.VRO) 108, and its postrecorded audio information file is RTR_STA.VRO (or VR_AUDIO.VRO) 109.

Figure 3:
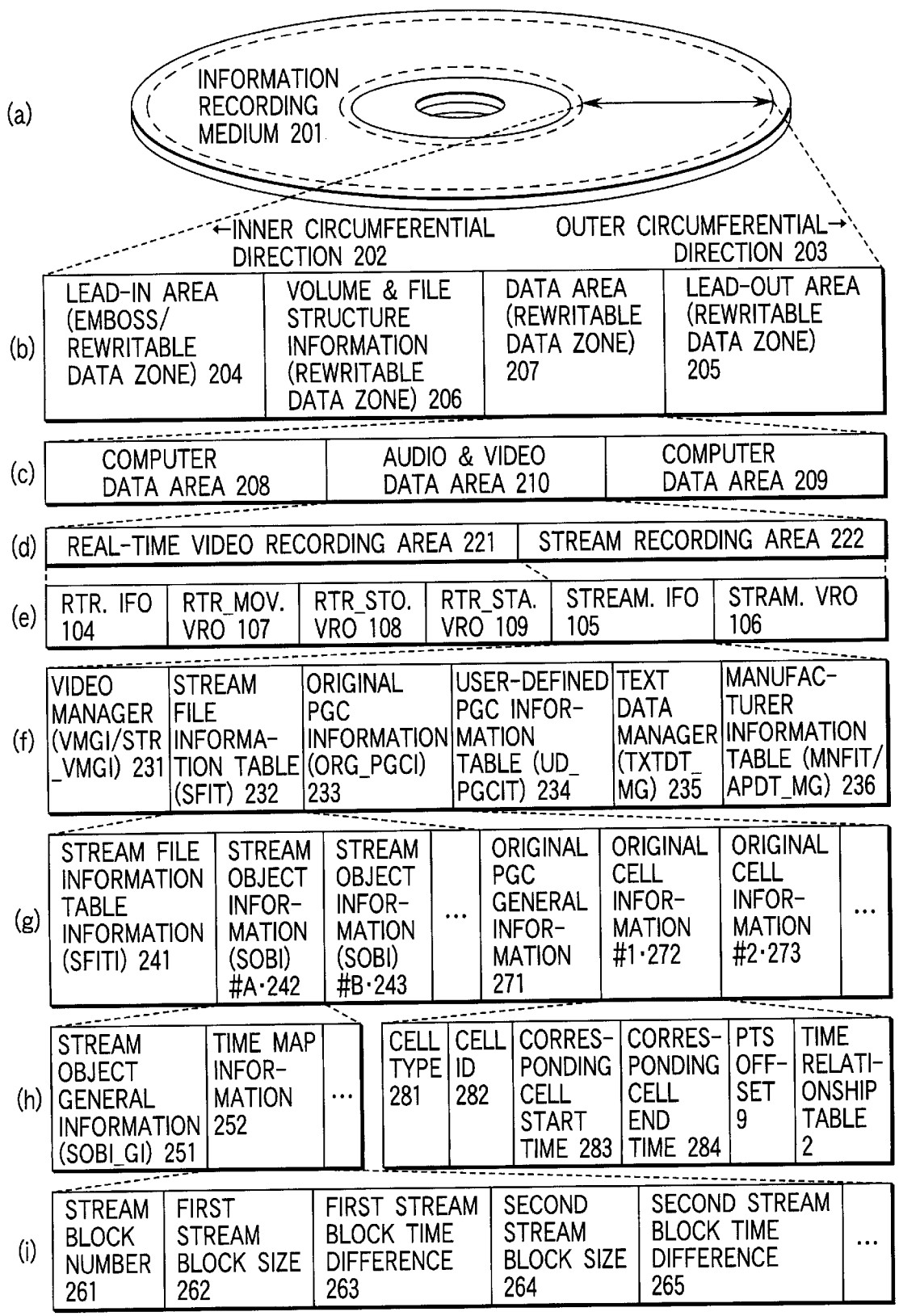
FIG. 3 is a view for explaining the recorded data structure (especially, the structure of management information) on an information medium (recordable/reproducible DVD disc) according to an embodiment of the present invention.

FIG. 3 is a view for explaining the recorded data structure (especially, the structure of management information) on an information medium (recordable/reproducible DVD disc) according to an embodiment of the present invention.

In an area sandwiched between the ends of inner circumferential direction 202 and outer circumferential direction 203 of information storage medium 201 shown in FIG. 3(*a*), lead-in area 204, volume & file structure information 206 that records file system information, data area 207, and lead-out area 205 are present, as shown in FIG. 3(*b*). Lead-in area 204 is made up of an emboss zone and rewritable data zone, and lead-out area 205 is made up of a rewritable data zone. Data area 207 is also made up of a rewritable data zone.

Data area 207 can record computer data and audio & video data together, as shown in FIG. 3(*c*). In this example, audio & video data area 210 is sandwiched between computer data areas 208 and 209.

Audio & video data area 210 can record real-time video recording area 221 and stream recording area 222 together, as shown in FIG. 3(*d*). (Either of real-time video recording area 221 or stream recording area 222 can be used.)

As shown in FIG. 3(*e*), real-time video recording area 221 records RTR navigation data RTR.IFO (VR_MANGR.IFO)

104, movie real-time video object RTR_MOV.VRO (VR_MOVIE.VRO) 107, still picture real-time video object RTR_STO.VRO (VR_STILL.VRO) 108, and audio object RTR_STA.VRO (VR_AUDIO.VRO) 109 such as prerecorded audio or the like, which are shown in FIG. 2.

Also, as shown in FIG. 3(*e*), stream recording area 222 records streamer navigation data STREAM.IFO (SR_MANGR.IFO/SR_MANGR.BUP) 105 and transport bitstream data STREAM.VRO (SR_TRANS.SRO) 106, which are shown in FIG. 2.

Note that stream recording area 222 can also record navigation data SR_PRIVT.DAT/SR_PRIVT.BUP 105*a* unique to an application shown in FIG. 2, although not shown in FIGS. 3(*d*) and (*e*).

This SR_PRIVT.DAT 105*a* is navigation data unique to an individual application connected (supplied) to the streamer, and need not be recognized by the streamer.

STREAM.IFO (or SR_MANGR.IFO) 105 as management information that pertains to stream data has a data structure shown in FIGS. 3(*f*) to (*i*).

More specifically, as shown in FIG. 3(*f*), STREAM.IFO (or SR_MANGR.IFO) 105 is comprised of video manager (VMGI or STR_VMGI) 231, stream file information table (SFIT) 232, original PGC information (ORG_PGCI) 233, user-defined PGC information table (UD_PGCIT) 234, text data manager (TXTDT_MG) 235, and manufacturer information table (MNFIT) or application private data manager (APDT_MG) 236 that manages navigation data SR_PRIVT.DAT 105*a* unique to an application.

Stream file information table (SFIT) 232 shown in FIG. 3(*f*) can contain stream file information table information (SFITI) 241, one or more pieces of stream object information (SOBI) #A-242, #B-243, . . . , original PGC information general information 271, and one or more pieces of original cell information #1-272, #2-273, . . . , as shown in FIG. 3(*g*).

Each stream object information (e.g., SOBI#A-242) shown in FIG. 3(*g*) can contain stream object general information (SOBI_GI) 251, time map information 252, and the like, as shown in FIG. 3(*h*).

Each original cell information (e.g., #1-272; corresponding to SCI shown in FIG. 14 to be described later) shown in FIG. 3(*g*) can contain cell type 281 (corresponding to C_TY shown in FIG. 14 to be described later), cell ID 282, corresponding cell start time (corresponding to SC_S_APAT shown in FIG. 6(*b*), FIG. 14, etc. to be described later) 283, corresponding cell end time (corresponding to SC_E_APAT shown in FIG. 6(*b*), FIG. 14, etc. to be described later) 284, PTS offset 9, and time relationship table 2, as shown in FIG. 3(*h*).

Note that PTS offset 9 indicates the difference between the PTS (presentation time stamp value) of a display start picture of an original cell (details of the original cell will be explained later) and that of I-picture located immediately before the display start picture (details will be explained later with reference to FIG. 20).

Time map information 252 in FIG. 3(*h*), which is contained in SOBI#A in FIG. 3(*g*) can include stream block number 261, first stream block size 262, first stream block time difference 263, second stream block size 264, second stream block time difference 265, . . . , as shown in FIG. 3(*i*). The contents of each stream block time difference that forms time map information 252 will be explained later with reference to FIG. 5.

Figure 4:
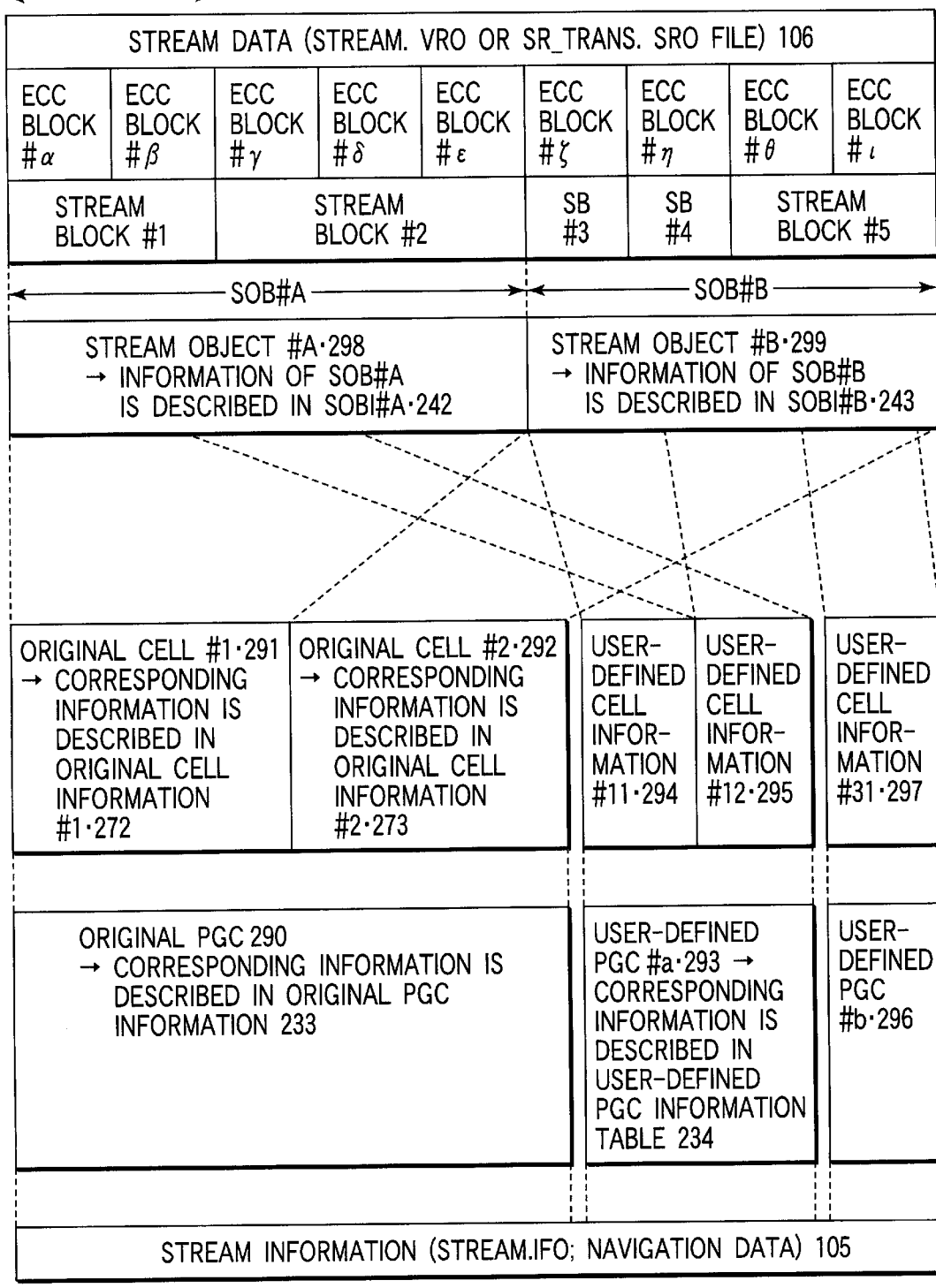
FIG. 4 is a view for explaining the relationship among stream objects (SOB), cells, program chains (PGC), and the like in the present invention.

FIG. 4 is a view for explaining the relationship among stream objects (SOB), cells, program chains (PGC), and the like in an embodiment of the present invention. The relationship between SOB and PGC in the present invention will be explained below using an example shown in FIG. 4.

Stream data recorded in stream data (STREAM.VRO or SR_TRANS.SRO) 106 form stream blocks as sets of one or more ECC blocks, and recording, a partial erase process, and the like are done in units of stream blocks. The stream data form groups called stream objects in units of contents of information to be recorded (e.g., in units of programs in digital broadcast).

Management information (original PGC information 233, user-defined PGC information table 234, or the like) for each stream object (SOB#A, SOB#B) recorded in STREAM.VRO (SR_TRANS.SRO) 106 is recorded in navigation data STREAM.IFO (SR_MANGR.IFO) 105 (see lowermost portion in FIG. 4 and FIGS. 3(*e*) and (*f*)).

Two pieces of management information (STREAM.IFO 105) for stream objects #A-298 and #B-299 in FIG. 4 are recorded as two pieces of stream object information (SOBI) #A-242 and #B243 in stream file information table (SFIT) 232, as shown in FIGS. 3(*f*) and (*g*).

Each of stream object information (SOBI) #A-242 and #B243 contains time map information 252 that mainly describes the data size, time information, and the like in units of stream blocks.

Upon playing back stream data, information (corresponding to PGCI#i in FIG. 14 to be described later) of a program chain (PGC) made up of one or more successive cells is used. Stream data can be played back in accordance with the order in which the cells that form this PGC are set.

There are two types of PGCs, i.e., original PGC 290 (ORG_PGCI-233 in FIG. 3(*f*)) which can continuously play back all stream data recorded in STREAM.VRO (SR_TRANS.SRO) 106, and user-defined PGCs #a-293 and #b-296 (corresponding to the contents of UD_PGCIT-234 in FIG. 3(*f*)) that can set arbitrary locations and order of user choice.

Original cells #1-291 and #2-292 that form original PGC 290 basically have one-to-one correspondence with stream objects #A-298 and #B-299.

By contrast, user-defined cells #11-294, #12-295, and #31-297 that form the user-defined PGC can set arbitrary locations within the range of one stream object #A-298 or #B-299.

Note that the sector size of each stream block can be variously set. As a preferred embodiment, a stream object unit (SOBU) made up of two ECC blocks (32 sectors) and having a constant size (64 k bytes) can be used as a stream block like stream block #1 in FIG. 4.

When the stream block is fixed to be an SOBU having a constant size (e.g., 2 ECC blocks=32 sectors=64 k bytes), the following merits are obtained.

(01) Even when stream data is erased or rewritten in units of SOBUs, an ECC block of that SOBU does not influence ECC blocks of SOBUs other than the SOBU to be erased or rewritten. For this reason, ECC deinterleave/interleave upon erase or rewrite (for SOBUs other than the SOBU to be erased or rewritten) need not be done; and

(02) An access position to recorded information in an arbitrary SOBU can be specified by the number of sectors (or a parameter corresponding to the number of sectors; e.g., information of stream packs or application packets therein shown in FIG. 10 to be described later).

For example, when the middle position of given SOBU#k is to be accessed, the 16th sector position (or application packet position corresponding to the 16th sector position) from the boundary between SOBU#k−1 and SOBU#k can be designated.

Figure 5:
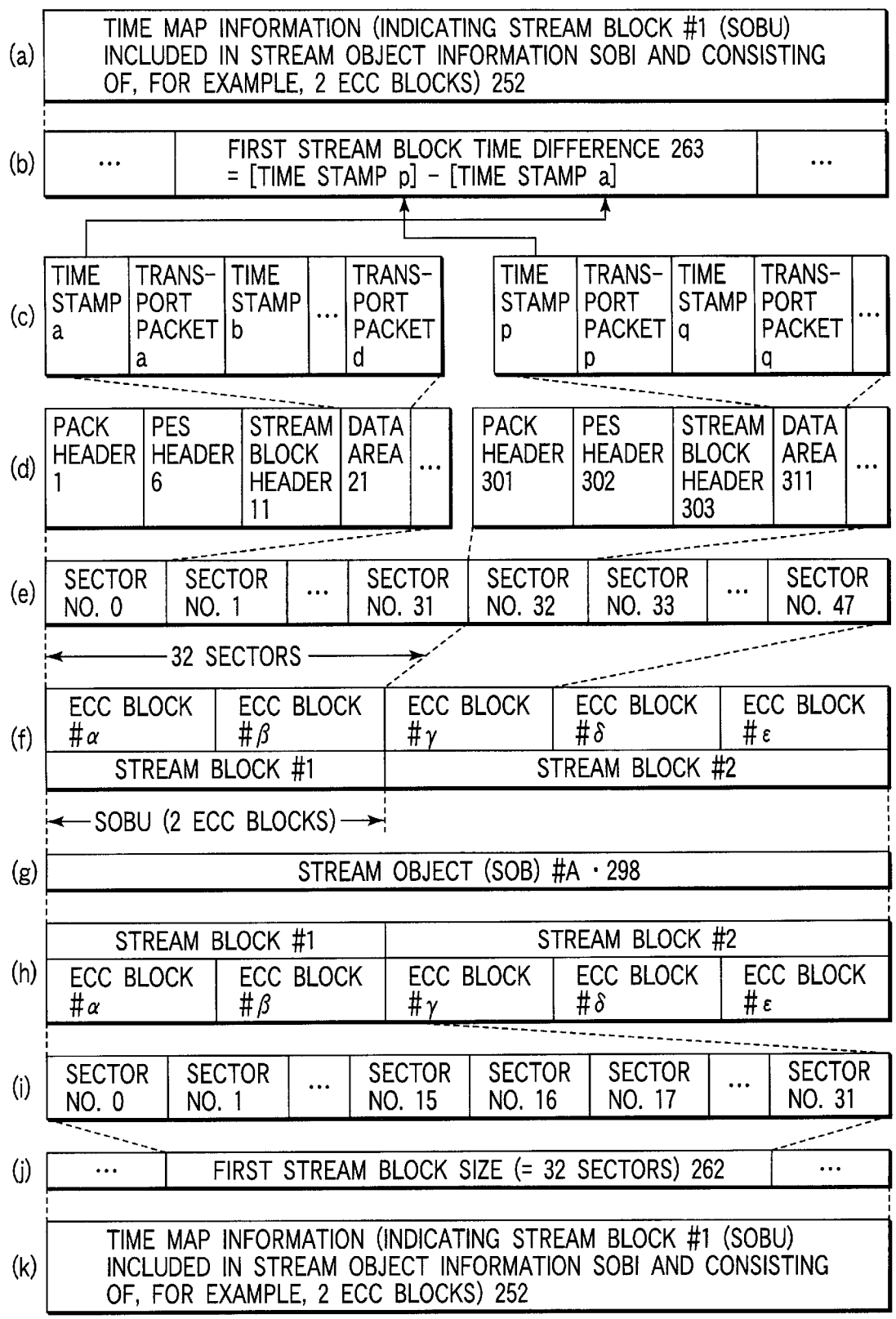
FIG. 5 is a view for explaining the contents of a stream block size, stream block time difference, and the like in time map information.

FIG. 5 is a view for explaining the contents of the stream block size and stream block time difference in the time map information. The contents of individual data in time map information 252 will be explained below using FIG. 5.

As exemplified in FIG. 5(f), FIG. 5(g), and FIG. 5(h), stream object (SOB) #A-298 is made up of stream blocks #1 and #2.

In the example shown in FIGS. 5(f) and (h), the data size of stream block #1 that forms SOB#A-298 is defined by two ECC blocks (#α and #β), i.e., 32 sectors (FIGS. 5(e) and (i)). That is, first stream block size 262 (FIG. 5(j)) in time map information 252 (FIG. 5(a) and FIG. 5(k)) is 32 sectors (64 k bytes).

Stream block #1 (FIG. 5(f)) located at the head position of SOB#A-298 (FIG. 5(g)) has sector No. 0 (FIG. 5(e)) at its head position, and time stamp a is recorded at the head position of data area 21 (FIG. 5(d)) included in sector No. 0.

Subsequent stream block #2 (FIG. 5(f)) of SOB#A-298 (FIG. 5(g)) has sector No. 32 (FIG. 5(e)), and time stamp p (FIG. 5(c)) is recorded at the head position of data area 311 (FIG. 5(d)) included in sector No. 32.

As shown in FIG. 5(c), the time stamp value of the first stream data in stream block #1 is time stamp a, and that of the first stream data of next stream block #2 is time stamp p.

The value of first stream block time difference 263 in FIG. 5(b) (corresponding to stream block time difference 263 in FIG. 3(i)) is given by the difference ([time stamp p]−[time stamp a]) between time stamps a and p.

Note that time map information 252 in FIG. 5(a) can be handled as information including access data unit AUD in stream object information SOBI to be described later with reference to FIG. 15. Information (access unit start map AUSM and the like) included in this AUD can specify an SOBU that includes information to be accessed.

Figure 6:
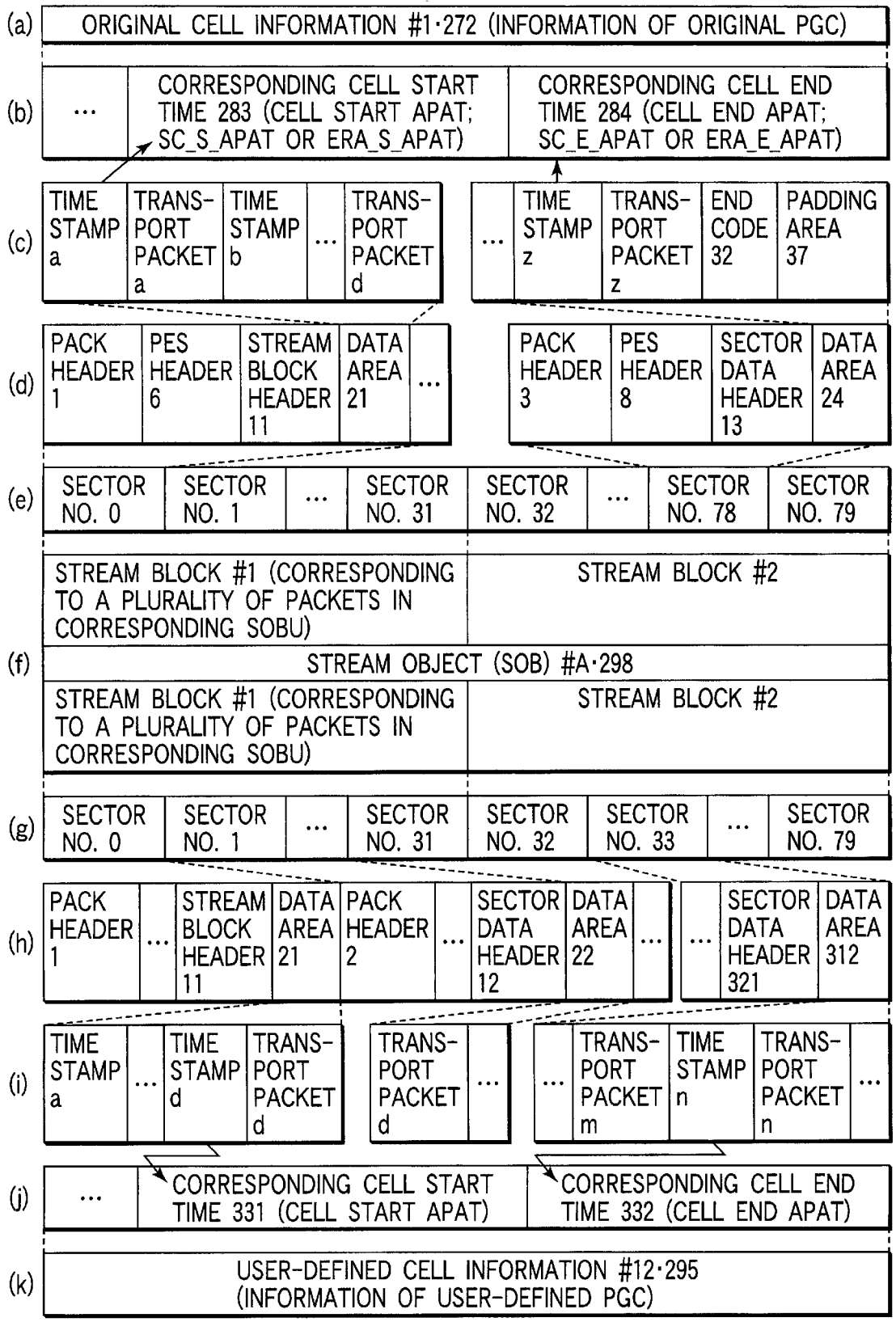
FIG. 6 is a view for explaining the cell range designation method in an original cell and user-defined cell.

FIG. 6 is a view for explaining the cell range designation method in an original cell and user-defined cell. The cell range can be designated by designating the start and end times.

More specifically, the values of first time stamp a and last time stamp z (FIG. 6(c)) in corresponding stream object #A-298 (FIG. 6(f)) are used as the values of corresponding cell start and end times 283 and 284 (FIG. 6(b)) in an original immediately after recording of stream data.

By contrast, the time range in user-defined cell #12-295 (FIG. 6(k)) can designate arbitrary times. For example, as shown in FIGS. 6(i) and (j), the values of time stamps d and n corresponding to designated transport packets d and n can be set as the values of corresponding cell start and end times 331 and 332.

FIG. 6(f) exemplifies a case wherein stream object (SOB) #A-298 is made up of two stream blocks #1 and #2.

In the example shown in FIGS. 6(e) and (g), stream block #1 consists of 32 sectors (sectors No. 0 to No. 31), and stream block #2 consists of 48 sectors (sectors No. 32 to No. 79).

First sector No. 0 in stream block #1 is comprised of pack header 1, PES header 6, stream block header 11, data area 21, and the like, as shown in FIGS. 6(e) and (d).

On the other hand, trailing-side sector No. 78 in stream block #2 is comprised of pack header 3, PES header 8, sector data header 13, data area 24, and the like, as shown in FIGS. 6(e) and (d).

Furthermore, sector No. 1 in FIG. 6(g) records pack header 2, sector data header 12, data area 22, and the like, as shown in FIG. 6(h), and sector No. 33 in FIG. 6(g) records sector data header 321, data area 312, and the like, as shown in FIG. 6(h).

Data area 21 shown in FIGS. 6(d) and (h) records pairs of time stamps a to d and transport packets a to d, as shown in FIGS. 6(c) and (i).

Also, data area 24 in FIG. 6(d) records a plurality of pairs of time stamps and transport packets, end code 32 that follows the last pair of time stamp z+transport packet z, and padding area 37.

Data area 22 shown in FIG. 6(h) includes transport packet d that includes the remaining contents of transport packet d in data area 21, as shown in FIG. 6(i). That is, in this example, the contents of transport packet d are divisionally recorded in data areas 21 and 22.

The former half (on the data area 21 side) of transport packet d in FIG. 6(i) corresponds to a tail-side partial packet in FIG. 23(f) to be described later, and the latter half (on the data area 22 side) of transport packet d in FIG. 6(i) corresponds to a head-side partial packet in FIG. 23(g) to be described later.

Furthermore, data area 312 in FIG. 6(h) records a pair of time stamp n and transport packet n, and other similar pairs, as shown in FIG. 6(i).

Note that start time 331 (FIG. 6(j)) of a cell corresponding to a position where the user or the like designates the playback start time is designated by time stamp d (FIG. 6(i)) for the total of two transport packets d divisionally recorded in data areas 21 and 22.

When a transport packet is changed to read an application packet (AP) and APAT represents the application packet arrival time, cell start time 331 can be expressed by cell start APAT.

On the other hand, end time 332 (FIG. 6(j)) of a cell corresponding to a position where the user or the like designates the playback end time is designated by time stamp n (FIG. 6(i)) for transport packet n in data area 312. This cell end time 332 can be expressed as cell end APAT.

The aforementioned cell start time (cell start APAT) 331 and cell end time (cell end APAT) 332 are recorded in user-defined cell information #12-295, as shown in FIG. 6(k).

This user-defined cell information #12-295 can be recorded in user-defined PGC information table 234 shown in FIG. 3(f) or the lower portion in FIG. 4.

The cell start/end time information that pertains to the user-defined cell information (information of a user-defined PGC) has been explained. On the other hand, cell start/end time information that pertains to original cell information (information of an original cell) can be exemplified as follows.

More specifically, head-side time stamp a in FIG. 6(c) can indicate corresponding cell start time 293 in FIG. 6(b), and tail-side time stamp z can indicate corresponding cell end time 284.

Corresponding cell start time 283 in FIG. 6(b) can correspond to cell start APAT (including stream cell start APAT (SC_S_APAT) or erase start APAT (ERA_S_APAT) to be described later).

Corresponding cell end time 284 in FIG. 6(b) can correspond to cell end APAT (including stream cell end APAT (SC_E_APAT) or erase end APAT (ERA_E_APAT) to be described later).

The aforementioned cell start time (cell start APAT) 283 and cell end time (cell end APAT) 284 are recorded in original cell information #1-272, as shown in FIG. 6(a).

This original cell information #1-272 can be recorded in original cell PGC information 233 shown in FIG. 3(f) or the lower portion in FIG. 4.

Figure 7:
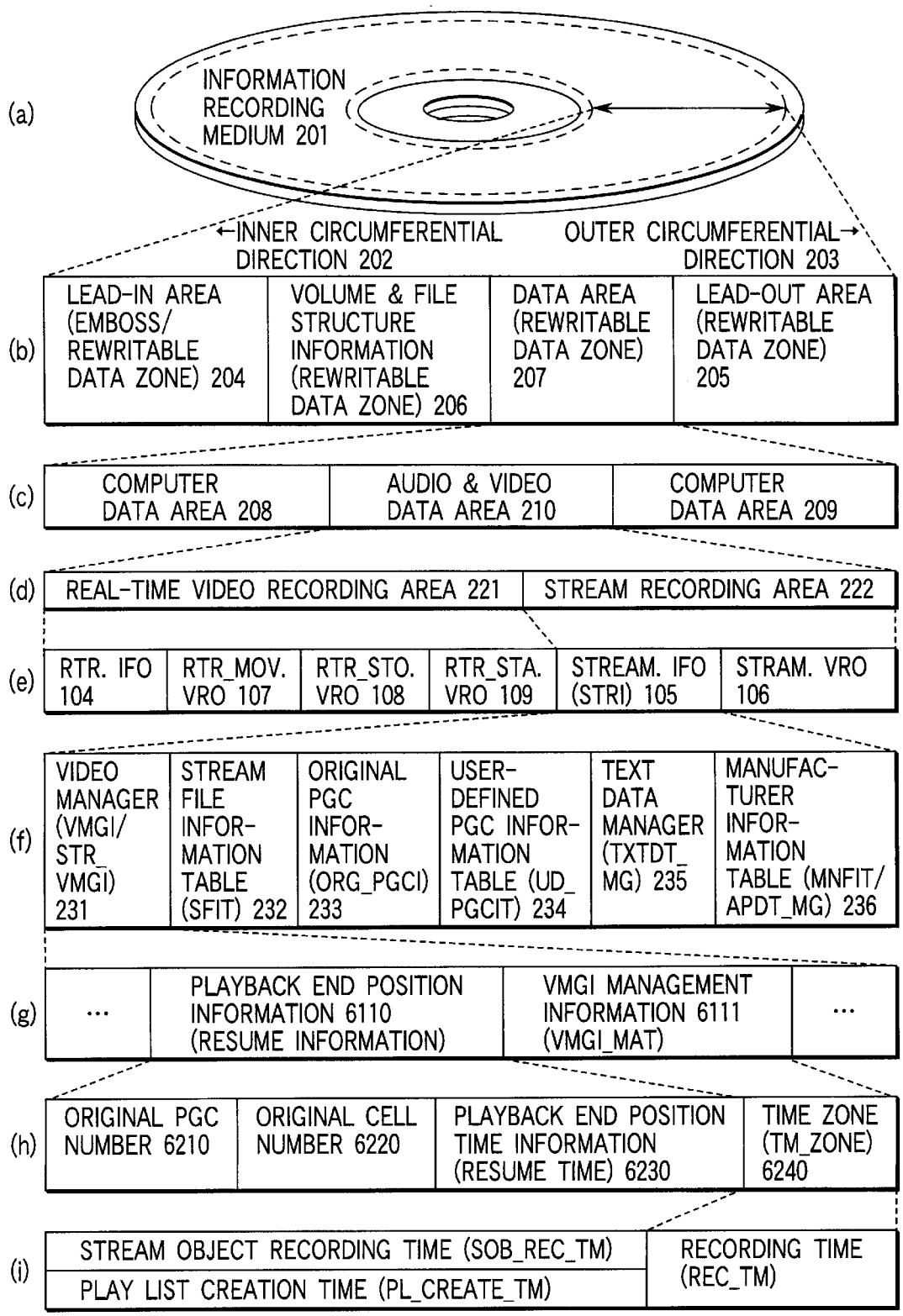
FIG. 7 is a view for explaining the recorded data structure (especially, the structure of playback end position information/resume information, VMGI management information/recording time information, and the like) on an information medium (recordable/reproducible DVD disc) according to another embodiment of the present invention.

FIG. 7 is a view for explaining the recorded data structure (especially, the structure of playback end position information/resume information, VMGI management information/recording time information, and the like) on an information medium (recordable/reproducible DVD disc) according to another embodiment of the present invention.

Since the data format shown in FIGS. 7(a) to (f) is the same as that shown in FIGS. 3(a) to (f), a description thereof will be omitted.

Video manager (STR_VMGI) 231 in FIG. 7(f) contains playback end position information (resume information) 6110, video manager management information (VMGI_MAT) 6111, and the like, as shown in FIG. 7(g).

Playback end position information (resume information) 6110 includes original PGC number 6210, original cell number 6220, playback end position time (resume time) information 6230, and the like, as shown in FIG. 7(h).

Video manager management information (VMGI_MAT) 6111 includes time zone (TM_ZONE) 6240.

Upon completion of playback of the recorded stream block (or original cell), playback end position information 6110 can be recorded in video manager information 231 in a management information recording area (STREAM.IFO) in FIG. 7(e) as resume information.

Note that time information 6230 included in playback end position information 6110 is recorded using a time stamp (ATS) value. However, the present invention is not limited to such specific value, and a PTS value (or a total number of fields from the cell playback start position) may be recorded as time information 6230.

Time zone (TM_ZONE) 6240 includes information of a recording time (REC_TM), as shown in FIG. 7(i).

The information of the recording time (REC_TM) includes a time zone type (TZ_TY) used to identify if REC_TM is based on universal time coordinate (UTC) or specific local time, and a time zone offset (TZ_OFFSET) that describes the time offset of REC_TM from UTC in units of minutes.

The recording time (REC_TM) may be described in the form of a cell start time (SC_S_APAT) shown in FIG. 6(b) and the like or in the form of playback time (presentation time PTM) of that cell.

There are two types of recording time (REC_TM). The first one is a stream object recording time (SOB_REC_TM), and the second one is a play list creation time (PL_CREATE_TM).

Note that the time at which a stream object (SOB) corresponding to an original cell was recorded is indicated by SOB_REC_TM.

Note that the play list is a list of a portion of a program. With this play list, the user can define an arbitrary playback sequence (for the contents of a program). The time at which such play list was created is indicated by PL_CREATE_TM.

Figure 8:
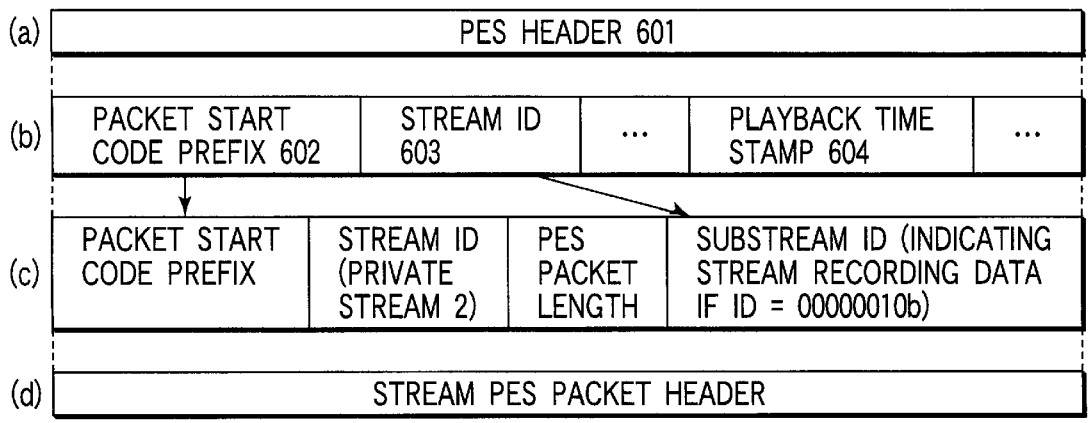

FIG. 8 is a view for explaining the internal structure of a PES header shown in FIG. 1 and the like.

PES header 601 in FIG. 8(a) includes packet start code prefix 602, stream ID 603, playback time stamp 604, and the like, as shown in FIG. 8(b). This PES header 601 corresponds to the PES header shown in FIG. 1(f), FIG. 5(d), FIG. 6(d), etc.

A stream PES header in FIG. 8(d) includes a packet start code prefix, stream ID (private stream 2), PES packet length, substream ID, and the like, as shown in FIG. 8(c). This stream PES header is the same as that shown in FIG. 22 to be described later, and has contents corresponding to PES header 601 in FIG. 8(a).

When the PES header in FIG. 1(f) has the internal structure of PES header 601 shown in FIG. 8(a), if stream ID 603 (FIG. 8(b)) of this PES header is "10111110", a packet having this PES header is defined to be a padding packet (see FIG. 12(g) to be described later) in MPEG.

On the other hand, if substream ID 603 (substream ID in FIG. 8(c)) is "00000010", a packet with that PES header includes stream recording data.

In stream block #1 in FIG. 1(c), last transport packet g (FIG. 1(g)) is present within sectors No. 0 to No. 31 (FIG. 1(e)). However, in stream block #2 (FIGS. 1(e) and (g)), since the user or the like ends video recording halfway through, the last transport packet (not shown) is allocated in a sector before the last one, and the last sector (not shown) is often a free area where no stream data is recorded. In this case, the padding packet (padding packet 40 in FIG. 12(g) to be described later) is recorded in the last sector.

Figure 9:
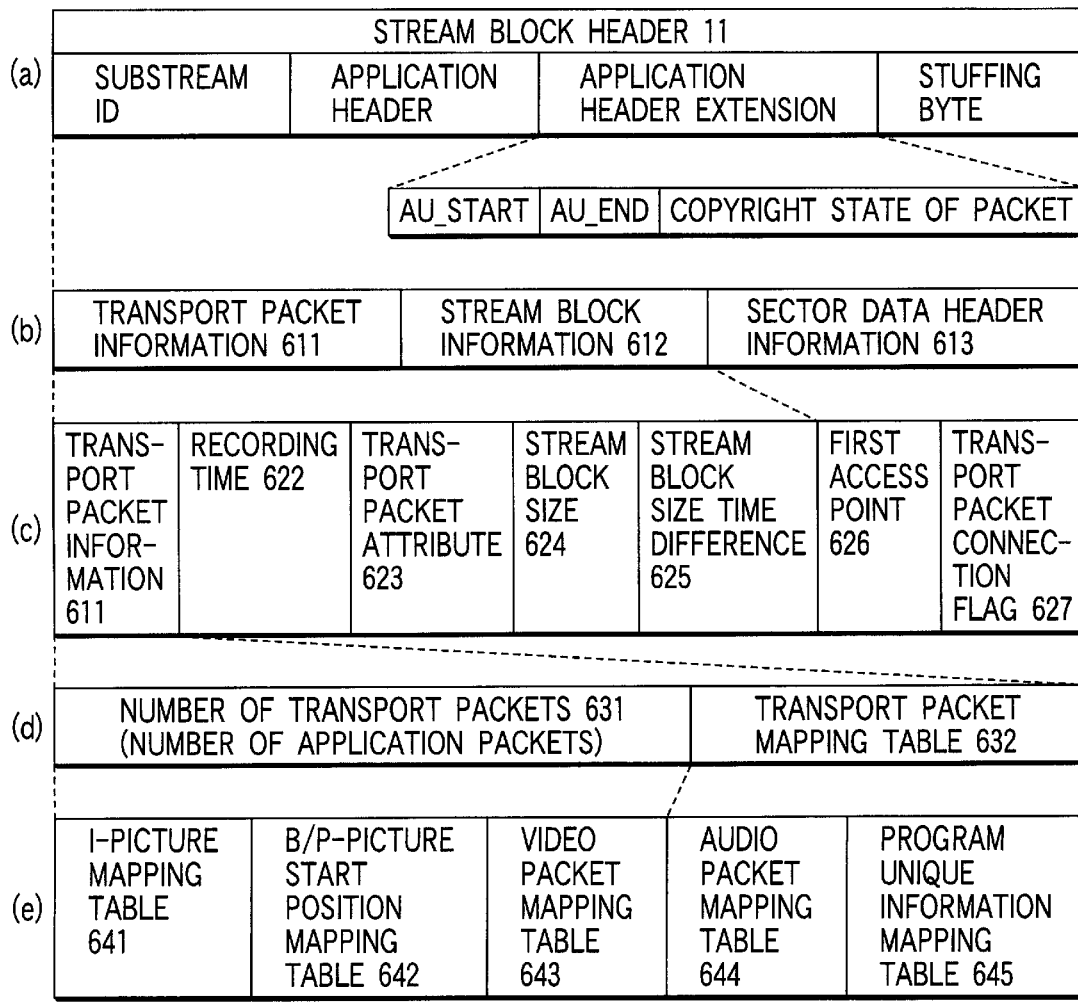
FIG. 9 is a view for explaining the internal structure of a stream block header shown in FIG. 1.

FIG. 9 is a view for explaining the internal structure of the stream block header shown in FIG. 1.

As shown in FIG. 9(a), stream block header 11 has contents corresponding to a substream ID, application header, application header extension, stuffing byte, and the like.

The 1-byte application header extension (option) describes 1-bit AU_START, 1-bit AU END, and 2-bit COPYRIGHT.

When AU_START is set at "1", it indicates that a related application packet (e.g., AP in FIG. 29) includes a random access entry point (start of a random access unit) within the stream.

When AU_END is set at "1", it indicates that a related application packet is the last packet of the random access unit.

COPYRIGHT describes the state of the copyright of a related application packet.

Stream block header 11 includes transport packet information 611, stream block information 612, sector data header information 613, and the like, as shown in FIG. 9(b).

Transport packet information 611 in FIG. 9(b) is the same as transport packet information 611 in FIG. 9(c).

Stream block information 612 in FIG. 9(b) which records information that pertains to the entire stream block corresponds to recording time 622 (information of year, month, day, and time recorded on information storage medium 201), transport packet attribute 623 (attribute information that pertains to a transport packet), stream block size 624 (the data size of the corresponding stream block (e.g., the data size can be expressed by the number of ECC blocks)), stream block time difference 625, and the like in FIG. 9(c).

Taking FIG. 5(b) as an example, time range information in the corresponding stream block is computed by [stream block time difference]=[first time stamp value in stream block #2]–[value of time stamp a]. This [stream block time difference] corresponds to stream block time difference 625.

Sector data header information 613 in FIG. 9(b) corresponds to first access point 626 and transport packet connection flag 627 in FIG. 9(c). This sector data header information 613 includes information similar to sector data 12 shown in FIG. 10 to be described later.

Transport packet information 611 in FIG. 9(c) includes the number 631 of transport packets (the number of application packets), transport packet mapping table 632, and the like, as shown in FIG. 9(d).

Note that the number of application packets in FIG. 9(d) corresponds to AP_Ns in FIG. 10(c) or FIG. 11 to be described later.

The number 631 of transport packets (application packets) in FIG. 9(*d*) can include I-picture mapping table 641, B/P-picture mapping table 642, and the like, as shown in FIG. 9(*e*).

Transport packet mapping table 632 in FIG. 9(*d*) can include video packet mapping table 643, audio packet mapping table 644, program unique information mapping table 645, and the like.

Each mapping table (FIG. 9(*e*)) in transport packet mapping table 632 has a bitmap format.

For example, when n transport packets (application packets) are recorded in one stream block, the number 631 of transport packets (the number of application packets) in FIG. 9(*d*) assumes a value "n".

Furthermore, each of mapping tables 643 to 645 consists of "n-bit data", and one bit is assigned to each of transport packets (application packets) which line up in the stream block from the head side.

Figures 10, 11:
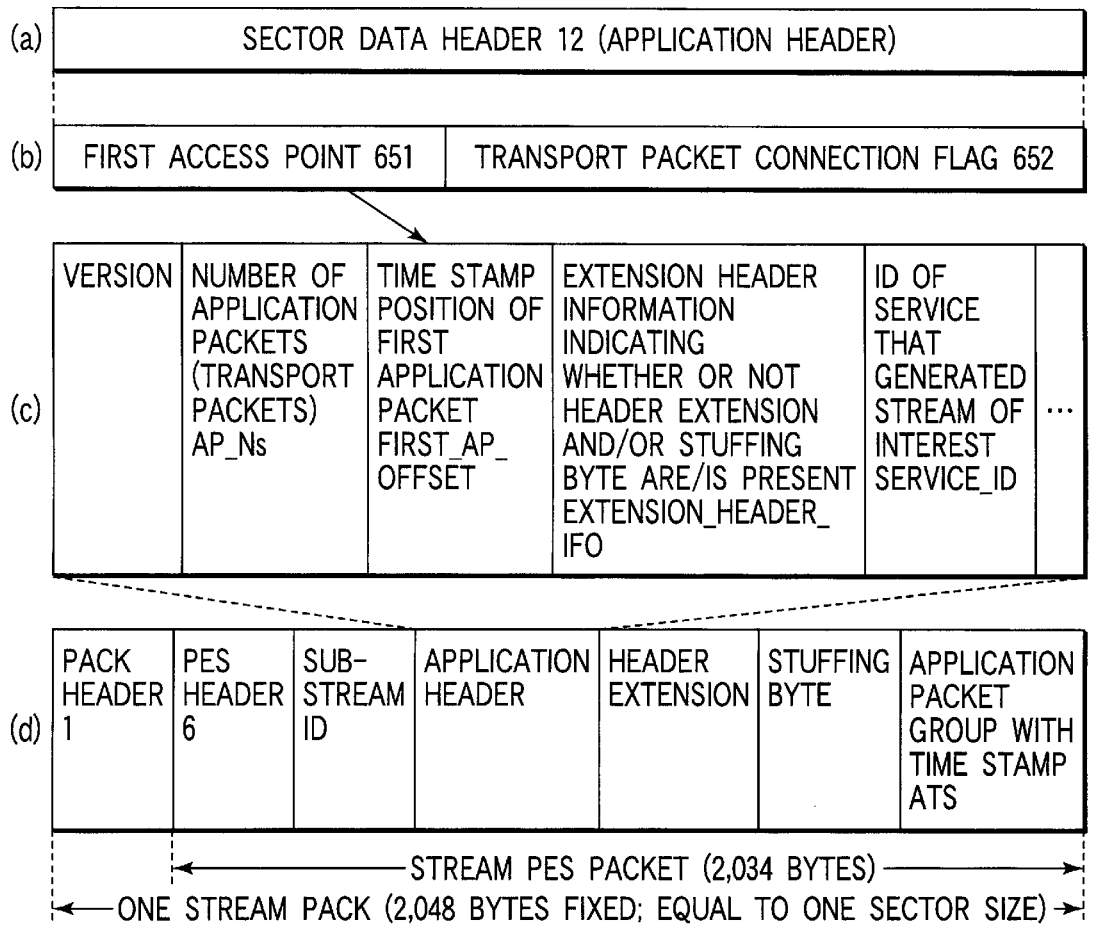
FIG. 10 is a view for explaining the internal structure of a sector data header shown in FIG. 1.
FIG. 11 is a view for explaining another example of time map information in an embodiment of the present invention.

FIG. 10 is a view for explaining the internal structure of the sector data header shown in FIG. 1.

For example, sector data header 17 in FIG. 1(*f*) indicates data layout information in data areas 22 and 23, and corresponds to sector data header 12 (corresponding to an application header in FIG. 10(*d*)) in FIG. 10(*a*).

Sector data header 12 has an internal structure including first access point 651 and transport packet connection flag 652, as shown in FIG. 10(*b*).

As shown in FIG. 10(*d*), one stream pack having a size of 2,048 bytes, which is the same as the sector size, consists of a pack header and stream PES header. The stream PES header contains an application packet header corresponding to a portion of sector data header 12 in FIG. 10(*a*) or stream block header 11 in FIG. 9(*a*).

As shown in FIG. 10(*c*), this application packet header includes:

the version of the application packet header format;
the number AP_Ns of application packets (transport packets) which start within the stream pack of interest;
first application packet time stamp position FIRST_AP_ OFFSET which describes the position of a time stamp of the first application packet which starts within the stream pack of interest by a relative value from the first byte of that stream pack;
extension header information EXTENSION_ HEADER_IFO indicating if a header extension and/or stuffing byte are/is present; and
identifier SERVICE ID of a service which generated the stream of interest.

FIRST_AP_OFFSET included in the application packet shown in FIG. 10(*d*) corresponds to first access point 651 included in sector data header 12 in FIG. 10(*a*).

As shown in FIG. 1(*g*), transport packet d is recorded across two sectors. When the last time stamp or transport packet extends to the next sector, transport packet connection flag 652 is set at "1".

In the example shown in FIG. 1(*g*), the address in data area 22 of the time stamp head position located after transport packet d which extends to the next sector is recorded in first access point 651 (expressed in units of bits).

The first access point value of sector No. 1 (or its corresponding stream pack) shown in FIG. 1(*e*) can be set to be larger than the size of data area 22 (FIG. 1(*f*)) of sector No. 1. This value indicates that the position of a time stamp corresponding to the next packet of a packet recorded in sector No. 1 is present in the next and subsequent sectors.

In an embodiment of the present invention, since a value larger than the size of data areas 21, 22, and 23 can be designated as the value of first access point 651, the time stamp head position can be designated for a packet having a size larger than the sector size (or stream pack size=2,048 bytes).

For example, assume that one packet is recorded across sector No. 0 to sector No. 2 in the data structure shown in FIG. 1. Furthermore, a time stamp for that packet is recorded at the first position in data area 21 of sector No. 0, and a time stamp for the next packet is set at the T-th bit position in a data area of sector No. 2. Such case will be examined below.

In this case, the first access point value of sector No. 0 is "0", that of sector No. 1 is "the size of data area 22 of sector No. 1+T", and that of sector No. 2 is "T".

FIG. 11 is a view for explaining another example of time map information 252 in an embodiment of the present invention.

This time map information 252 is an example different from time map information 252 in FIGS. 3(*h*) and (*i*), and is table information which describes the stream block sizes, stream block time differences, and the numbers (AP_Ns) of packets in units of stream blocks (first stream block, second stream block, . . . ).

Assume that the total number of transport packets (or the total number AP_Ns of application packets) is designated to access (from the STB side) a predetermined frame (picture) using time map information 252 in FIG. 11. Then, the numbers of transport packets (AP_Ns) are summed up (by the disc apparatus side) in turn from the first stream block in FIG. 11 to access a stream block at the time when the designated value has been reached.

Figure 12:
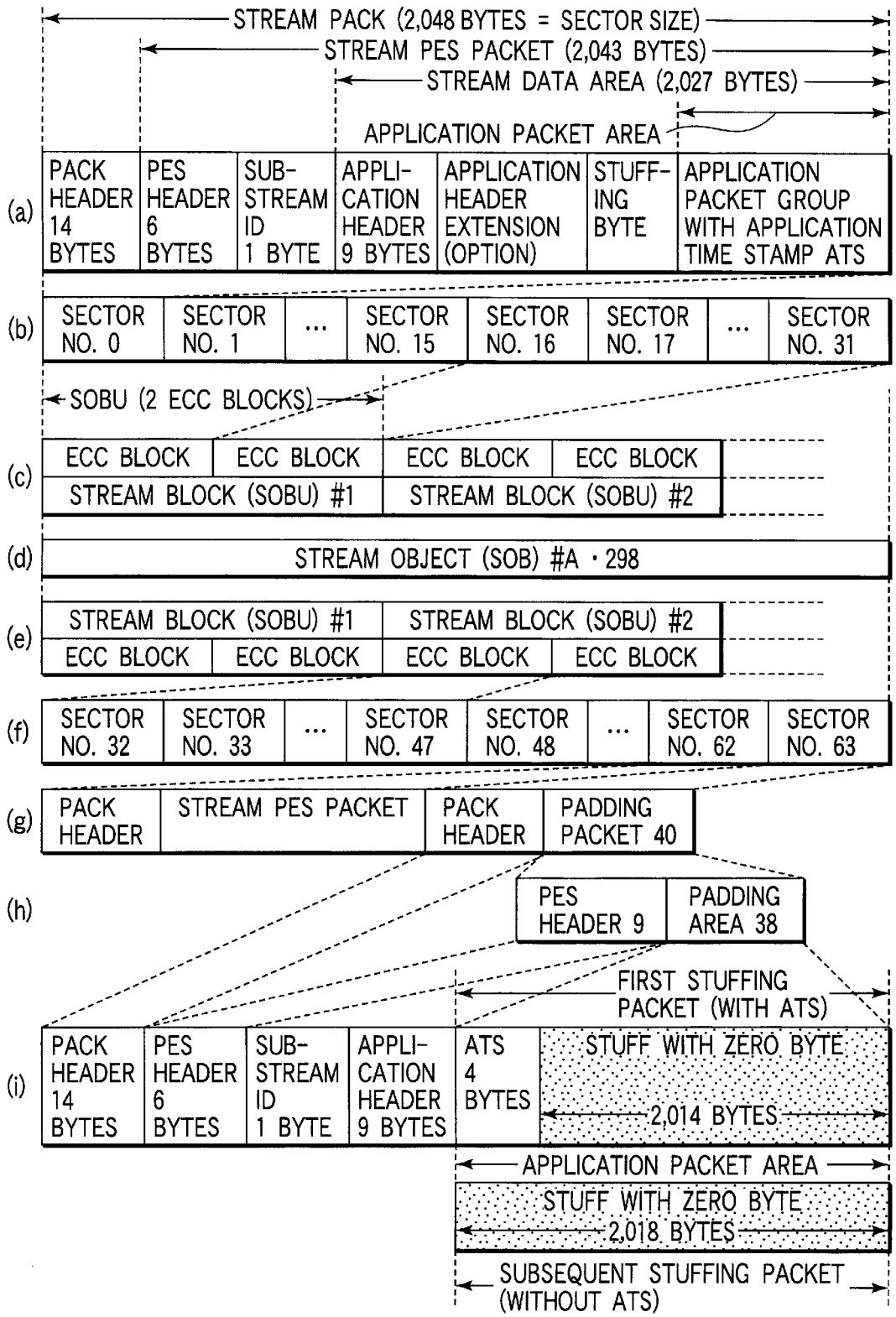
FIG. 12 is a view for explaining an example of the internal structure (a stream pack containing application packets and a stream pack containing stuffing packets) of a sector that forms a stream block (SOBU)

FIG. 12 is a view for explaining an example of the internal structure of a sector (a stream pack including an application packet and a stream pack including a stuffing packet) that forms a stream block (SOBU).

Stream object (SOB) #A-298 in FIG. 12(*d*) is made up of a plurality of stream blocks #1, #2, . . . , as shown in FIGS. 12(*c*) and (*e*).

All stream blocks #1, #2, . . . are formed of stream object units (SOBU) each having a 2-ECC block size (=32 sectors= 64 k bytes).

In this manner, even when stream block (SOBU) #2 is deleted, an ECC block of stream block (SOBU) #1 is not influenced by this deletion.

First stream block (SOBU) #1 of SOB#A-298 is made up of sectors No. 0 to No. 31 (32 sectors/64 k bytes), as shown in FIG. 12(*b*).

Each sector of stream block (SOBU) #1 has a similar data structure. For example, sector No. 0 has a data structure, as shown in FIG. 12(*a*).

More specifically, sector No. 0 consists of a 2,048-byte (2-Kbytes) stream pack, which is made up of a 14-byte pack header and 2,034-byte stream PES packet.

The stream PES packet is comprised of a 6-byte PES header, 1-byte substream ID, and 2,027-byte stream data area.

The stream data area consists of a 9-byte application header, application header extension (option), stuffing byte (option), and application packet area.

The application packet area is made up of a group of application packets each having an application time stamp (ATS) at its head position.

For example, when a transport packet having a 188-byte size is stored as an application packet in the application packet area, approximately 10 application packets can be stored in the application packet area.

In stream recording, an application that generates recording contents makes stuffing by itself to obviate the need for independent adjustment of the pack length. For this reason, in stream recording a stream pack can always have a required length (e.g., 2,048 bytes).

The stuffing byte in FIG. 12(a) is used to maintain the predetermined length (2,048 bytes) of a stream pack.

The pack header shown in FIG. 12(a) contains pack start code information, SCR base information, SCR extension information, program maximum rate information, marker bit, pack stuffing length information, and the like, although not shown.

The SCR base consists of 32 bits, and its 32nd bit is zero. As the program maximum rate, 10,08 Mbps are used.

The PES header and substream ID shown in FIG. 12(a) have the contents shown in FIG. 8(c).

The application header in FIG. 12(a) includes version information, the number AP_Ns of application packets, time stamp position FIRST_AP_OFFSET of the first application packet, extension header information EXTENSION_HEADER_IFO, service ID, and the like, as shown in FIG. 10(c).

Note that the version describes the version number of the application header format.

AP_Ns in the application header describes the number of application packets that start within the stream pack of interest. If the stream pack of interest stores the first byte of ATS, it is determined that an application packet starts in this stream pack.

FIRST_AP_OFFSET describes the time stamp position of the first application packet that starts within the stream packet of interest as a relative value (unit: byte) from the first byte in this stream packet. If no application packet starts within the stream packet, FIRST_AP_OFFSET describes "0".

EXTENSION_HEADER_IFO describes whether or not an application header extension and/or stuffing byte are/is present within the stream packet of interest.

If the contents of EXTENSION_HEADER_IFO are 00b, it indicates that neither the application header extension nor stuffing byte are present after the application header.

If the contents of EXTENSION_HEADER_IFO are 10b, it indicates that the application header extension is present after the application header, but no stuffing byte is present.

If the contents of EXTENSION_HEADER_IFO are 11b, it indicates that the application header extension is present after the application header, and the stuffing byte is also present after the application header extension.

The contents of EXTENSION_HEADER_IFO are inhibited from assuming 01b.

The stuffing byte (option) before the application packet area is activated by "EXTENSION_HEADER_IFO=11b". In this manner, "packing paradox" can be prevented when the number of bytes in the application header extension is contradictory to the number of application packets that can be stored in the application packet area.

SERVICE_ID describes the ID of a service that generates the stream. If this service is unknown, SERVICE_ID describes 0x0000.

The application packet area in FIG. 12(a) can have the same configuration as that shown in the lower portion in FIG. 22 to be described later (change "packet" in FIG. 22 to read "application packet" in FIG. 12).

That is, a partial application packet is recorded at the head of the application packet area, a plurality of pairs of application time stamps ATS and application packets are sequentially recorded after the partial application packet, and a partial application packet is recorded at the end of the application packet area.

In other words, a partial application packet can be present at the start position of the application packet area. At the end position of the application packet area, a partial application packet or a stuffing area with the reserved number of bytes can be present.

The application time stamp (ATS) allocated before each application packet consists of 32 bits (4 bytes). This ATS can be divided into two fields, i.e., a basic field and extended field. The basic field is called a 90-kHz unit value, and the extended field indicates a less significant value measured at 27 MHz.

In FIG. 12(a), the application header extension can be used to store information which can differ between application packets. Such information is not always required for all applications.

Therefore, the data field of the application header is defined to be able to describe the presence of the application header extension as an option in the stream data area (in EXTENSION_HEADER_IFO mentioned above).

Upon recording a stream, the first byte of application time stamp ATS of the first application packet must be aligned to the start position of the application packet area in the first stream packet at the beginning of stream object SOB.

On the other hand, as for the subsequent stream packet in the SOB, an application packet may be segmented (split) at the boundary of neighboring stream packets.

The partial application packet shown in FIG. 22 or FIGS. 23(f) and (g) to be described later indicates an application packet formed by this segmentation (split).

The byte offset of the first application time stamp that starts within the stream packet and the number of application packets which start within that stream packet are described in the application header.

With this format, stuffing before the first application time stamp and after the last application packet is automatically done in a given stream packet.

That is, the automatic mechanism allows "the application to make stuffing by itself". With this automatic stuffing, a stream packet can always have a required length.

The application header extension (option) consists of a list of entries. The list includes one entry having a 1-byte length corresponding to each application packet that starts within the stream packet of interest. The bytes of these entries can be used to store information which may differ in units of application packets.

Note that the 1-byte application header extension (option) describes 1-bit AU_START, 1-bit AU_END, and 2-bit COPYRIGHT.

When AU_START is set at "1", it indicates that a related application packet includes a random access entry point (start of a random access unit) within the stream.

When AU_END is set at "1", it indicates that a related application packet is the last packet of the random access unit.

COPYRIGHT describes the state of the copyright of a related application packet.

The packet structure shown in FIG. 12(a) can be applied to sectors other than the last sector of SOB#A-298, but cannot always be applied to the last sector.

For example, when the last sector of SOB#A-298 is sector No. 63 in FIG. 12(f), and this sector consists of padding packet 40, as shown in FIG. 12(g), the contents of its padding area 38 (FIG. 12(h)) are different from those in FIG. 12(a).

That is, as shown in FIG. 12(i), the stuffing packet as padding packet 40 consists of a 14-byte pack header, 6-byte PES header, 1-byte substream ID, 9-byte application header, and 2,018-byte application packet area.

In a pack that includes the head of the stuffing packet, this application packet area consists of 4-byte application time stamp ATS and 2,014-byte zero byte data (data having substantially no recording contents).

On the other hand, in a pack including the subsequent stuffing packet, this application packet area consists of 2,018-byte zero byte data (without ATS).

When recording is done at very low bit rate, the stuffing byte is required to ensure recovery (playback) of time map information (252 in FIG. 3(h); or MAPL in SOBI in FIG. 15 to be described later). The stuffing packet in FIG. 12(i) is defined as a conceptual unit for that purpose.

The objective of this stuffing packet is achieved when each SOBU includes at least one ATS value as well as the stuffing area.

The following conditions are attached to the stuffing packet:

One or a plurality of stuffing packets always start from the application packet area of a pack after a pack including actual application packet data; and One or a plurality of stuffing packets consist of one 4-byte ATS, and zero byte data (following ATS) required to stuff the application data area of the remaining pack of the SOBU of interest. Assuming that SOBU_SIZ represents the number of sectors per SOBU, if $0 \leq n \leq SOBU\_SIZ-1$, the total length of the stuffing packet is "4+2,014+n×2,018" bytes.

ATS of the stuffing packet is set as follows:

In an SOBU in which at least one pack includes actual application packet data, ATS of the stuffing packet is set to be that of an application packet preceding the stuffing packet; and In an SOBU that does not include any actual application packet, ATS of the stuffing packet is determined in accordance with the contents of time map information or the like.

All packs each of which includes the stuffing packet or a portion of the stuffing packet are configured as follows:

SCR of the pack header is set to be the sum of SCR of the preceding pack and "12,048×8 bits+10,08 Mbps";

The PES packet header and substream ID are the same as those of all other PES packets; and In the application header (see FIGS. 10(c) and 10(d)), AP_Ns=0, FIRST_AP_OFFSET=0, EXTENSION_HEADER_IFO=00b, and SERVICE_ID=0 (other parameters in the application header are set at zero).

Figure 13:
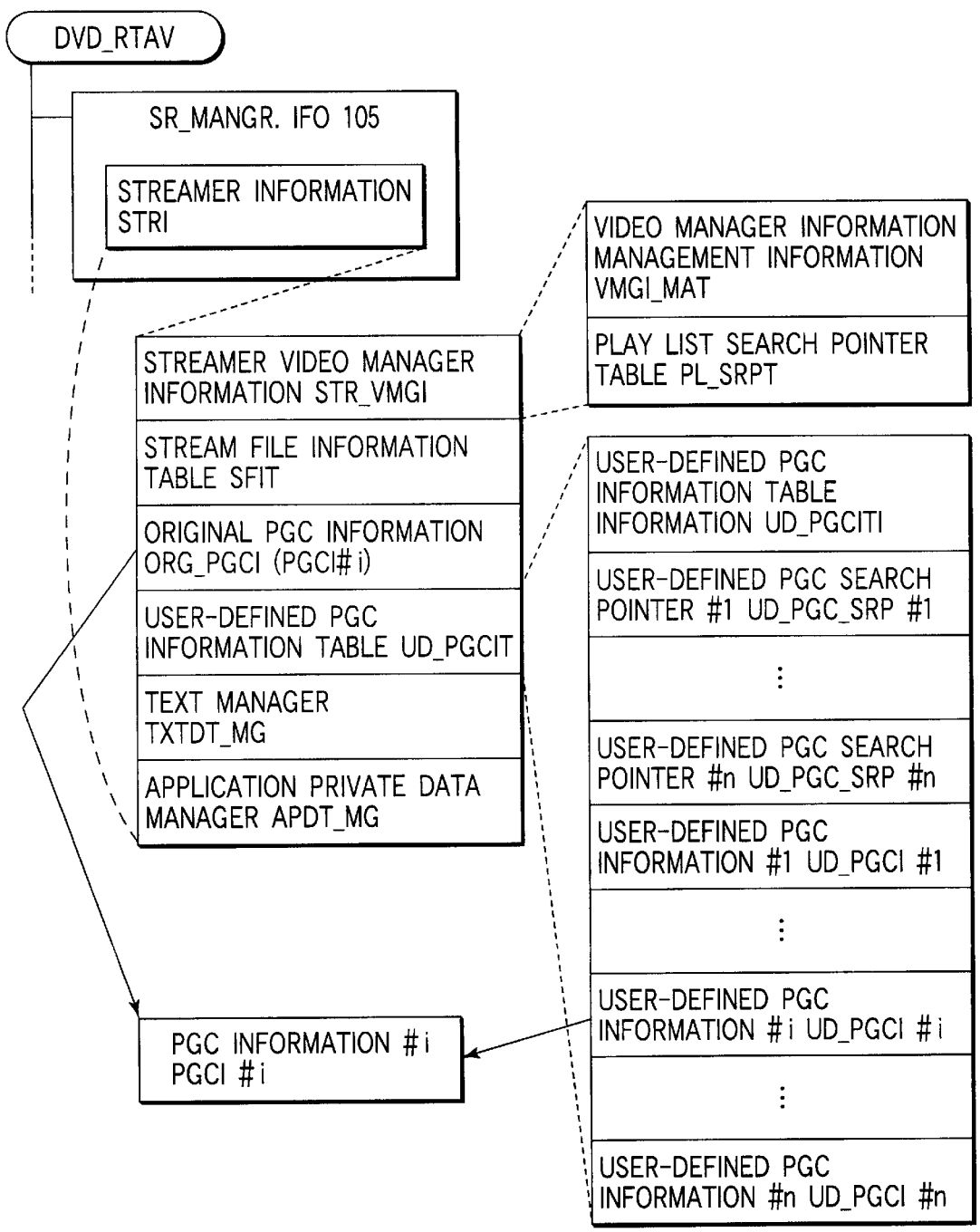
FIG. 13 is a view for explaining the internal data structure of management information (STREAM.IFO or SR_MANGR.IFO in FIG. 2) of the streamer.

FIG. 13 is a view for explaining the internal data structure of management information (STREAM.IFO or SR_MANGR.IFO in FIG. 2) of the streamer.

STREAM.IFO (SR_MANGR.IFO) 105 as management information (navigation data) shown in FIG. 2 or FIG. 3(e) includes streamer information STRI, as shown in FIG. 13.

This streamer information STRI is comprised of streamer video manager information STR_VMGI, stream file information table SFIT, original PGC information ORG_PGCI (more generally, PGC information PGCI#i), user-defined PGC information table UD_PGCIT, text data manager TXTDT_MG, and application private data manager APDT_MG, as shown in FIG. 3(f) or FIG. 13.

Streamer video manager STR_VMGI includes video manager information management information VTSI_MAT that describes management information which pertains to STRI and STR_VMGI, and the like, and a play list search pointer table (PL_SRPT) that describes search pointers used to search for a play list in the stream, as shown in FIG. 13.

Note that the play list is a list of a portion of a program. With this play list, the user can define an arbitrary playback sequence (for the contents of a program).

Stream file information table SFIT includes all navigation data that directly pertain to the streamer operation. Details of stream file information table SFIT will be explained later with reference to FIG. 15.

Original PGC information ORG_PGCI is a portion that describes information which pertains to an original PGC (ORG_PGC). ORG_PGC indicates navigation data which describes a program set. ORG_PGC is a chain of programs, and includes stream data recorded in a ".SRO" file (SR_TRANS.SRO 106 in FIG. 2) shown in FIG. 2 or FIG. 18 to be described later Note that the program set indicates the entire recorded contents (all programs) of information storage medium 201. Upon playing back the program set, the same playback order as the recording order of programs is used except for a case wherein an arbitrary program has been edited, and the playback order of original recording has been changed. This program set corresponds to a data structure called an original PGC (ORG_PGC).

Also, a program is a logical unit of recorded contents, which is recognized by the user or is defined by the user. A program in the program set is made up of one or more original cells. The program is defined within only the original PGC.

Furthermore, a cell is a data structure indicating a portion of a program. A cell in the original PGC is called an "original cell", and a cell in a user-defined PGC (to be described later) is called a "user-defined cell".

Each program in the program set consists of at least one original cell. A portion of a program in each play list consists of at least one user-defined cell.

On the other hand, only a stream cell (SC) is defined in the streamer. Each stream cell looks up a portion of the recorded bitstream. In an embodiment of the present invention, a "cell" means a "stream cell" unless otherwise specified.

Note that a program chain (PGC) is a generic unit. In an original PGC, PGC indicates a chain of programs corresponding to a program set. On the other hand, in a user-defined PGC, PGC indicates a chain of portions of programs corresponding to a play list.

A user-defined PGC indicating a chain of portions of programs includes navigation data alone. A portion of each program looks up stream data belonging to the original PGC.

User-defined PGC information table UD_PGCIT in FIG. 13 can include user-defined PGC information table information UD_PGCITI, one or more user-defined PGC search pointers UD_PGC_SRP#n, and one or more pieces of user-defined PGC information UD_PGCI#n.

User-defined PGC information table information UD_PGCITI includes UD_PGC_SRP_Ns indicating the number of user-defined PGC search pointers UD_PGC_SRP, and UD_PGCIT_EA indicating the end address of user-defined PGC information table UD_PGCIT (not shown).

The number of "UD_PGC_SRP"s indicated by UD_PGC_SRP_Ns is the same as the number of pieces of user-defined PGC information (UD_PGCI), and is also the same as the number of user-defined PGCs (UD_PGC). The maximum value of UD_PGC_SRP_Ns is "99".

UD_PGCIT_EA describes the end address of UD_PGCIT of interest by the relative number of bytes (F_RBN) from the first byte of that UD_PGCIT.

Note that F_RBN indicates the relative number of bytes from the first byte of the defined field, and starts from zero.

PGCI#i that generally expresses original PGC information ORG_PGCI or user-defined PGC information UD_PGCI in user-defined PGC information table UD_PGCIT will be described later with reference to FIG. 14.

Text data manager TXTDT_MG in FIG. 13 is supplementary text information. This TXTDT_MG can be stored in the play list and program together with primary text information PRM_TXTI shown in FIG. 14.

Application private data manager APDT_MG in FIG. 13 can include application private data manager general information APDT_GI, one or more APDT search pointers APDT_SRP#n, and one or more APDT areas APDTA#n (not shown).

Note that application private data APDT is a conceptual area that allows an application device connected to the streamer to store arbitrary non-real time information (more desired information in addition to real-time stream data).

Figure 14:
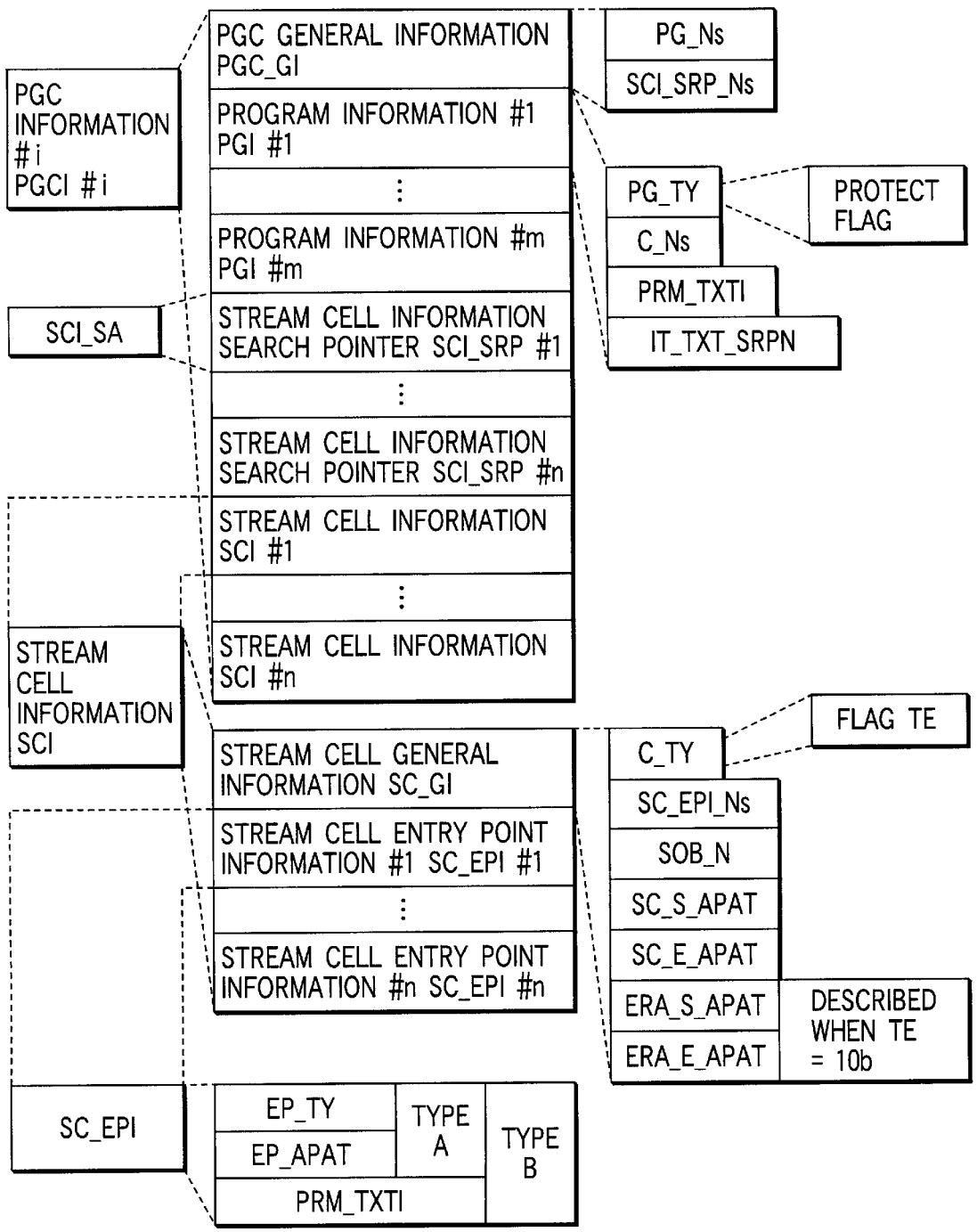
FIG. 14 is a view for explaining the internal data structure of PGC information (ORG_PGCI/UD_PGCIT in FIG. 3 or PGCI#i in FIG. 13)

FIG. 14 is a view for explaining the internal data structure of PGC Information (ORG_PGCI/UD_PGCIT in FIG. 3 or PGCI#i in FIG. 13).

PGC information PGCI#i in FIG. 14 generally expresses original PGC information ORG_PGCI or user-defined PGC information UD_PGCI in user-defined PGC information table UD_PGCIT in FIG. 13.

As shown in FIG. 14, PGC information PGCI#i is made up of PGC general information PGC_GI, one or more pieces of program information PGI#m, one or more stream cell information search pointers SCI_SRP#n, and one or more pieces of stream cell information SCI#n.

PGC general information PGC_GI includes the number PG_Ns of programs, and the number SCI_SRP_Ns of stream cell information search pointers SCI_SRP.

Each program information PGI (e.g., PGI#1) includes program type PG_TY, the number C_Ns of cells in the program of interest, primary text information PRM_TXTI of the program of interest, and search pointer number IT_TXT_SRPN of item text.

Note that program type PG_TY includes information indicating the state of the program of interest. Especially, program type PG_TY includes a flag indicating if that program is protected from an erase error, i.e., a protect flag.

When this protect flag is "0b", the program of interest is not protected; when it is "1b", the program is protected.

The number C_Ns of cells indicates the number of cells in the program of interest. In all the programs and cells in a PGC, cells (tacitly) append themselves to each program in their ascending order.

For example, if program #1 in a given PGC has C_Ns=1, and program #2 has C_Ns=2, first stream cell information SCI of that PGC is appended to program #1, and the second SCI and third SCI are appended to program #2.

Primary text information PRM_TXTI describes text information having a single common character set (ISO/IEC646:1983 (ASCII code)) to allow use of information storage medium (DVD-RAM disc) 201 anywhere in the world.

Item text search pointer number IT_TXT_SRPN describes a search pointer number corresponding to item text (text data corresponding to the program of interest) IT_TXT. If the program of interest has no item text, IT_TXT_SRPN is set at "0000h".

Each stream cell information search pointer SCI_SRP (e.g., SCI_SRP#1) includes SCI_SA indicating the start address of corresponding stream cell information SCI. This SCI_SA is described as the relative number of bytes (F_RBN) from the first byte of PGCI.

Each stream cell information SCI (e.g., SCI#1) is made up of stream cell general information SC_GI and one or more pieces of stream cell entry point information SC_EPI#n.

Stream cell general information SC_GI includes cell type C_TY including flag TE indicating a temporary erase (TE) state, the number SC_EPI_Ns of pieces of entry point information of a stream cell, stream object number SOB_N, stream cell start APAT (SC_S_APAT shown in FIG. 6 and the like), stream cell end APAT (SC_E_APAT shown in FIG. 6 and the like), erase start APAT (ERA_S_APAT shown in FIG. 6 and the like) indicating start APAT of a temporary erase cell if that cell is in the temporary erase state (TE=01b), and erase end APAT (ERA_E_APAT shown in FIG. 6 and the like) indicating end APAT of a temporary erase cell if that cell is in the temporary erase state (TE=10b).

Cell type C_TY describes the type and temporary erase state of the stream cell of interest.

More specifically, cell type C_TY1="010b" is described in the type of all stream cells (with this C_TY1="010b", a stream cell can be distinguished from other cells).

On the other hand, if flag TE is "00b", it indicates that the cell of interest is in a normal state; if flag TE is "01b" or "10b", that cell is in a temporary erase state.

Flag TE="01b" indicates that the cell of interest (cell in the temporary erase state) starts from a position after the first application packet that starts within a SOBU, and comes to an end at a position before the last application packet in that SOBU.

On the other hand, flag TE="10b" indicates that the cell of interest (cell in the temporary erase state) includes at least one SOBU boundary (the first or last application packets starts within that SOBU).

Note that a protect flag of a program and TE flag of a cell in that program cannot be set at the same time. Therefore, (a) none of cells in a program in the protect state can be set in the temporary erase state; and (b) a program including one or more cells in the temporary erase state cannot be set in the protect state.

The number SC_EPI_Ns of pieces of entry point information of a stream cell describes the number of pieces of stream cell entry point information included in stream cell information SCI of interest.

Each stream cell entry point information SC_EPI (e.g., SC_EPI#1) in FIG. 14 includes two types (types A and B).

SC_EPI of type A includes entry point type EP_TY and entry point application packet arrival time EP_APAT. Type A is set by entry point type EP_TY1="00b".

SC_EPI of type B includes primary text information PRM_TXTI in addition to EP_TY and EP_APAT of type A. Type B is indicated by entry point type EP_TY1="01b".

As a tool for skipping a portion of the recorded contents in an arbitrary stream cell, an entry point can be used. All entry points can be specified by application packet arrival times (APAT). This APAT can specify the data output start position.

Stream object number SOB_N describes the number of an SOB that the cell of interest looks up.

Stream cell start APAT (SC_S_APAT) describes start APAT of the cell of interest.

Stream cell end APAT (SC_E_APAT) describes end APAT of the cell of interest.

Erase start APAT (ERA_S_APAT) describes an arrival time (APAT) of the first application packet that starts within the first SOBU, the head position of which is included in a given temporary erase cell (TE field of its C_TY is "10-b") including at least one SOBU boundary, in that temporary erase cell.

Erase end APAT (ERA_E_APAT) describes an arrival time (APAT) of the first application packet that starts within an SOBU including an application packet which immediately follows a temporary erase cell (TE field of its C_TY is "10b") including at least one SOBU boundary, in that temporary erase cell.

Figure 15:
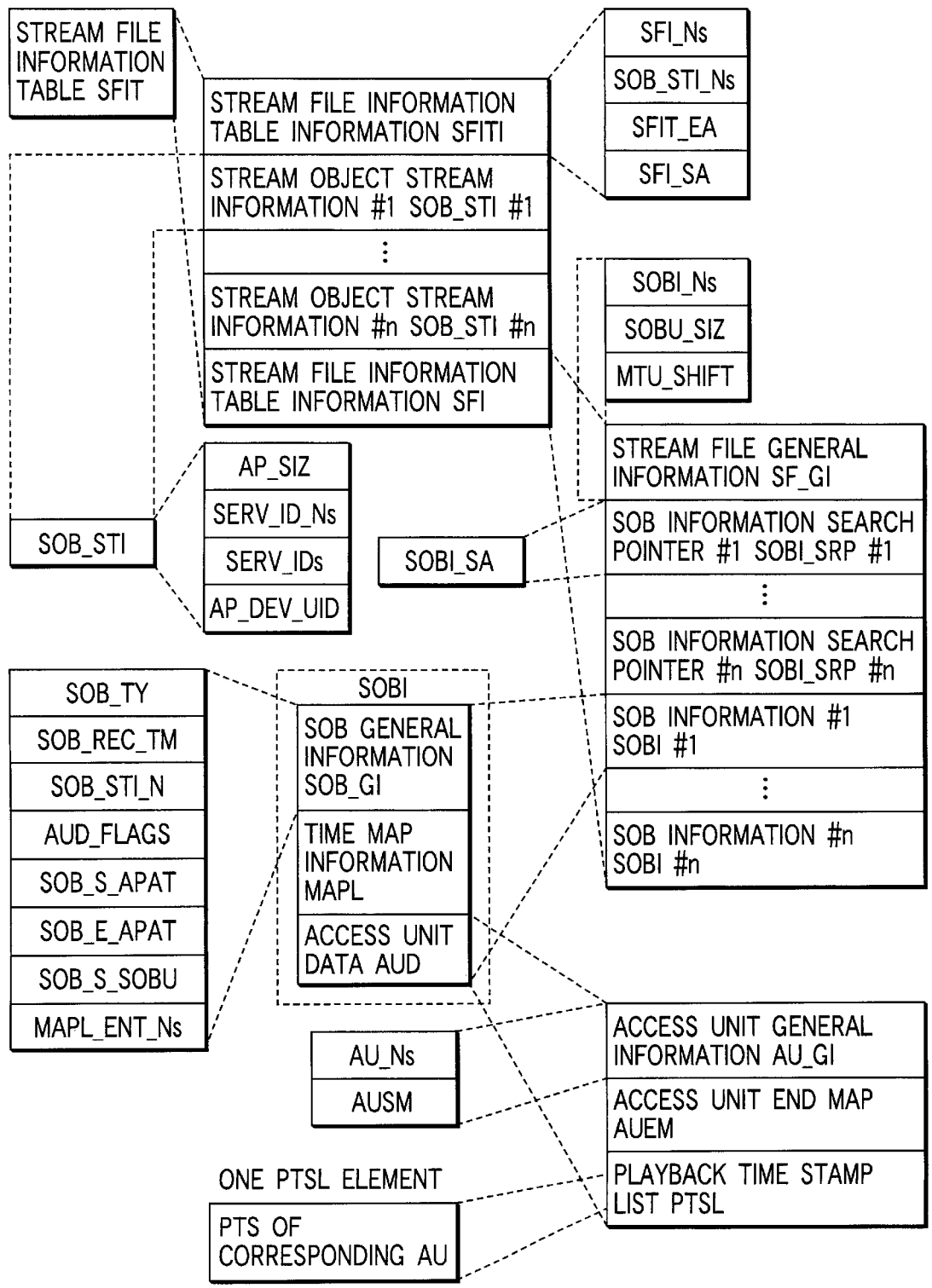
FIG. 15 is a view for explaining the internal data structure of a stream file information table (SFIT)

FIG. 15 is a view for explaining the internal data structure of the stream file information table (SFIT).

As shown in FIG. 15, stream file information table SFIT is made up of stream file information table information SFITI, one or more pieces of stream object stream information SOB_STI#n, and stream file information SFI.

Stream file information table information SFITI consists of the number SFI_Ns of pieces of stream file information on information storage medium (DVD-RAM disc) 201, the number SOB_STI_Ns of pieces of stream object stream information that follow SFITI, end address SFIT_EA of SFIT, and start address SFI_SA of SFI.

SFIT_EA describes the end address of SFIT by the relative number of bytes (F_RBN) from the first byte of SFIT.

SFI_SA describes the start address of SFI by the relative number of bytes (F_RBN) from the first byte of SFIT.

Stream object stream information SOB_STI includes three different parameters. Each parameter can assume a value unique to individual bitstream recording. However, these parameter sets can have equal values in most bitstream recording. Therefore, SOB_STI is stored in a table independently from the table of stream object information (SOBI), and some stream objects (SOB) are allowed to share identical SOB_STI (i.e., point to identical SOB_STI). Therefore, the number of pieces of SOB_STI is generally larger than the number of SOBS.

Each stream object stream information SOB_STI (e.g., SOB_STI#1) in FIG. 15 includes application packet size AP_SIZ, the number SERV_ID_Ns of service IDS, service ID (SERV_IDs), and application packet device unit ID (AP_DEV_UID).

AP_SIZ describes the application packet size by the byte length of a packet in a bitstream transferred from an application device to the streamer.

In the DVD streamer, the application packet size is constant in each bitstream recording. For this reason, if the application packet size changes in each recording free from any interrupt, the current stream object (current SOB) comes to an end there, and a new stream object (new SOB) starts with new AP_SIZ. In this case, the current and new SOBs belong to an identical program in original PGC information (ORG_PGCI).

SERV_ID_Ns describes the number of service IDs included in the subsequent parameter.

SERV_IDs describes a list of service IDs in an arbitrary order.

AP_DEV_UID describes a unique device ID unique to an application device that supplies the recorded bitstream.

As shown in FIG. 15, stream file information SFI is comprised of stream file general information SF_GI, one or more stream object information (SOB information) search pointers (SOB_SRP) #n, and one or more pieces of SOB information (SOBI) #n.

Stream file general information SF_GI includes the number SOBI_Ns of pieces of SOBI, sector size SOBU_SIZ per SOBU, and MTU_SHFT as a kind of time map information.

SOBU_SIZ describes the SOBU size using the number of sectors, and this size is constant to be 32 (32 sectors=64 k bytes). This means that the first entry is associated with an application packet included in the first 32 sectors of an SOB. Likewise, the second entry is associated with an application packet included in the next 32 sectors. The same applies to the third and subsequent entries.

Each SOB information search pointer (e.g., SOBI_SRP#1) includes start address SOBI_SA of SOBI. This SOBI_SA describes the start address of the associated SOBI using the relative number of bytes (F_RBN) from the first byte of stream file information SFI.

Each SOB information (e.g., SOBI#1) is made up of stream object general information SOB_GI, time map information MAPL, and access unit data AUD (option).

Stream object general information SOB_GI includes stream object type SOB_TY, stream object recording time SOB_REC_TM, stream object stream information number SOB_STI_N, access unit data flag AUD_FLAGS, stream object start application packet arrival time SOB_S_APAT, stream object end application packet arrival time SOB_E_APAT, start stream object unit SOB_S_SOBU of the stream object of interest, and the number MAPL_ENT_Ns of entries in time map information.

Stream object type SOB_TY is a field that describes bits indicating the temporary erase state (TE state) and/or bits of the copy generation management system.

Stream object recording time SOB_REC_TM describes the recording time of the associated stream object (SOB).

Stream object stream information number SOB_STI_N describes an index of valid SOB_STI for the stream object of interest.

Access unit data flag AUD_FLAGS describes whether or not access unit data (AUD) is present for the stream object of interest, and the type of access unit data if it is present.

If access unit data (AUD) is present, AUD_FLAGS describes some properties of AUD.

The access unit data (AUD) itself consists of access unit general information AU_GI, access unit end map AUEM, and playback time stamp list PTSL, as shown in FIG. 15.

Access unit general information AU_GI includes AU_Ns indicating the number of access units described in correspondence with the SOB of interest, and access unit start map AUSM indicating an SOBU that belongs to the SOB of interest and includes an access unit.

Access unit end map AUEM is a bit array having the same length as that of AUSM (if it is present), and indicates an SOBU that includes the terminal end of a bitstream segment appended to the access unit of the SOB of interest.

Playback time stamp list PTSL is a list of playback time stamps of all access units that belong to the SOB of interest. One PTSL element included in this list includes a playback time stamp (PTS) of the corresponding access unit.

Note that the access unit (AU) indicates an arbitrary single, continuous portion of the recorded bitstream, and is suitable for individual playback. For example, in an audio/video bitstream, an access unit corresponds to I-picture of MPEG.

The contents of SOB_GI will be explained again.

AUD_FLAGS includes flag RTAU_FLG, flag AUD_FLG, flag AUEM_FLG, and flag PTSL_FLG.

When flag RTAU_FLG is 0b, it indicates that no access unit flag is present in real-time data of the SOB of interest.

When flag RTAU_FLG is 1b, it indicates that AU flags (AU_START, AU_END) described in the application header extension shown in FIG. 9(*a*) or FIG. 12(*a*) can be present in real-time data of the SOB of interest. This state is also allowed when AUD_FLG (to be described below) is 0b.

When flag AUD_FLG is 0b, it indicates that no access unit data (AUD) is present for the SOB of interest.

When flag AUD_FLG is 1b, it indicates that access unit data (AUD) can be present for the SOB of interest.

When flag AUEM_FLG is 0b, it indicates that no AUEM is present in the SOB of interest.

When flag AUEM_FLG is 1b, it indicates that AUEM is present in the SOB of interest.

When flag PTSL_FLG is 0b, it indicates that no PTSL is present in the SOB of interest.

When flag PTSL_FLG is 1b, it indicates that PTSL is present in the SOB of interest.

SOB_S_APAT describes the start application packet arrival time of a stream object. That is, SOB_S_APAT indicates the arrival time of the first application packet that belongs to the SOB of interest.

This packet arrival time (PAT) is divided into two fields, i.e., a basic field and extended field. The basic field is called a 90-kHz unit value, and the extended field indicates a less significant value measured at 27 MHz.

SOB_E_APAT describes the end application packet arrival time of a stream object. That is, SOB_E_APAT indicates the arrival time of the last application packet that belongs to the SOB of interest.

SOB_S_SOBU describes the start stream object unit of the stream object of interest. That is, SOB_S_SOBU indicates an SOBU including the start portion of the start application packet of the stream object.

MAPL_ENT_NS describes the number of entries in time map information (MAPL) that follows SOBI_GI.

Time map information MAPL has contents corresponding to time map information 252 shown in FIG. 3($h$).

One of relevancies between the contents of FIGS. 13 and 15 is summarized as follows:

Streamer information STRI included in management information 105 contains stream file information table SFIT that manages stream object SOB which forms the contents of stream data. This SFIT includes stream object information SOBI that manages SOB. This SOBI includes access unit general information AU_GI including management information (access unit start map AUSM), and management information (PTSL).

Note that the management information (ATS or AUSM) contains information used upon transferring stream data, and the management information (PTS or SC_S_APAT) contains information used when the stream data is displayed.

Figure 16:
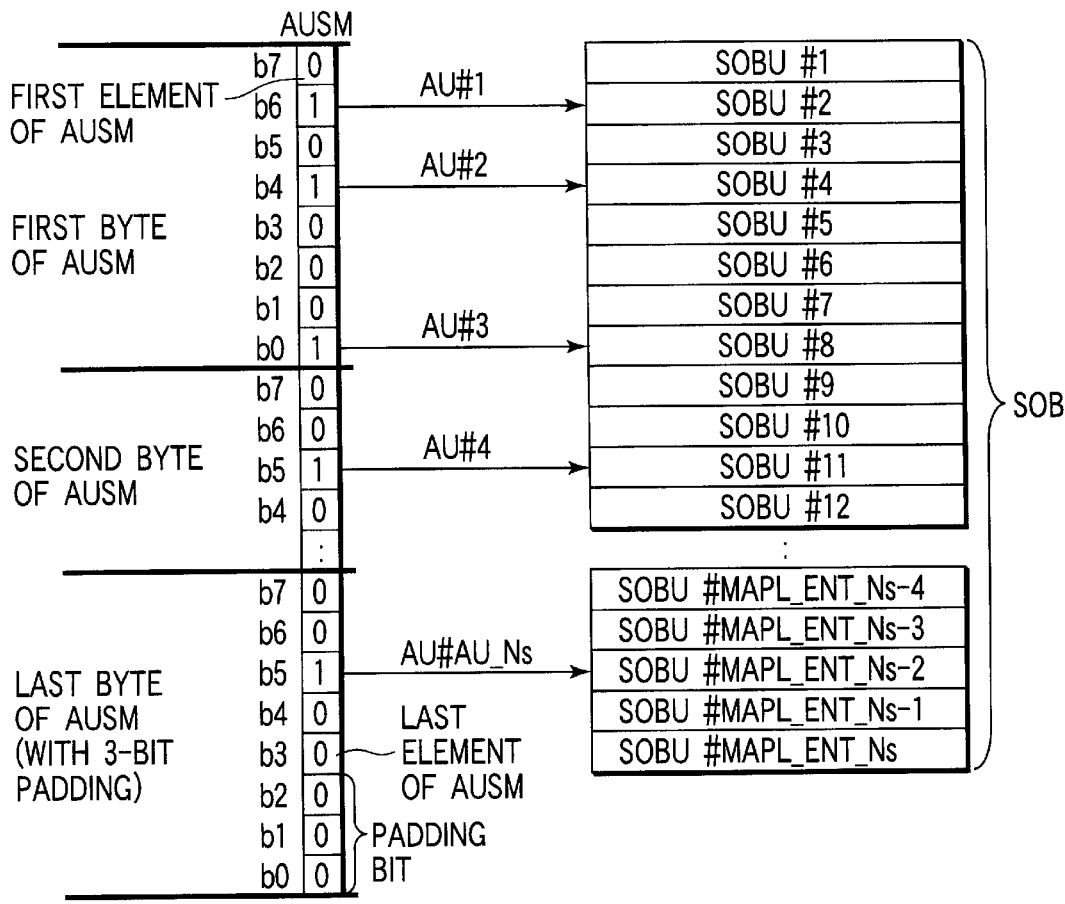
FIG. 16 is a view exemplifying the correspondence between an access unit start map (AUSM) and stream object unit (SOBU)

FIG. 16 is a view exemplifying the correspondence between the access unit start map (AUSM; see FIG. 15) and stream object unit (SOBU; see FIG. 1, FIGS. 4 to 6, and FIG. 12).

As shown in FIG. 16, bit "1" of AUSM indicates that the access unit (AU) is included in the corresponding SOBU.

Assume that AUSM_pos(i) represents the i-th ($1 \leq i \leq AU\_Ns$) bit position where a bit is set in AUSM. Then, the position of access unit AU is as follows.

(1) If SOBU#i indicated by AUSM_pos(i) contains one or more start AUs (described using AU_START and AU_END marks in a stream (if available)), AUSM_pos(i) is assigned to the first AU that starts within SOBU#i. Note that SOBU#i is laid out in SOBUs described using AUSM_pos(i) and AUEM_pos(i) (if AUEM is available).

(2) AU comes to an end at the AU_END mark that appears first after this AU starts, and comes to an end in the last SOBU indicated by the assigned AUEM element (if AUEM is available).

In any access unit data, two or more accessible access units cannot be described per SOBU in an SOB.

Figure 17:
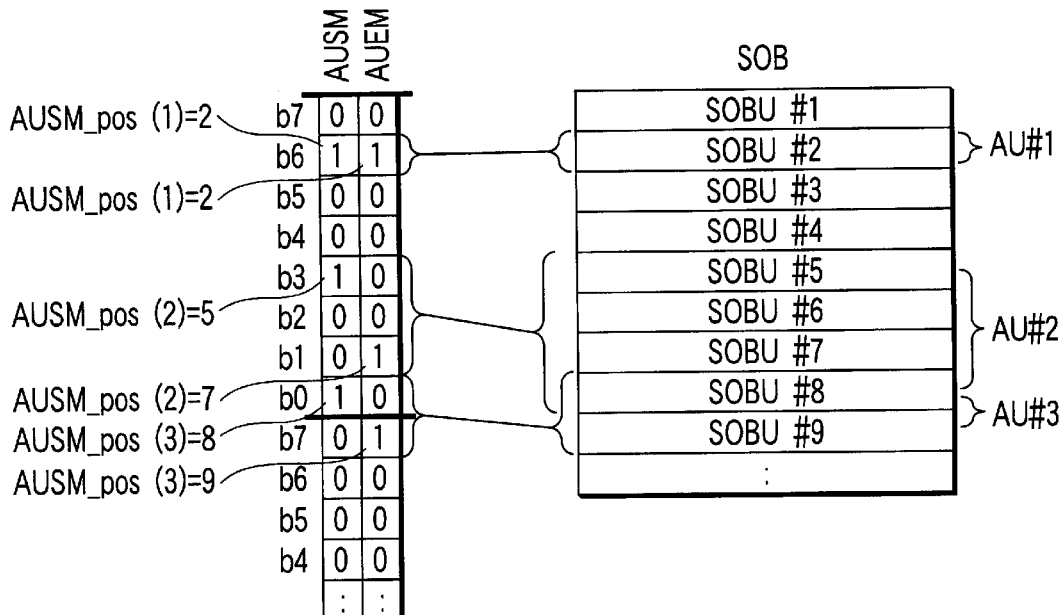
FIG. 17 is a view exemplifying the correspondence between an access unit start map (AUSM) and access unit end map (AUEM), and stream object unit (SOBU)

FIG. 17 is a view exemplifying the correspondence between the access unit start map (AUSM; see FIG. 15) and access unit end map (AUEM; see FIG. 15), and stream object unit (SOBU; see FIGS. 2, 4, and 11).

AUEM is a bit array having the same length as the AUSM (if available). The bits of AUEM indicate a SOBU that includes the end of a bitstream segment appended to the access unit of the SOB of interest.

The number of bits set in AUEM matches that set in AUSM. That is, the set bits in AUSM have those set in AUEM in correspondence with each other.

Assume that AUSM_pos(i) represents the i-th ($1 \leq i \leq AU\_Ns$) bit position where a bit is set in AUSM, and AUEM_pos(i) the i-th ($1 \leq i \leq AU\_Ns$) bit position where a bit is set in AUEM. In this case, the following relations hold:

(1) $1 \leq AUSM\_pos(i) \leq AUEM\_pos(i) \leq MAPL\_ENT\_Ns$;

(2) AUSM_pos(i+1)>AUEM_pos(i);

(3) If i==AU_Ns or AUSM_pos(i+1)>1 AUEM_pos(i), AU#i comes to an end in SOBU#[AUEM_pos(i)] ($1 \leq i \leq AU\_Ns$); and (4) If AUSM_pos(i+1)==1+AUEM_pos(i), AU#i comes to an end in SOBU#[AUEM_pos(i)]. Or it comes to an end at the position of SOBU#[L+AUEM_pos(i)]==SOBU#[AUSM_pos(i+1)]. That is, AU#i comes to an end at the beginning of AU#i+1 in SOBU ($1 \leq i \leq AU\_Ns$).

FIG. 18 is a view showing an example of the relationship defined between cells designated by an original or user-defined PGC, and SOBUs corresponding to these cells via time map information.

A user-defined PGC does not contain its own SOB, but looks up an SOB in an original PGC. Therefore, the user-defined PGC can be described using only PGC information. This means that an arbitrary playback sequence can be implemented without modifying SOB data.

The user-defined PGC does not contain any program, and is made up of a chain of cells corresponding to portions of programs in the original PGC.

FIG. 18 shows an example of such user-defined PGC. In this example, user-defined PGC#n is formed so that a cell in the PGC looks up an SOB in an original PGC.

Referring to FIG. 18, PGC#n has four cells #1 to #4. Of these cells, two cells look up SOB#1, and the remaining two cells look up SOB#2.

The solid arrows from cells in the user-defined PGC to the original PGC (time map information of an SOBI) indicate the playback periods of those cells. The cell playback order in the user-defined PGC becomes quite different from that in the original PGC.

Playback of an arbitrary SOB and its SOBUs is specified by start APAT (S_APAT) and end APAT (E_APAT) in FIG. 18.

S_APAT of the SOB or SOBU is defined in association with a time stamp recorded in the payload (see FIG. 1($h$), FIG. 22, and FIG. 23) of a stream pack of the SOB of interest.

During SOB recording, each incoming application packet is appended with a time stamp by the local clock reference in the streamer. This is the application packet arrival time (APAT).

APAT of the start application packet of the SOB is stored as SOB_S_APAT. Four least significant bytes of all APATs are fixed in advance for a corresponding application packet in a "_.SRO" file.

In order to play back data of the SOB or SOBU, the internal reference clock of the streamer is set at an SCR value, and clocks are then automatically counted. This SCR value is described in the first stream pack (pack header) from which playback begins. Based on the clocks, all subsequent application packets are played back and output from the SOB or SOBU.

When an arbitrary stream cell (SC) defines stream cell start APAT (SC_S_APAT) that has an arbitrary value between SOB_S_APAT and SOB_E_APAT of an SOB that SC points to, an address used to find out an SOBU that includes an application packet with a desired APAT is required.

The number of stream packs per SOBU is constant, but the intervals of arrival times captured by SOBUs are flexible. Therefore, each SOB has time map information (MAPL) that describes the arrival time intervals of its SOBUs. That is, the address system implemented by time map information (MAPL) converts arbitrary APAT into a relative logical block address in the file to point to an SOBU that can find out a desired application packet.

Figure 19:
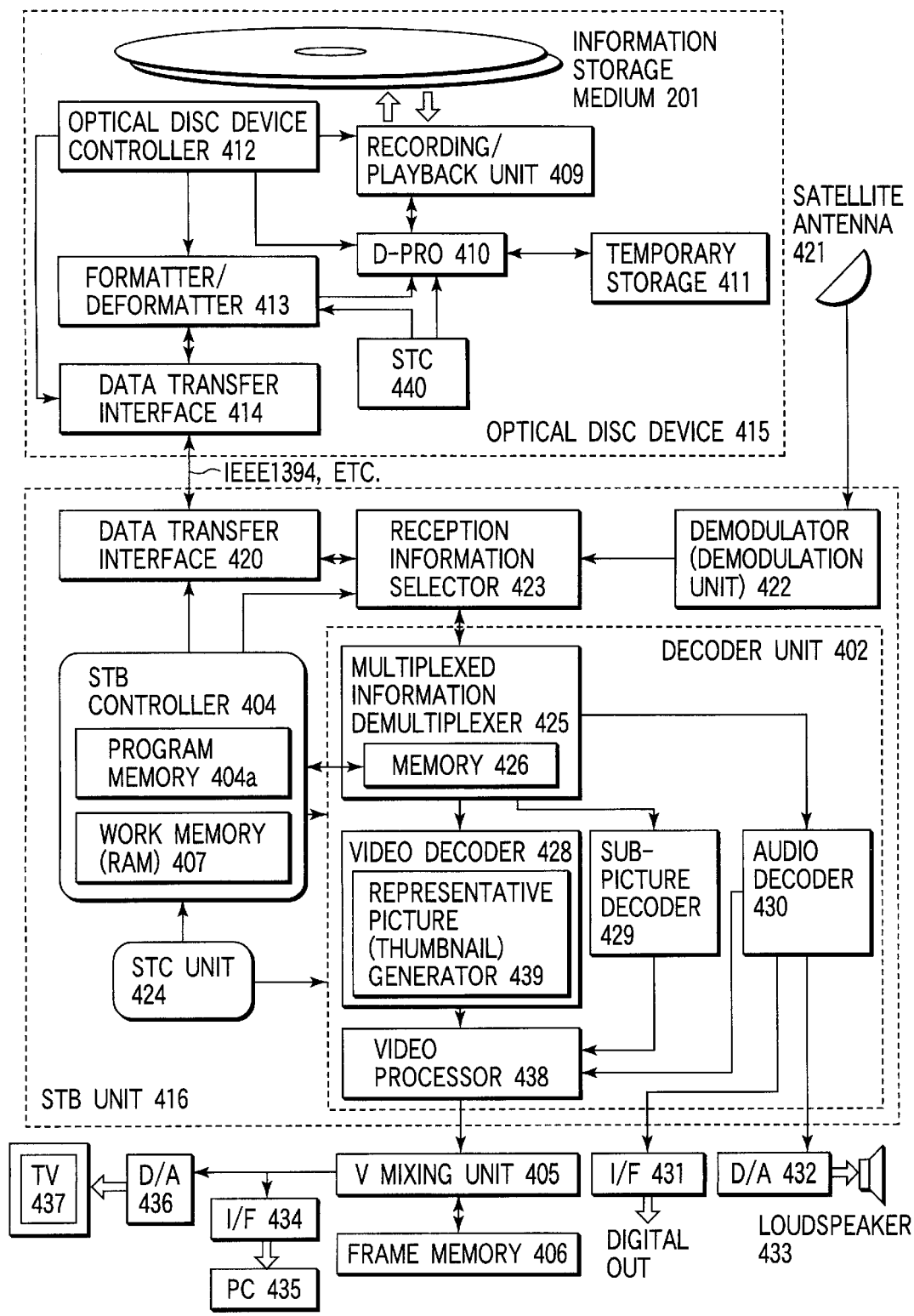
FIG. 19 is a block diagram for explaining the arrangement of a stream data recording/playback apparatus (optical disc device/streamer, STB unit) according to an embodiment of the present invention.

FIG. 19 is a block diagram for explaining the arrangement of a stream data recording/playback system (optical disc device/streamer, STB unit) according to an embodiment of the present invention. This embodiment assumes as information storage medium 201 a recordable/reproducible optical disc such as a DVD-RAM disc or the like.

The internal structure of the stream data recording/playback apparatus according to an embodiment of the present invention will be described below using FIG. 19.

This stream data recording/playback apparatus comprises optical disc device (or optical disc drive) 415, STB unit (or STB device) 416, and their peripheral devices.

The peripheral devices include video mixing unit 405, frame memory 406, external loudspeaker 433, personal computer (PC) 435, monitor TV 437, D/A converters 432 and 436, I/F units 431 and 434, and the like.

Optical disc device 415 comprises recording/playback unit 409 including a disc drive, data processor (to be abbreviated as D-PRO hereinafter) 410 for processing stream data to recording/playback unit 409 (or stream data from recording/playback unit 409), temporary storage 411 for temporarily storing stream data that overflows from D-PRO 410, and optical disc device controller 412 for controlling operations of recording/playback unit 409 and D-PRO 410.

Optical disc device 415 further comprises data transfer interface 414 for receiving stream data sent from STB unit 416 via IEEE1394 or the like (or sending stream data to STB unit 416 via IEEE1394 or the like), and formatter/deformatter 413 for converting the stream data received by data transfer interface 414 into a signal format that can be recorded on information storage medium (RAM disc) 201 (or converting the stream data played back from medium 201 into a signal format for, e.g., IEEE1394 or the like).

More specifically, the IEEE1394 reception side of data transfer interface 414 reads the time from the start of stream data transfer on the basis of the time count value of reference clock generator (system time counter STC) 440.

Based on the time information, delimiter information for dividing stream data in units of stream blocks (or in units of SOBUs) is generated, and cell division information, program division information, and PGC division information are generated in correspondence with this delimiter information.

Formatter/deformatter 413 converts the stream data sent from STB unit 416 into a stream pack sequence (see FIG. 12(a), FIG. 23(h), etc.), and inputs the converted stream pack sequence to D-PRO 410. Each of the input stream packs has a constant size of 2,048 bytes, which is equal to the sector size. D-PRO 410 combines the input stream packs in units of 16 sectors to form ECC blocks, and sends the ECC blocks to recording/playback unit 409.

When recording/playback unit 409 is not ready to record data on medium 201, D-PRO 410 transfers recording data to temporary storage 411 to temporarily save them therein, and waits until recording/playback unit 409 is ready to record data.

When recording/playback unit 409 is ready to record data, D-PRO 410 transfers data saved in temporary storage 411 to recording/playback unit 409. In this manner, recording on medium 201 is started. Upon completion of recording of data saved in temporary storage 411, the subsequent data are seamlessly transferred from formatter/deformatter 413 to D-PRO 410.

Assume that a large-size memory is used as temporary storage 411 so as to store recording data for several minutes or more by high-speed access.

Note that time stamp information appended to the recording bitstream via formatter/deformatter 413 can be obtained from reference clock generator (STC) 440.

On the other hand, time stamp information (SCR) extracted from the playback bitstream via formatter/deformatter 413 can be set in STC 440.

Each pack header in the stream data recorded on information storage medium 201 records a reference clock (system clock reference SCR). When the stream data (SOB or SOBU) recorded on this medium 201 is played back, reference clock generator (STC) 440 is adjusted to the reference clock (SCR) played back from medium 201 (the SCR value is set in STC 440).

That is, in order to play back SOB or SOBU data, the reference clock (STC 440) in the streamer (optical disc device 415) is adjusted to system clock reference SCR described in the first stream pack from which playback starts. After that, STC 440 is automatically counted up.

STB unit 416 comprises demodulator 422 for demodulating the contents of a digital broadcast wave received by satellite antenna 421, and providing demodulated data (stream data) that multiplexes one or more programs, and reception information selector 423 for selecting information of a specific program (of user's choice) (taking FIG. 23 to be described later as an example, a transport packet of program 2) from data demodulated by demodulator 422.

When the information (transport packet) of the specific program selected by reception information selector 423 is to be recorded on information storage medium 201, selector 423 sends stream data containing only the transport packet of the specific program to data transfer interface 414 of optical disc device 415 by IEEE1394 transfer via data transfer interface 420 in accordance with an instruction from STB controller 404.

When the user merely reviews the information (transport packet) of the specific program selected by reception information selector 423 without recording it, selector 423 sends stream data containing only the transport packet of the specific program to multiplexed information demultiplexer 425 of decoder unit 402 in accordance with an instruction from STB controller 404.

On the other hand, when a program recorded on information storage medium 201 is to be played back, stream data sent from optical disc device 415 to STB unit 416 via an IEEE1394 serial bus is sent to multiplexed information demultiplexer 425 of decoder unit 402 via selector 423.

Multiplexed information demultiplexer 425 classifies various packets (video packets, audio packets, and subpicture packets) contained in the stream data sent from selector 423 on internal memory 426 on the basis of their IDs. Then, demultiplexer 425 distributes the classified packets to corresponding decoders (video decoder 428, sub-picture decoder 429, and audio decoder 430).

Video decoder 428 decodes (MPEG-encoded) video packets sent from multiplexed information demultiplexer 425 to generate moving picture data. Video decoder 428 incorporates representative image (thumbnail) generator 439 to provide a function of generating a reduced-scale picture (thumbnail picture) that represents the recorded contents from I-picture in MPEG video data in such case.

Moving picture data (and/or the representative image generated by generator 439) decoded by video decoder 428, sub-picture data (information of superimposed dialogs, menus, and the like) decoded by sub-picture decoder 429, and audio data decoded by audio decoder 430 are sent to video mixing unit 405 via video processor 438.

Video mixing unit 405 generates a digital video by superposing the superimposed dialogs and the like on the moving picture using frame memory 406. This digital video is converted into an analog video via D/A converter 436, and the analog video is sent to monitor TV 437.

Also, the digital video from video mixing unit 405 is fetched as needed by personal computer 435 via I/F unit 434 and a signal line such as IEEE1394 or the like.

On the other hand, digital audio information decoded by audio decoder 430 is sent to external loudspeaker 433 via D/A converter 432 and an audio amplifier (not shown). Also, decoded audio information is digitally output to an external device via I/F unit 431.

Note that the operation timing in STB unit 416 is determined by clocks from system time counter (STC) 424.

The aforementioned instructions and the like from STB controller 404 (operation control of the internal components of STB unit 416) are executed by a control program stored in program memory 404a. In this case, work memory 407 is used as needed in the control process of STB controller 404.

The internal operation timings of STB unit 416 including STB controller 404 and decoder unit 402 can be restricted by clocks from STC unit 424. By synchronizing STC 440 of optical disc device 415 with STC unit 424 of STB unit 416, the operation timings of the overall streamer system including optical disc device 415 and STB unit 416 can be restricted.

As a method of synchronizing STC 440 with STC unit 424, a method of setting STC 440 and STC unit 424 using a reference clock (SCR) in stream data exchanged between data transfer interfaces 414 and 420 is available.

The device arrangement in STB unit 416 shown in FIG. 19 can be functionally divided/categorized into a "reception time management module", "stream data content analysis module", "stream data transfer module", and "time related information generation module".

Note that the "reception time management module" is comprised of demodulator (demodulation unit) 422, reception information selector 423, multiplexed information demultiplexer 425, STB controller 404, and the like. The "reception time management module" receives digital TV broadcast via satellite antenna 421, and records reception times in units of transport packets in the received broadcast information.

The "stream data content analysis module" is comprised of multiplexed information demultiplexer 425, STB controller 404, and the like. This "stream data content analysis module" analyzes the contents of the received stream data, and extracts I-, B-, and P-picture positions and/or PTS values.

The "stream data transfer module" is comprised of multiplexed information demultiplexer 425, reception information selector 423, STB controller 404, data transfer interface 420, and the like. This "stream data transfer module" transfers the stream data to optical disc device 415 while holding differential reception time intervals in units of transport packets.

The "time related information generation module" is comprised of multiplexed information demultiplexer 425, STB controller 404, data transfer interface 420, and the like. The "time related information generation module" generates relationship information between reception time (time stamp) information recorded by the "reception time management module" and display time information (PTS value and/or the number of fields) extracted by the "stream data content analysis module".

Figure 20:
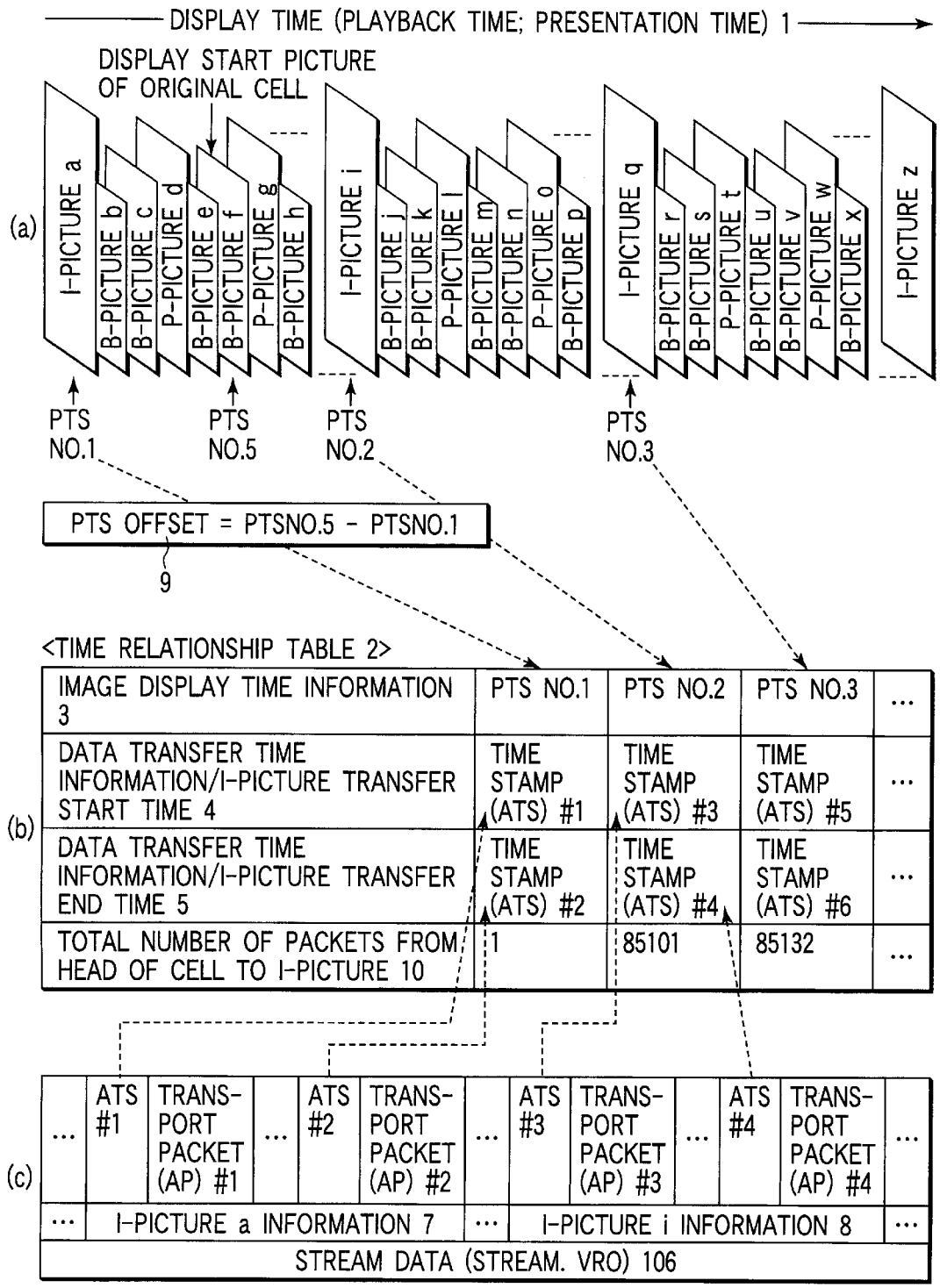
FIG. 20 is a view for explaining a time relationship table indicating the relationship between the display time and data transfer time in an embodiment of the present invention.

FIG. 20 is a view for explaining the time relationship table that indicates the relationship between the display time and data transfer time in an embodiment of the present invention. A basic feature of this invention will be explained below using FIG. 20.

The NTSC scheme as one of TV display schemes displays 30 images/pictures (frames) on a TV monitor screen as a video signal. Since a normal TV uses interlaced scan, an image is scanned every other lines of all scan lines for one image, and is then scanned remaining, every other lines to fill gaps of the immediately preceding image, thus displaying one image (picture). The image to be displayed every other lines is called a field.

The NTSC scheme displays 30 frames/60 fields per sec. The NTSC scheme is a display scheme mainly adopted in Japan and USA. By contrast, the PAL scheme adopted in Europe displays 25 frames/50 fields per sec.

FIG. 20(a) is a view showing 30 changing images/pictures (frames) per sec which are aligned along the display time (presentation time; or playback time) 1.

As information that expresses display time (playback time) 1 of an image/picture, (a) a method of expressing time by "the number of differential fields from a specific image (picture)"; and (b) a method of expressing time by "PTS (presentation time stamp; or playback time stamp)" are available.

PTS can be used in the method of expressing the display time by the value of a counter which always increments (the counter value increases in unitary increments) using reference clocks of 27 MHz and/or 90 kHz. For example, the value of a counter when each image/picture (frame) is indicated by a counter which increments using reference clocks of 27 MHz (or 90 kHz) is used as the PTS value.

In reception signal information in digital TV, picture header information 41 (see FIG. 1(j)) contains PTS values in units of pictures.

In FIG. 20(a), the display time of I-picture a is represented by PTS No. 1, and the display times of I-pictures i and q are represented by PTS No. 2 and PTS No. 3.

Assume that the user instructs to display an image (picture) xx hours yy minutes zz seconds after display of I-picture a. Then, the designated time interval (xx hours yy minutes zz seconds after) is converted into a count value of 27 MHz and/or 90 kHz. The sum of this converted value and the PTS value (PTS No. 1) of display of I-picture a is then computed to reach the "image (picture) to be displayed" designated by the user.

Since stream data is recorded on information storage medium 201 while being appended with time stamps in units of transport packets, as shown in FIG. 1(g) and the like, time management for the stream data is done using this time stamp information.

However, since this time stamp information is invisible to the user, the user designates the image (picture) of his or her choice using display time (playback time) 1.

In this case, information indicating the relationship between the time stamp information used to manage the stream data, and display time (playback time) 1 information that the user can designate is required. The information indicating this relationship is time relationship table 2 shown in FIG. 20(b) (or playback time stamp list PTSL in FIG. 15).

As exemplified in FIG. 20(b), time relationship table 2 describes corresponding data transfer time information (I-picture transfer start time 4), data transfer time information (I-picture transfer end time 5), and the total number 10 of packets from the beginning of a cell to a target I-picture in units of PTS values (PTS No. 1, PTS No. 2, PTS No. 3, ...).

For example, as for I-picture a of PTS No. 1, time stamp (ATS) #1 in the row of data transfer time information (I-picture transfer start time 4) corresponds to time stamp (ATS) #1 of head-side packet (AP) #1 of I-picture a information 7 in FIG. 2(c), and time stamp (ATS) #2 in the row of data transfer time information (I-picture transfer end time 5) corresponds to time stamp (ATS) #2 of trailing-side packet (AP) of I-picture a information 7 in FIG. 2(c). In this case, since I-picture a is the first one, the total number 10 of packets for I-picture a of PTS No. 1 is "1", as shown in FIG. 20(b).

Likewise, as for I-picture i of PTS No. 2, time stamp (ATS) #3 in the row of data transfer time information (I-picture transfer start time 4) corresponds to time stamp (ATS) #3 of head-side packet (AP) #1 of I-picture i information 8 in FIG. 2(c), and time stamp (ATS) #4 in the row of data transfer time information (I-picture transfer end time 5) corresponds to time stamp (ATS) #4 of trailing-side packet (AP) of I-picture i information 8 in FIG. 2(c). In this case, since I-picture i appears 85,100 images after the first I-picture a, the total number 10 of packets for I-picture i of PTS No. 2 is "85101", as shown in FIG. 20(b). The same applies to PTS No. 3 and the subsequent PTS values.

A characteristic feature of the present invention lies in that time relationship table 2 shown in FIG. 20(b) is recorded in an area where management information (SFIT in FIG. 15) that pertains to stream data (STREAM.VRO 106 in FIG. 1(c), FIG. 20(c), and the like) is recorded, and the user can designate an image position in units of pictures using this time relationship table.

The correspondence between time relationship table 2 and playback time stamp list PTSL shown in FIG. 15 will be explained below.

If ATS represents a time stamp shown in FIG. 1(g) and the like, the PTS value included in playback time stamp list PTSL in FIG. 15 and ATS have the following relationship:

(1) a cell looks up a portion of the recorded bitstream;
(2) AU (normally, I-picture) is a continuous portion of the recorded bitstream (AU corresponds to a portion of a cell);
(3) an SOBU that includes the AU (I-picture corresponding to a portion of a cell) is indicated by access unit start map AUSM in FIG. 15 (see FIG. 16);
(4) the PTS value is the playback time of the corresponding AU (display time; or presentation time PTM) (the PTS value corresponding to the AU corresponds to a portion of a cell in association with the playback time);
(5) cell start APAT (SC_S_APAT) is the arrival time of a transport packet or application packet of the cell of interest (SC_S_APAT corresponds to the PTS value in association with the playback time);
(6) transport packet or application packet AP includes time stamp ATS at its head position (see FIG. 22, FIG. 29(g), etc.);
(7) the PTS value is included in PTSL (see FIG. 15); and
(8) from (3) to (7), the PTS value included in PTSL corresponds to ATS through the mediation of AUSM, SC_S_APAT, and the like.

Therefore, playback time stamp list PTSL can be "time relationship table (FIG. 20(b))" including information (PTS value) indicating the relationship (one which pertains to the playback time) between the start time (SC_S_APAT) of AU (I-picture) and time stamp ATS of a packet included in the bitstream.

Or PTSL (time relationship table) can be information indicating the correspondence between the PTS value and ATS.

Display of B- or P-picture must be started from display (decode) of I-picture. For this reason, time relationship table 2 shown in FIG. 20(b) represents a list of display time information corresponding to a time stamp at the I-picture position.

In this case, as the display time information, "PTS information (PTS value)", "the number of differential fields from a specific reference image (picture)", "date & time information", and the like can be used.

Note that the differential information between I-pictures (e.g., information indicating the number of fields inserted between I-pictures) may be used as the time display information in place of the absolute value display shown in FIG. 20(b). (A time relationship table that uses the number of fields will be explained later with reference to FIG. 28).

In FIG. 20(b), "PTS information" is used as the display time information. However, the embodiment of the present invention that allows various modifications is not limited to this specific method, and "the number of differential fields from a specific reference image (picture)", "date & time information", or the like can be used instead.

Time relationship table 2 shown in FIG. 20(b) records not only the values of transfer start time 4 in units of I-pictures in a list as time stamps (ATS) #1, #3, and #5, but also the values of transfer end time 5 in units of I-pictures as time stamps (ATS) #2, #4, and #6.

For this reason, upon making special playback such as fastforward (FF) playback, fast reverse (FR) playback, or the like, the transport packet position (or application packet position) of I-picture to be played back can be designated like "from time stamp (ATS) #1 to #2", "from time stamp (ATS) #3 to #4", "from time stamp (ATS) #5 to #6", and so forth. By so doing, only I-picture information (or access unit AU information) can be played back from information storage medium 201, so that the played back information is decoded and displayed.

In the embodiment shown in FIG. 20(a), the display start picture position (the position of B-picture i) of an original cell (see FIG. 4) is used as a reference. The difference between the PTS value (PTS No. 5) of the display start picture of this original cell and that (PTS No. 1) of I-picture a immediately before that picture is PTS offset 9. This PTS offset value 9 is recorded in original cell information 272, as shown in FIG. 3(h).

More specifically, as shown in FIG. 20(a), assume that the display start picture of the original cell is B-picture f, and the PTS value at that time is PTS No. 5. If the display time of I-picture a immediately before that picture is PTS No. 1, the value of PTS offset 9 is given by "PTS No. 5–PTS No. 1".

When the user designates a specific image (specific picture frame), he or she normally designates it using the differential display time from the display start position of the original cell. By converting this differential display time into a counter value of 27 MHz and/or 90 kHz, the PTS value of the image (picture frame) designated by the user can be computed.

As shown in FIG. 20(b), time relationship table 2 records a PTS value list in units of I-pictures. By searching for the PTS value of an I-picture position, which is smaller than and closest to the computed PTS value with reference to this table, and designating the time stamp (ATS) value of corresponding I-picture transfer start time 4 there, access to information storage medium 201 is started.

As shown in FIG. 20(b), time relationship table 2 also records the total number 10 of transport packets (access position information) from the head position of the original cell to the corresponding I-picture parallel to time stamps.

Hence, according to the embodiment shown in FIG. 20, a desired stream data position can be also be accessed by designating the number of transport packets from the head position of the original cell (or the number AP_Ns of application packets) in place of the time stamp (ATS).

When stream data (STREAM.VRO) 106 shown in FIG. 20(c) is recorded on information storage medium 201 shown in FIG. 3 and the like, the contents (SOB or SOBU) of stream data 106 are recorded on a data area (STREAM.VRO/SR_TRANS.SRO) of medium 201 in predetermined data recording units (transport packets or application packets). In this case, management information (STRI) that pertains to stream data 106 is also recorded on a management area (STREAM.IFO/SR_MANGR.IFO) of medium 201.

This management information (STRI) records first management information (ATS corresponding to the I-picture transfer start time; or AUSM) used to access stream data 106 (access I-picture information or access unit AU); and third management information (time relationship table; or PTSL) which is different from the first management information (AUSM) and indicates the relationship between the first management information and second management information (PTS; or SC_S_APAT) used to access the first management information and the stream data.

Stream data 106 is a bitstream compressed based on MPEG, and the second management information corresponds to the playback time (PTS) of the stream data.

Figure 21:
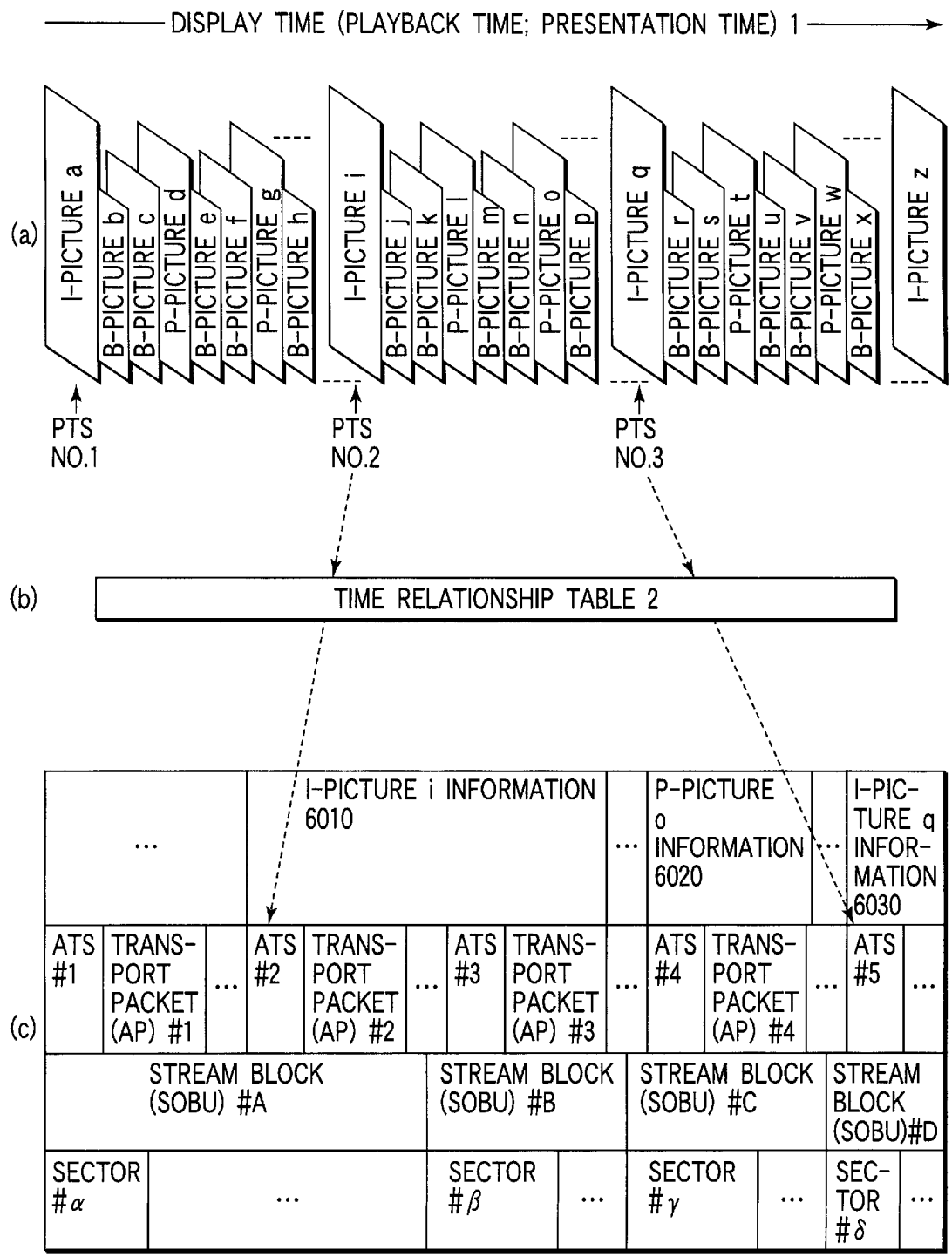
FIG. 21 is a view for explaining the relationship between the display time and data transfer time in an embodiment of the present invention.

FIG. 21 is a view for explaining the relationship between the display time and data transfer time in an embodiment of the present invention.

The layout relationship between the recording positions of picture information 6010 to 6030 and stream blocks (SOBUs) in association with the data structure in stream data (STREAM.VRO 106 in FIGS. 1, 2, etc.) recorded on information storage medium 201 will be explained using FIG. 21.

In this embodiment, stream data is recorded in units of stream blocks (SOBUs), and access to a predetermined image (picture) is designated using time stamp information.

When STB unit 416 in FIG. 19 designates a time stamp value as the playback start position, information used to compute a stream block (SOBU) corresponding to the designated time stamp value is time map information 252 in FIG. 3(h) (or time map information MAPL in FIG. 15 or time map information in FIG. 18).

In the example in FIG. 3(h), time map information 252 is recorded as a portion of stream object information (SOBI) 242 in STREAM.IFO 105 as the management information recording area for stream data. In the example in FIG. 15 as well, time map information MAPL is recorded as a portion of SOBI.

Time map information 252 shown in FIG. 3(i) records only time stamp differential time information of each stream block. In this case, the values of time differences 263 and 265 of stream blocks in time map information 252 are summed up in each of stream object information (SOBI) 242 or 243. Comparison must be made to check if this summed-up value has reached the time stamp time designated by STB unit 416. Based on the comparison result, the position of a stream block (SOBU) in a stream object (SOB), which block includes the time stamp value that matches the time designated by STB unit 416, is detected.

As shown in FIG. 21(c), the boundary position of each of picture information 6010 to 6030 does not always match that of a stream block (SOBU).

In this case, as shown in, e.g., FIG. 21(a), if playback is to be started from the position of P-picture o with the PTS value=PTS No. 6, the following process is required.

More specifically, the value of PTS No. 2 of I-picture i immediately before that picture is detected from time relationship table 2 (the internal structure is the same as that shown in FIG. 20(b)) in FIG. 21(b), and playback must be started from the head position of stream block (SOBU) #A that includes first transport packet #2 in which I-picture information 6010 is recorded.

In this case, before playback progresses from the head position of stream block (SOBU) #A to the position of desired P-picture o, picture information during that period (pictures i to n in FIG. 21(a)) is not output to the external monitor (TV).

FIG. 22 is a view for explaining the relationship between the video information compression method in MPEG and transport packets, and the relationship between transport packets in MPEG and application packets in the streamer.

As shown in FIG. 22, broadcast signal information in digital TV adopts a signal compression method called MPEG2. In the signal compression method based on MPEG, images (pictures) for TV display are categorized into I-picture 551 that does not contain any time differential information, and B-pictures 553 and 554 and P-picture 552 which contain time differential information.

I-picture independently exists without being influenced by the previous or next image (picture) information, and after DCT transformation for a single image (picture), quantized information becomes I-picture compressed information 561 and is recorded as I-picture information 31. As for P-picture 552, only differential information 562 from I-picture 551 is recorded as P-picture information 32. As for B-pictures 553 and 554, two pieces of differential information from I-picture 551 and P-picture 552 are recorded as pieces of B-picture information 33 and 34.

Hence, upon video playback, P-picture 552 and B-pictures 553 and 554 cannot solely generate images, but can generate picture images only after the image of I-picture 551 is generated. Pieces of picture information 31 to 34 are divisionally recorded in the payloads of one or a plurality of transport packets. At this time, the information is recorded so that the boundary position of each of picture information 31 to 34 always matches that between neighboring transport packets.

When transport packets in FIG. 22 are recorded by the streamer (optical disc device 415 in FIG. 19), the contents of transport packets are transplanted to packets (application packets) with time stamps called application time stamps (ATS).

A group of application packets with ATS (normally, around 10 packets) are stored in an application packet area in a stream PES packet.

One stream pack is formed by appending a pack header to this stream PES packet.

The stream PES packet is made up of a PES header, substream ID, application header, application header extension (option), stuffing bytes (option), and application packet area for storing the group of application packets with ATS.

FIG. 23 is a view for explaining the correspondence among the digital broadcast contents, the video data transfer format in IEEE1394, and stream packs in the streamer.

In digital broadcast, video information compressed according to MPEG2 is transferred in transport packets. Each transport packet is made up of transport packet header 511, and payload 512 that records a data main body of recording information, as shown in FIG. 23(*b*).

Transport packet header 511 is comprised of payload unit start indicator 501, packet ID (PID) 502, random access indicator 503, program clock reference 504, and the like, as shown in FIG. 23(*a*).

The MPEG-compressed video information contains I-, B-, and P-picture information. In the first transport packet that records I-picture information, random access indicator 503 in FIG. 23(*a*) is set with flag="1". On the other hand, in the first transport packets of B-picture information and P-picture information, payload unit start indicator 501 in FIG. 23(*a*) is set with flag="1".

Using information of these random access indicator 503 and payload unit start indicator 501, information of an I-picture mapping table (641 in FIG. 9(*e*)) and information of a B/P-picture start position mapping table (642 in FIG. 9(*e*)) are generated.

For example, a bit at the corresponding position in the B/P-picture start position mapping table (642 in FIG. 9(*e*)) is set at "1" for a transport packet having payload unit start indicator 501 shown in FIG. 23(*a*) set with flag="1".

In digital broadcast, video information and audio information are transferred in different transport packets. The video information and audio information are distinguished by packet ID (PID) 502 in FIG. 23(*a*). Using information of this PID 502, a video packet mapping table (643 in FIG. 9(*e*)) and an audio packet mapping table (644 in FIG. 9(*e*)) are generated.

As shown in FIG. 23(*c*), a plurality of programs (programs 1 to 3 in this example) are time-divisionally transferred while being packetized in a single transponder.

For example, information of transport packet header 511 and that of payload (recording information) 512 in FIG. 23(*b*) are transferred by transport packets b-522 and e-525 of program 2 shown in FIG. 23(*c*).

When the user instructs to record, for example, the second program in FIG. 23(*c*) on information storage medium 201, reception information selector 423 in STB unit 416 shown in FIG. 19 extracts only transport packets b and e of program 2.

At that time, STB unit 416 appends reception time information of transport packets b 522 and e 525 in the form of time stamps 531 and 532, as shown in FIG. 23(*d*).

After that, when data is transferred to formatter/deformatter 413 in FIG. 19 according to the IEEE1394 transfer scheme, the pairs of time stamps and transport packets are transferred while being segmented into small units, as shown in FIG. 23(*e*).

Formatter/deformatter 413 in FIG. 19 temporarily converts stream data transferred by IEEE1394 from STB unit 416 into the format shown in FIG. 23(*d*) (corresponding to the format shown in FIG. 1(*g*)). A bitstream in the format shown in FIG. 23(*d*) (a stream pack sequence in FIG. 23(*h*)) is recorded on information storage medium 201.

More specifically, in an embodiment of the present invention, pack headers and PES headers which record system clock information and the like are inserted at the head positions of respective sectors (see FIG. 23(*h*), etc.).

A plurality of time stamps and transport packets (FIG. 1(*g*)) are packed in data areas 21, 22, and 23 (FIG. 1(*f*)), and one transport packet (packet d in FIG. 1(*g*); packet b of program 2 in FIG. 23(*d*)) is recorded across a plurality of sectors (Nos. 0 and 1 in FIG. 1(*e*); partial packets in FIGS. 23(*f*) and (*g*)). This is one feature of the present invention.

Using the data structure that utilizes this feature, a packet having a size larger than the sector size (e.g., 2,048 bytes) can be recorded. This point will be described in more detail below.

Digital broadcast adopts a multi-program compatible multiplexing/demultiplexing scheme called a transport stream, as shown in FIG. 23(*c*), and one transport packet b-522 often has a size of 188 bytes (or 183 bytes).

As described above, one sector size is 2,048 bytes, and each of data areas 21, 22, and 23 (FIG. 1(*f*)) can record approximately 10 transport packets for digital broadcast even after various header sizes are subtracted.

By contrast, in a digital communication network such as ISDN or the like, a long packet having a packet size as large as 4,096 bytes is often transferred.

Using the data structure that utilizes the feature (capable of recording one packet data across a plurality of packets) so that each of data areas 21, 22, and 23 (FIG. 1(*f*)) can record not only a plurality of transport packets, but also a packet with a large packet size such as a long packet, one packet is recorded to extend across a plurality of data areas 21, 22, and 23.

As a result, all packets, i.e., transport packets for digital broadcast, a long packet for digital communications, and the like can be recorded in a stream block without any fractions independently of their packet sizes.

A normal packet is appended with a time stamp. However, as shown in FIG. 23(*g*), a time stamp can be omitted in a partial packet.

In this manner, partial packets (the partial packet size falls within the range from 1 to 187 bytes if the packet size is 188 bytes; an average of less than 100 bytes) divided at the boundary of two neighboring stream packs (FIG. 23(*h*)) can be effectively used in information recording. In addition, the storage capacity of medium 201 can be increased by an amount of each time stamp (e.g., 4 bytes per time stamp) omitted from a partial packet.

Note that the position of a time stamp located immediately after the first packet in FIG. 23(*g*) can be specified by first access point 625 in FIG. 10(*b*), or FIRST_AP_OFFSET shown in FIG. 10(*c*).

Optical disc device 415 (streamer) in FIG. 19 records pairs of time stamps and transport packets (FIGS. 23(*f*) and (*g*)) on information storage medium 201 without any conversion.

Figure 24:
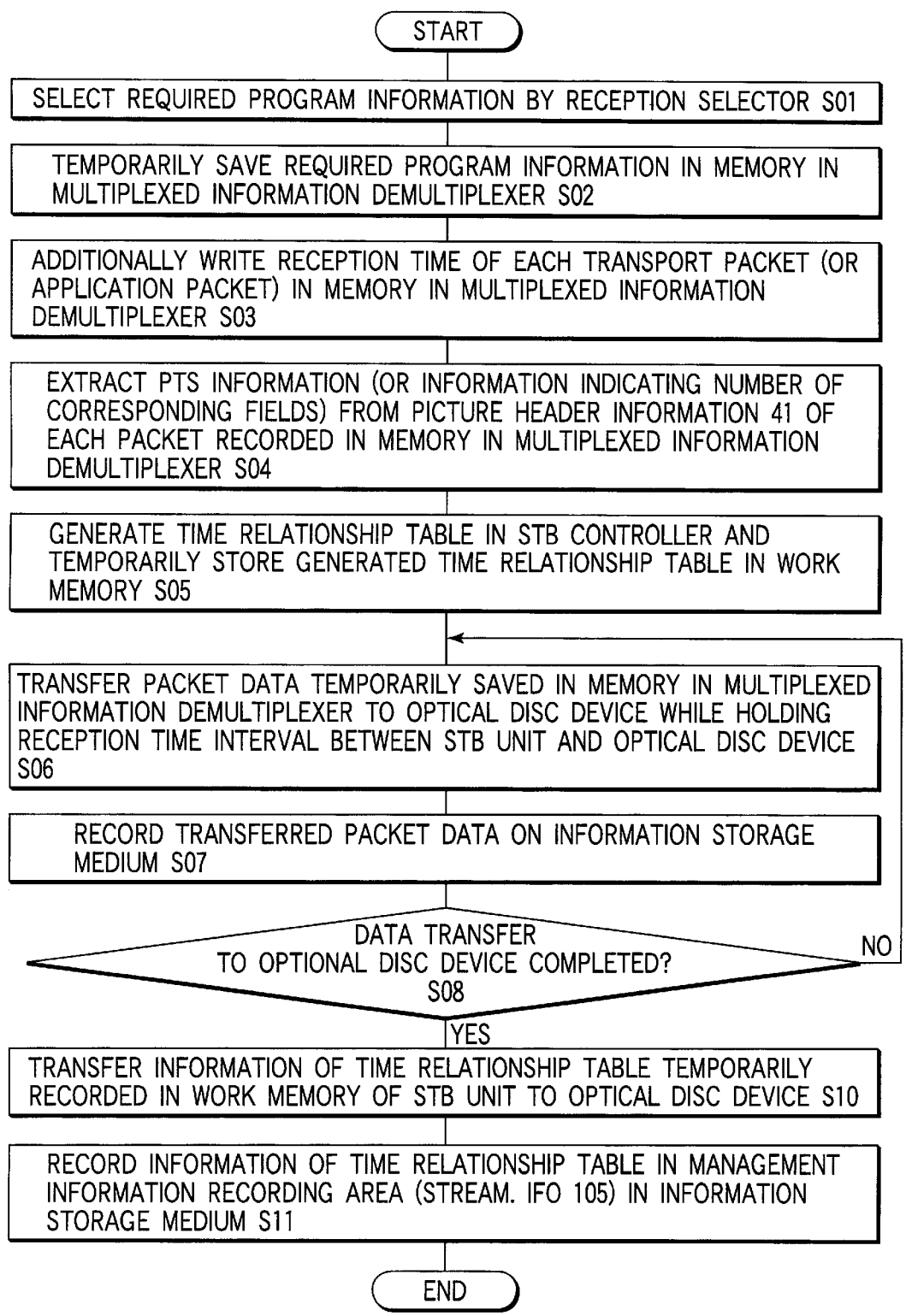
FIG. 24 is a flow chart for explaining the recording sequence of stream data according to an embodiment of the present invention.

FIG. 24 is a flow chart for explaining the recording sequence of stream data according to an embodiment of the present invention. The process upon recording stream data will be explained using FIG. 24. This process can be implemented by a processing program stored in program memory 404*a* of STB controller 404 shown in FIG. 19.

As shown in FIG. 23(*c*), a plurality of pieces of program information are time-divisionally multiplexed in a single transponder.

Reception information selector 423 in FIG. 19 extracts a transport packet of only a specific program from a packet sequence of the plurality of time-divisionally multiplexed program information (step S01).

The "reception time management unit (demodulator 422, reception information selector 423, multiplexed information demultiplexer 425, STB controller 404 and the like in FIG. 19)" temporarily saves the required program information in memory 426 of multiplexed information demultiplexer 425 (step S02).

At the same time, reception times in units of transport packets are measured, and the measurement values are appended to the respective transport packets (or application packets) as time stamps (ATS), as shown in FIG. 23(*d*). Each time stamp information appended in this way is recorded in memory 426 (step S03).

The "stream data content analysis unit (multiplexed information demultiplexer 425, STB controller 404, and the like in FIG. 19)" analyzes information in the transport packets (application packets) recorded in memory 426.

More specifically, each picture boundary position is extracted from the transport packet (application packet) sequence, and PTS information (or information of the number of corresponding fields) is extracted from picture header information 41 of each packet (step S04).

There are two different picture boundary position extraction methods, and one of these methods is selected depending on the contents of stream data.

In the first picture boundary position extraction method, an I-picture position is detected by detecting the flag of random access indicator 503 (FIG. 23(*a*)) in transport packet header 511 (FIG. 23(*b*)), a B- or P-picture position is detected by detecting the flag of payload unit start indicator 501 (FIG. 23(*a*)).

In the second picture boundary position extraction method, picture identification information 52 (FIG. 1(*k*)) and PTS information 53 (FIG. 1(*k*)) in picture header information 41 (FIG. 1(*j*)) are extracted.

After the aforementioned processes (steps S01 to S04), the "time related information generation unit (multiplexed information demultiplexer 425, STB controller 404, data transfer interface 420, and the like in FIG. 19)" generates time relationship table 2 (or playback time stamp list PTSL in FIG. 15) as a list which indicates the relationship between the time stamps (ATS) and PTS values, and records it in work memory 407 in STB controller 404 (step S05).

Then, packet data (stream data) temporarily saved in memory 426 of multiplexed information demultiplexer 425 are transferred to optical disc device 415 while maintaining the reception time interval between STB unit 416 and optical disc device 415 (i.e., while maintaining constant the relationship between a change in count value of STC 440 and a change in count value of STC 424 in FIG. 19) (step S06).

In this way, optical disc device 415 records the stream data temporarily saved in memory 426 on information storage medium 201 (step S07).

The processes in steps S06 and S07 repeat themselves until stream data transfer to optical disc device 415 is completed (NO in step S08).

Upon completion of stream data transfer to optical disc device 415 and completion of its video recording process (YES in step S08), information of time relationship table 2 (or playback time stamp list PTSL) temporarily recorded in work memory 407 of STB controller 404 is transferred to optical disc device 415 (step S10).

Information of time relationship table 2 (or playback time stamp list PTSL) is recorded in management information recording area (STREAM.IFO) 105 of information storage medium 201 (step S11).

Upon processing step S11, the recording time (SOB_REC_TM in FIG. 7(*i*)) of a stream object as the content of the recorded stream data can be recorded in time zone (TM_ZONE) 6240 (FIG. 7(*h*)).

Encrypted stream data is often recorded for the purpose of copyright protection of the contents provider upon recording stream data. When encryption is made in this way, all transport packets are encrypted, and a time stamp transfer process between STB unit 416 and optical disc device 415 is inhibited. In such case, optical disc device 415 must individually append time stamps upon recording (encrypted) stream data on information storage medium 201.

STB unit 416 in FIG. 19 makes reception time management in units of transport packets (application packets). In this case, a measure against reference clock frequency errors (more specifically, synchronization of reference clocks) between STB unit 416 and optical disc device 415 is an important subject. Hence, a video recording process of encrypted stream data will be explained below.

Figure 25:
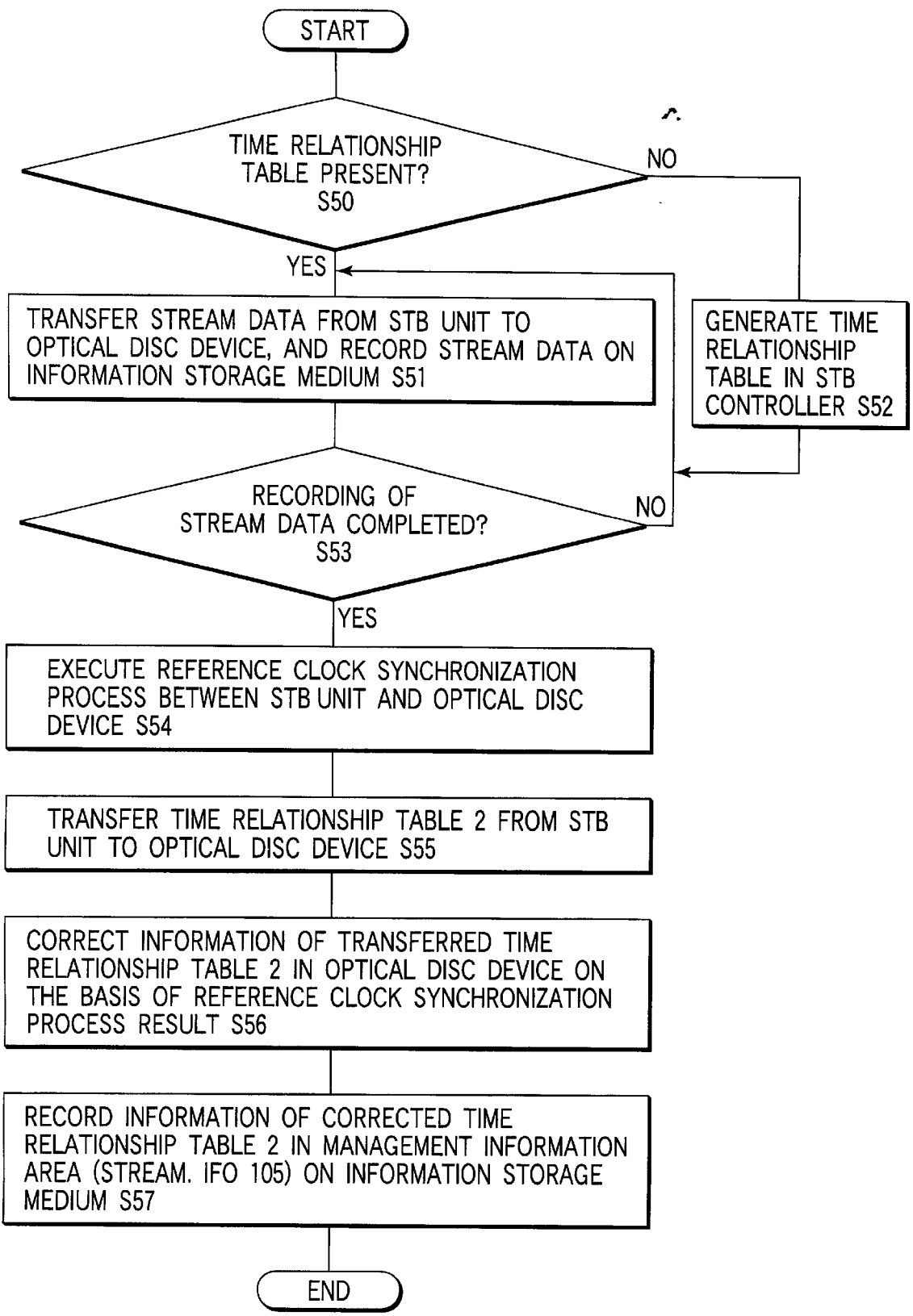
FIG. 25 is a flow chart for explaining the recording sequence of encrypted stream data according to an embodiment of the present invention.

FIG. 25 is a flow chart for explaining the recording sequence of encrypted stream data according to an embodiment of the present invention. This processing sequence can be implemented by a processing program stored in program memory 404*a* of STB controller 404 shown in FIG. 19.

It is checked if time relationship table 2 (FIG. 20(*b*)) or playback time stamp list PTSL (FIG. 15) is present in work memory 407 of STB controller 404 in FIG. 19 (step S50).

If no time relationship table (or PTSL) is present (NO in step S50), the time relationship table (or PTSL) is generated by the same processes as in steps S04 and S05 in FIG. 24 (step S52).

After the time relationship table (or PTSL) is generated or if the time relationship table (or PTSL) is already present in work memory 407 of STB controller 404 (YES in step S50), (encrypted) stream data is transferred from STB unit 416 to optical disc device 415 and is recorded on information storage medium 201 (step S51).

The process in step S51 continues until recording of the (encrypted) stream data is completed (NO in step S53). This stream data recording step S51 has the same processing contents as those in steps S01 to S03 and S06 in FIG. 24.

Note that the process in step S52 may be executed parallel to step S51 during processing of step S51.

Upon completion of recording of the (encrypted) stream data (YES in step S53), a reference clock synchronization process is executed between STB unit (or STB device) 416 and optical disc device (or optical disc drive) 415 (step S54).

This reference clock synchronization process can be executed, e.g., as follows.

That is, upon transfer of stream data, every time a specific number of transport packets (application packets) (e.g., 10,000 or 100,000 packets) are sent/received, STB unit 416 and optical disc device 415 respectively record the send/reception time in their work memory 407 and temporary storage 411.

After that, every time STB unit 416 sends a specific number of transport packets (application packets) to optical disc device 415, it appends a send time list. Optical disc device 415 compares the received list and a list created by itself in advance, thus computing any reference clock synchronization error therebetween.

After that, STB unit 416 transfers time relationship table 2 (or PTSL) to optical disc device 415 (step S55).

Time relationship table 2 (or PTSL) transferred from STB unit 416 to optical disc device 415 in this way is corrected on the basis of the reference clock synchronization error computed in the reference clock synchronization process in step S54 (step S56).

Time relationship table 2 (or PTSL) which has been corrected based on the reference clock synchronization error is recorded in the management information area (STREAM.IFO 105 in FIG. 3(*e*); or SFIT in FIG. 15) of information storage medium 201 (step S57).

In this fashion, (encrypted) stream data can be recorded/played back.

In place of the aforementioned method of "correcting the reference clock synchronization error for encrypted stream data", another method may be used as follows.

That is, as shown in FIG. 20(*b*), the number of transport packets transferred between neighboring I-pictures is recorded in time relationship table 2. Then, the total number of transport packets (or application packets) from the head of a cell is designated in place of the time stamp value of a playback start image (as the picture designation method).

In this case, the number of transport packets (or the number AP_Ns of application packets) included in each stream block is provided as information in time map information 252 in place of the data structure shown in FIG. 3($i$), as shown in FIG. 11.

When STB unit 416 designates the total number of transport packets (the total number of application packets) to access a predetermined image (picture), optical disc device 415 sums up the numbers 633 of transport packets (application packets) in turn from the first stream block shown in FIG. 11, and accesses a stream block (or SOBU) when the summed-up result has reached the designated value.

FIG. 26 is a flow chart for explaining the playback sequence of stream data according to an embodiment of the present invention. This processing sequence can be implemented by a processing program stored in program memory 404$a$ of STB controller 404 shown in FIG. 19. The playback steps of stream data will be explained below using FIG. 26.

The user can designate a desired playback start time and/or playback end time in the form of a "differential time (xx hours yy minutes zz seconds) with reference to the display start time of the designated original cell". STB controller 404 in STB unit 416 receives, e.g., a specific playback start time and playback end time designated in this way (step S21).

STB controller 404 converts the time information of the received playback start time and playback end time into clock count values of 27 MHz and/or 90 kHz, and computes differential PTS values from the display start time of the original cell.

STB controller 404 controls optical disc device 415 to read time relationship table 2 (or PTSL) recorded in the stream data management information recording area (STREAM.IFO 105), and temporarily records it in work memory 407 (step S22).

Also, STB controller 404 controls optical disc device 415 to read time map information 252 (or MAPL) recorded in the stream data management information recording area (STREAM.IFO 105), and temporarily records it in work memory 407 (step S23).

Then, STB controller 404 reads the value of PTS offset 9 shown in FIG. 3($h$) and FIG. 20($a$), and checks the difference (PTS No. 5–PTS No. 1 in FIG. 20($a$)) between the display start time of the corresponding original cell (corresponding to B-picture f in FIG. 20($a$)) and the display time of I-picture a immediately before that picture (step S24).

Furthermore, STB controller 404 reads the value of PTS offset 9 shown in FIG. 3($h$) and FIG. 20($a$), and computes the PTS values of the playback start time and playback end time designated by the user by summing up:

(A) the read value (PTS offset 9), (B) the PTS value at the I-picture a position immediately before the display start time of the original cell (when display start picture f of the original cell is located immediately after I-picture a as in FIG. 20($a$)), and (C) the differential PTS value (PTS No. 5–PTS No. 1) checked in step S24 (step S25).

STB controller 404 then checks the value of the PTS value of I-picture i immediately before the playback start position designated by the user, and the value of time stamp #2 using time relationship table 2 (step S26), and informs optical disc device 415 of them.

The optical disc device checks the value of first time stamp (ATS) #1 of stream block (SOBU) #A that includes the head position of that I-picture i information (FIG. 21($c$)) from data (FIG. 3($i$)) of time map information 252 shown in FIG. 3($h$), and detects the location (address) of first sector #α to be accessed (step S27).

Based on the detected address, optical disc device 415 plays back information from transport packet (AP) #1 in FIG. 21($c$) from information storage medium 201 (step S28).

STB controller 404 in FIG. 19 then informs decoder unit 402 of the PTS value (PTS No. 6 in FIG. 21($a$)) indicating the display start time of information which has begun to be played back in step S28 (step S29).

Together with this information, optical disc device 415 transfers the information which has begun to be played back in step S28 (step S30).

Subsequently, STB controller 404 reads picture identification information 52 (FIG. 1($k$)) from memory 426 in decoder unit 402, and discards (or ignores) data before the input I-picture (a portion of the information transferred from optical disc device 415) (step S31).

Video decoder 428 in FIG. 19 then starts decoding from the head position of the I-picture (I-picture i in FIG. 21($a$)) input in step S31, and starts display (video output) from the position of the PTS value (PTS No. 6 in FIG. 21($a$)) designated by the information in step S29 (step S32).

The same processes as in steps S24 to S28 are repeated, and the address on the information storage medium 201, which corresponds to the playback end time is checked to proceed with playback until the end address corresponding to the playback end time (step S33).

Upon completion of a series of playback processes, playback end position information 6110 shown in FIG. 7($g$) can be recorded as resume information in video manager information (FIG. 7($f$)) in the management information recording area (STREAM.IFO 105 shown in FIG. 7($e$)).

As the data contents of this playback end position information 6110, corresponding PGC number 6210, cell number 6220 therein, and playback end position time information 6230 are recorded, as shown in FIG. 7($h$).

This time information 6230 is recorded as the time stamp value, but the PTS value (or the total number of fields from the cell playback start position) can be recorded as time information 6230.

When playback of this playback end position information is restarted from the position of (resume) information 6110 based on this playback end position information, the playback start position can be obtained by the process shown in FIG. 27 (to be described later).

In standard playback mentioned above with reference to FIG. 26, decoding in decoder unit 402 starts from the time when the count value of STC unit 424 as the reference clock generator in STB unit 416 has matched the value of DTS (decode time stamp) information 54 shown in FIG. 1($k$).

Figure 27:
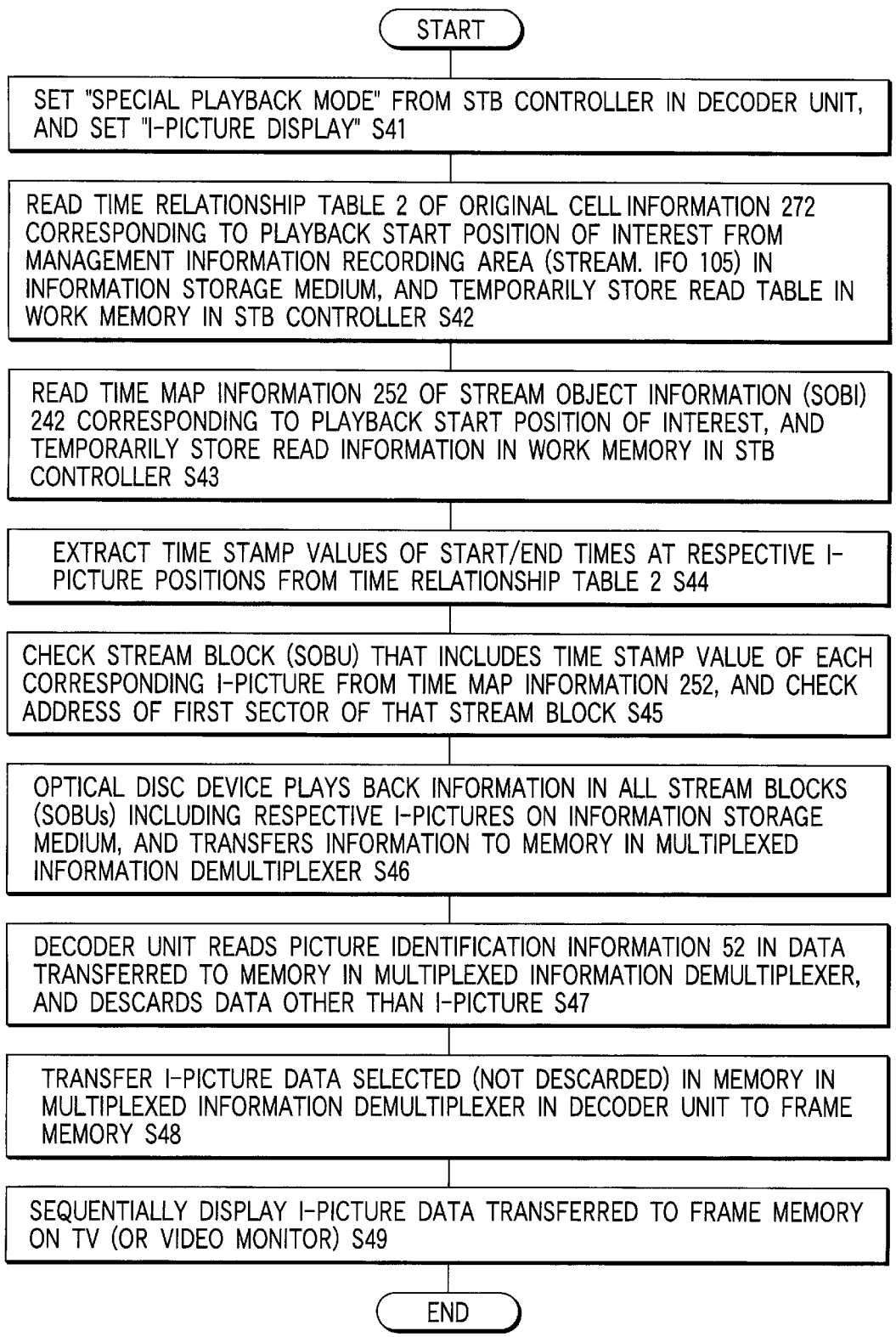
FIG. 27 is a flow chart for explaining the special playback sequence of stream data according to an embodiment of the present invention.

FIG. 27 is a flow chart for explaining the special playback sequence of stream data according to an embodiment of the present invention. This processing sequence can be implemented by a processing program stored in program memory 404$a$ of STB controller 404 shown in FIG. 19.

Upon executing special playback such as fastforward (FF) playback or fast reverse (FR) playback, only I-picture information recorded on information storage medium 201 is extracted and played back, and is decoded and displayed.

In this case, a "special playback mode setup" is made in decoder unit 402 to decode in a free mode by canceling synchronization between STC unit 424 (FIG. 19) and DTS information 54 (FIG. 1($k$)) (step S41).

In special playback as well, time relationship table 2 and time map information 252 are read from management information recording area (STREAM.IFO) 105 of information storage medium 201, and are recorded in work memory 407 of STB controller 404 (step S42).

Then, time map information 252 of stream object information (SOBI) 242 corresponding to the playback start position of interest is read, and is temporarily stored in work memory 407 in STB controller 404 (step S43).

The time stamp values of the start time/end time at each I-picture position (the position of each AU# in the example shown in FIG. 16) are then extracted from time relationship table 2 (step S44).

A stream block (SOBU) that includes the time stamp value of the I-picture of interest is checked from time map information 252, and the address of its first sector is checked (step S45).

Upon special playback, only I-picture information 6010 to 6050 in FIG. 28(b) to be described later are decoded and displayed. The positions of I-picture information 6010 to 6050 can be obtained using the information of time relationship table 2 and time map information 252.

Optical disc device 415 then plays back information in all stream blocks (SOBUs) that contain I-pictures on information storage medium 201, and transfers played-back information to memory 426 in multiplexed information demultiplexer 425 (step S46).

Decoder 402 in FIG. 19 reads picture identification information 52 (FIG. 1(k)) in the data transferred to memory 426 in multiplexed information demultiplexer 425, and discards data other than I-pictures on the basis of this information 52 (step S47).

That is, in step S47 only I-picture information is extracted from the played back and transferred stream data using picture identification information 52, and video decoder 428 decodes only the extracted I-picture information.

The I-picture data sorted (i.e., not discarded) in memory 426 of multiplexed information demultiplexer 425 in decoder unit 402 are transferred to frame memory 406 (step 548).

The I-picture data transferred to frame memory 406 in this way are sequentially displayed on the display screen of TV (or video monitor) 437 (step S49).

Figure 28:
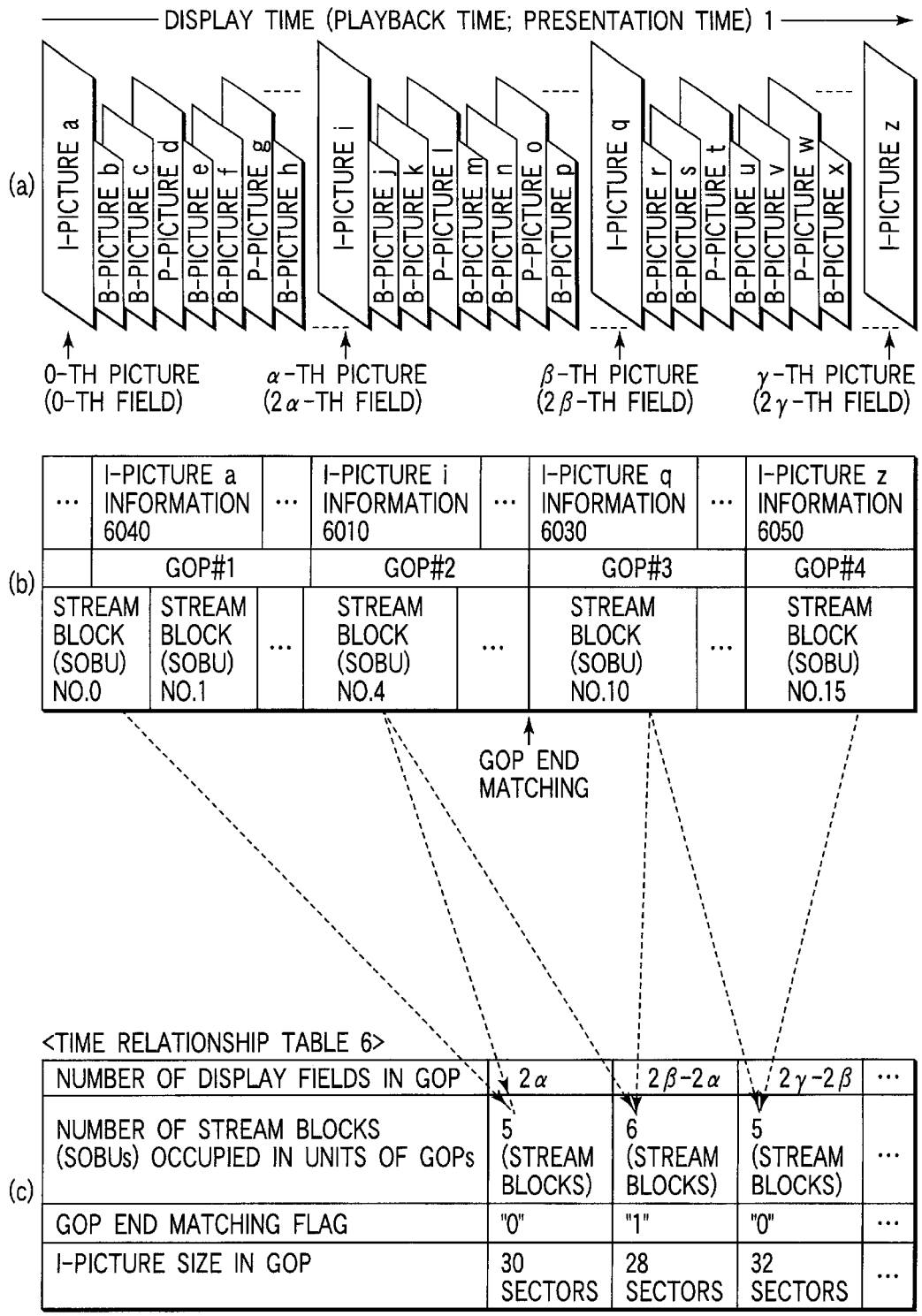
FIG. 28 is a view for explaining a time relationship table indicating the relationship between the display time and data transfer time in another embodiment of the present invention.

FIG. 28 is a view for explaining a time relationship table indicating the relationship between the display time and data transfer time in another embodiment of the present invention.

In the embodiment shown in FIG. 20, absolute value display is made as display time information, as shown in FIG. 20(b). Instead, differential information between neighboring I-pictures (e.g., information indicating the number of fields inserted between neighboring I-pictures) may be used.

In FIG. 20(b), "PTS" information is used as the time display information. However, an embodiment of the present invention that allows various modifications is not limited to such specific method. Instead, "the number of differential fields from a specific reference image (picture)", "date & time information", or the like can be used. An example in this case is time relationship table 6 shown in FIG. 28.

As shown in FIG. 28(b), each group of pictures (GOP) is a picture group which has a given I-picture position as the head position and includes pictures from that I-picture to a picture immediately before the next I-picture. In the data structure of time relationship table 6 shown in FIG. 28(c), the number of display fields in units of GOPs is recorded as display time information.

Also, time relationship table 6 describes the number of stream blocks (SOBUs) occupied in units of GOPS. In this way, a stream block (SOBU) which records the head position of I-picture information can be directly accessed from the input display time information without using time map information 252 shown in FIG. 3(h).

At the boundary position between GOP#2 and GOP#3 in the example shown in FIG. 28(b), the switching position of GOPs matches that of stream blocks (SOBUs). When the boundary of neighboring GOPs matches that of neighboring SOBUs in this manner, a GOP end matching flag in time relationship table 6 shown in FIG. 28(c) is set at "1". In this way, identification precision of the stream block position (SOBU position) that includes the I-picture information head position is improved.

Since special playback such as FF, FR, or the like uses the trailing end position of I-picture information, time relationship table 6 in FIG. 28(c) also has I-picture size information in each GOP.

Figure 29:
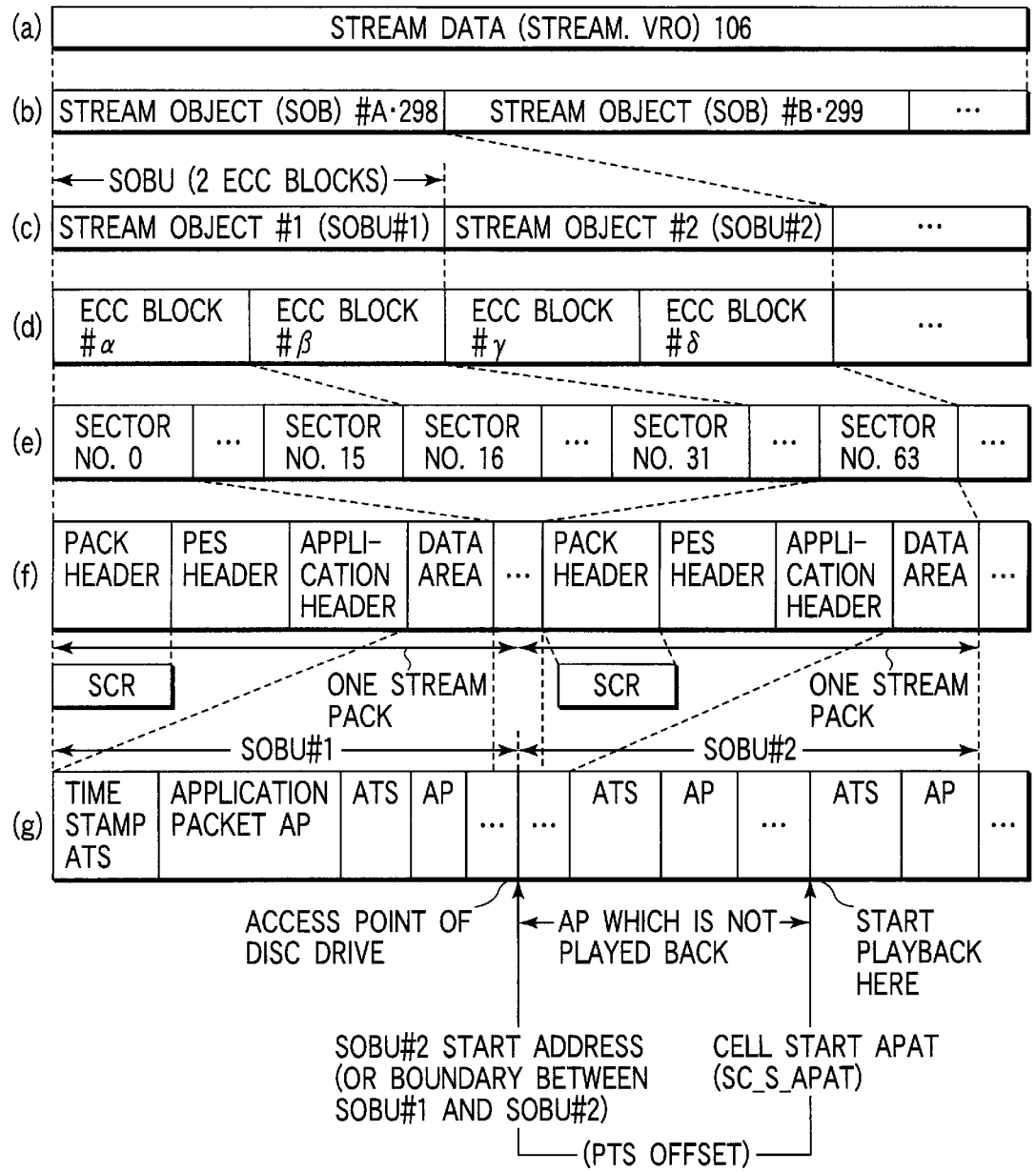
FIG. 29 is a view for explaining the way packets (AP) in stream data (SOBU) are played back in an embodiment of the present invention.

FIG. 29 is a view for explaining the way packets (AP) in stream data (SOBU) are played back in an embodiment of the present invention.

FIG. 29 exemplifies a case wherein all stream blocks #1, #2, . . . in FIG. 1(c) are made up of SOBU#1, SOBU#2, . . . each having a fixed size (2-ECC block size).

FIG. 29(f) shows the data structure of first sector No. 0 (FIG. 29(e)) of SOBU#1, and that of end sector No. 63 (FIG. 29(e)) of SOBU#2 that neighbors SOBU#1. Although not shown, sectors No. 0 to No. 62 have the same structure.

As shown in FIG. 29(f), the pack header of a stream pack corresponding to sector No. 0 records system clock reference SCR, and that of a stream pack corresponding to sector No. 63 also records system clock reference SCR.

Assume that a picture to be played back (a picture that the user designates using the playback time) is located at the middle of SOBU#2 (e.g., the position indicated by AU#1 in FIG. 16). The picture that the user designates using the playback time corresponds to cell start application packet arrival time SC_S_APAT.

In this case, the disc drive (not shown) included in recording/playback unit 409 in FIG. 19 cannot directly access the middle position of SOBU#2, and accesses the boundary position between SOBU#1 and SOBU#2. Playback of stream data (STREAM.IFO) 106 in FIG. 29(a) starts from the boundary position between SOBU#1 and SOBU#2. The interval from the boundary position between SOBU#1 and SOBU#2 to the playback start position (the position corresponding to SC_S_APAT) corresponds to PTS offset 9 described in FIG. 20(a).

Application packets present between the boundary position between SOBU#1 and SOBU#2 and the playback start position (the position corresponding to SC_S_APAT) are decoded but are not played back and output (not displayed on the screen). This corresponds to the process in step S31 in FIG. 26.

FIG. 29(g) illustrates that PTS information (PTS value or PTS offset) and application packet AP to be played back are related via time relationship table 2 in FIG. 20(a).

The relationship between the time relationship table and playback time stamp PTSL shown in FIG. 15 are summarized below.

If ATS represents the time stamp shown in FIG. 1 (g), etc., the PTS value included in playback time stamp list PTSL shown in FIG. 15 and ATS have the following relationship:

(1) a stream cell looks up a portion of the recorded bitstream;

(2) AU (normally, I-picture) is a continuous portion of the recorded bitstream (or, AU corresponds to a portion of a cell);

(3) which SOBU includes the AU (I-picture corresponding to a portion of a cell) is indicated by AUSM (see FIG. 16);

(4) the PTS value is the playback time (display time; or presentation time PTM) of the corresponding AU (i.e., the PTS value corresponding to AU represents, with respect to playback time, a portion of a cell);

(5) cell start APAT (SC_S_APAT) is the arrival time of application packet AP of the cell of interest (SC_S_APAT corresponds to the PTS value with respect to or in association with the playback time);

(6) application packet AP includes time stamp ATS at its head position (see FIG. 29(*g*), etc.);

(7) the PTS value is included in PTSL (see FIG. 15); and (8) from the above facts, the PTS value included in PTSL corresponds to ATS through the mediation of AUSM, SC_S_APAT, and the like.

Therefore, playback time stamp list PTSL can be regarded as "time relationship table (FIG. 20(*b*))" including information (PTS value) indicating the relationship (relationship pertaining to the playback time) between the start time (SC_S_APAT) of AU (I-picture) and time stamp ATS of a packet included in the bitstream.

Or, PTSL (time relationship table) can be regarded as information indicating the correspondence between the PTS value and ATS.

Finally, meanings of some terms used in the description of the embodiments will be summarized below.

A stream object (SOB) indicates data of the recorded bitstream. The SR_TRANS.SRO file can record a maximum of 999 SOBS.

A stream object unit (SOBU) is a basic unit organized in an SOB. That is, each SOB is made up of a chain of SOBUs. Especially after editing, the head SOBU and/or end SOBU of SOB often contain or contains data which does not belong to an effective portion of that SOB.

The SOBU is characterized not by the playback time or playback order but by a fixed size (size for 32 sectors or for two ECC blocks).

An access unit (AU) indicates an arbitrary, single, continuous portion in the recorded bitstream suitable for individual playback. This AU normally corresponds to I-picture in the MPEG-encoded bitstream.

An access unit start map (AUSM) indicates an SOBU in the SOB of interest, which includes the AU.

An application packet (AP) is a portion of a bitstream coming from an application device during recording. Or, the AP is a portion of a bitstream that goes to an application device during playback. Such AP is included in a multiplexed transport and has a fixed size (a maximum of 64,574 bytes) during recording.

An application time stamp (ATS) is inserted before each AP, and consists of 32 bits (4 bytes). The ATS is made up of a basic field of 90 kHz and an extended field of 27 MHz.

A cell (or stream cell SC) is the data structure indicating a portion of a program. A cell in an original PGC is called an original cell, and a cell in a user-defined PGC is called a user-defined cell. Each program in a program set is formed of at least one original cell. Each portion of a program in each play list is made up of at least one user-defined cell. In the streamer, a "cell" indicates a stream cell (SC). Each SC looks up a portion of the recorded bitstream.

The cell number (CN) is a number (1 to 999) assigned to each cell in a PGC.

Stream cell entry point information (SC_EPI) can be used as a tool for partially skipping recorded contents, and can be present in an arbitrary stream cell (SC).

A start application packet arrival time (SOB_S_APAT) of a stream object indicates the arrival time of the first AP that belongs to the SOB of interest. This arrival time is made up of a basic field of 90 kHz and an extended field of 27 MHz.

An end application packet arrival time (SOB_E_APAT) of a stream object indicates the arrival time of the last AP that belongs to the SOB of interest.

A start application packet arrival time (SC_S_APAT) of a stream cell indicates the arrival time of the first AP that belongs to the SC of interest.

An end application packet arrival time (SC_E_APAT) of a stream cell indicates the arrival time of the last AP that belongs to the SC of interest.

Navigation data can be used to control recording, playback, editing of the bitstream (SOB).

A play list (PL) is a list of program portions, the sequence of which can be arbitrarily defined by the user. PL is described "as a user-defined PGC".

A program (PG) is a logical unit of the recorded contents, which is recognized or defined by the user. A program in a program set is formed of one or more original cells. A program is defined in only an original PGC.

A program chain (PGC) is a generic unit. In an original PGC, the PGC indicates a chain of programs corresponding to a program set. On the other hand, in a user-defined PGC, the PGC corresponds to a play list and indicates a chain of portions of programs.

Program chain information (PGCI) is the data structure indicating playback of an overall PGC. The PGCI is used in either an original PGC or user-defined PGC. The user-defined PGC is formed of only PGCI, and its cell looks up an SOB in the original PGC.

The program chain number (PGCN) is a serial number (1 to 99) assigned to each user-defined PGC.

The program number (PGN) is a serial number (1 to 99) assigned to each program in the original PGC.

A program set indicates the entire recorded contents of a disc (recording medium), which consist of all programs. If any program does not undergo edit that changes the playback order from original recording, the same playback order as the recording order of programs is used upon playing back the program set.

"Real-time recording" is a recording performance that can record, even when a buffer memory size is limited, stream data on a disc (recording medium) without overflowing the buffer memory, provided that any stream data encoded at a limited transfer rate is transferred at the limited transfer rate.

The advantageous effects of the embodiments according to the present invention are summarized as follows:

1. By providing information (time relationship table or PTSL) that indicates the relationship between time stamp data (ATS) recorded in stream data and display time information (PTS or field information) to a portion of management information (SFIT), playback/screen display can be started with high precision from the display time designated by the user.

2. The user can designate a partial erase range or re-arrangement designation range of the recorded stream data using the display time on the monitor TV.

As in item "1." above, the time relationship table (or PTSL) indicating the relationship between time stamp data and display time information is provided as a portion of management information (SFIT). In this manner, the position of edit point (for partial erase range, re-arrangement designation range, or the like) can be accurately set using this time relationship table (or PTSL). As a result, time management for stream data can be made using time stamp data (ATS), and an accurate edit process according to a user's request can be guaranteed.

3. AS in item "1." above, since the time relationship table (or PTSL) is included in stream data, the playback start position upon restarting the streamer (resume playback start position) can be accurately set by only describing either time stamp data (ATS) or display time information (PTS) as the playback end position information (resume position).

4. If the playback end position information (resume information) is recorded using time stamp data (ATS), when a specific position on the information storage medium is accessed, the address to be accessed can be quickly detected using time map information 252.

5. MPEG-compressed data requires playback to start from I-picture. By recording information (time relationship table) indicating the relationship between the time stamp data (ATS) and display time information (PTS or field information) at each I-picture start position (or start position of access unit AU), access control to desired I-picture (desired AU) can be made at high speed using time map information 252.

6. By recording information (time relationship table) indicating the relationship between the time stamp data (ATS) and display time information (PTS or field information) at each I-picture start position (or start position of each AU), the address of the stream block (or SOBU) position including I-picture (AU) can be detected in combination with time map information 252. For this reason, a special playback process such as fastforward FF, fast reverse FR, or the like that plays back and displays only I-pictures can be done.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information medium which has a data area in which stream data is recorded in a predetermined data recording unit, and a management area in which a stream file information that pertains to the stream data is recorded, wherein the medium is configured to store:

first management information used to access the stream data by indicating which of the predetermined data recording units includes an access unit that is suitable for individual playback; and second management information indicating a relationship between the first management information and a third management information, wherein the third management information is different from the first management information, wherein said first management information includes access unit start map information, and said second management information includes presentation time stamp list information.

2. An information recording method that uses an information medium which has a data area in which stream data is recorded in a predetermined data recording unit, and a management area in which a stream file information that pertains to the stream data is recorded, wherein the medium is configured to store first management information used to access the stream data by indicating which of the predetermined data recording units includes an access unit that is suitable for individual playback, and second management information indicating a relationship between the first management information and a third management information, the third management information is different from the first management information, said first management information includes access unit start map information, and said second management information includes presentation time stamp list information, said information recording method comprising:

obtaining the first management information relating to the stream data to be recorded;

obtaining the second management information relating to the stream data to be recorded;

recording the stream data in the data area of said information medium; and recording the third management information in said information medium.

3. An information recording method that employs a stream data recording device for recording stream data, using a predetermined reference clock, obtained from a stream data supply device, and that employs an information medium which has a data area in which stream data is recorded in a predetermined data recording unit, and a management area in which a stream file information that pertains to the stream data is recorded, wherein the medium is configured to store first management information used to access the stream data by indicating which of the predetermined data recording units includes an access unit that is suitable for individual playback, and second management information indicates a relationship between the first management information and a third management information, wherein the third management information is different from the first management information, said first management information includes access unit start map information, and said second management information includes presentation time stamp list information, said information recording method comprising:

executing a synchronization process of the predetermined reference clock between the stream data supply device and the stream data recording device;

correcting or modifying the third management information based on a result of the synchronization process of the reference clock; and recording the corrected or modified third management information in the information medium.

4. An information playback method for playing back stream data from an information medium which has a data area in which the stream data is recorded in a predetermined data recording unit, and a management area in which a stream file information that pertains to the stream data is recorded, wherein the medium is configured to store first management information used to access the stream data by indicating which of the predetermined data recording units includes an access unit that is suitable for individual playback, and second management information indicating a relationship between the first management information and a third management information, the third management information is different from the first management information, said first management information includes access unit start map information, and said second management information includes presentation time stamp list information, said information playback method comprising:

starting read of the stream file information recorded on the information medium; and starting playback of the stream data recorded on the information medium according to the read stream file information.

5. An information medium containing data structures for recording stream data, comprising:

a data structure configured to be stored in said medium including first management information used to access the stream data recorded on the medium, and second management information describing a portion of the stream data recorded on said medium, wherein said medium has a data area configured to record the stream data in a predetermined data recording unit, and a management area configured to record the first and second management information that pertains to the stream data, the first management information including access unit start map information, and the second management information including presentation time stamp information.

6. An information recording method that uses an information medium containing data structures for recording stream data, comprising a data structure configured to be stored in said medium including first management information used to access the stream data recorded on the medium, and second management information describing a portion of the stream data recorded on said medium, wherein said medium data has a data area configured to record the stream data in a predetermined data recording unit, and a management area configured to record the first and second management information that pertains to the stream data, the first management information includes access unit start map information, and said second management information includes presentation time stamp information, the information recording method comprising:

recording the first and second management information in the management area; and recording the stream data in the data area.

7. An information reproducing method that uses an information medium containing data structures for recording stream data, comprising a data structure configured to be stored in said medium including first management information used to access the stream data recorded on the medium, and second management information describing a portion of the stream data recorded on said medium, where said medium has a data area configured to record the stream data in a predetermined data recording unit, and a management area configured to record the first and second management information that pertains to the stream data, the first management information includes access unit start map information, and said second management information includes presentation time stamp information, the information reproducing method comprising:

reading the first and second management information from the management area; and reading the stream data from the stream area.

8. An information reproducing apparatus that uses an information medium containing data structures for recording stream data, comprising a data structure configured to be store in said medium including first management information used to access the stream data recorded on the medium, and second management information describing a portion of the stream data recorded on said medium, wherein said medium has a data area configured to record the stream data in a predetermined data recording unit, and a management area configured to record the first and second management information that pertains to the stream data, the first management information includes access unit start map information, and said second management information includes presentation time stamp information, the information reproducing apparatus comprising:

a first element configured to read the first and second management information from the management area; and a second element configured to read the stream data from the data area.

* * * * *